United States Patent
Lee

(10) Patent No.: US 11,290,737 B2
(45) Date of Patent: Mar. 29, 2022

(54) IMAGE SIGNAL ENCODING/DECODING METHOD AND APPARATUS THEREFOR

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/205,974

(22) Filed: Mar. 18, 2021

(65) Prior Publication Data

US 2021/0211704 A1 Jul. 8, 2021

Related U.S. Application Data

(63) Continuation of application No. PCT/KR2019/012291, filed on Sep. 20, 2019.

(30) Foreign Application Priority Data

Sep. 21, 2018 (KR) ........................ 10-2018-0114345
Sep. 21, 2018 (KR) ........................ 10-2018-0114346

(Continued)

(51) Int. Cl.
*H04N 19/50* (2014.01)
*H04N 19/91* (2014.01)

(52) U.S. Cl.
CPC ............ *H04N 19/50* (2014.11); *H04N 19/91* (2014.11)

(58) Field of Classification Search
None
See application file for complete search history.

(56) References Cited

U.S. PATENT DOCUMENTS 9,294,779 B2   3/2016   He
9,313,498 B2   4/2016   Sole Rojals et al.
(Continued)

FOREIGN PATENT DOCUMENTS

EP   2618572 A1   7/2013
EP   3094094 A1   11/2016
(Continued)

OTHER PUBLICATIONS

International Search Report in the international application No. PCT/KR2019/012291, dated Dec. 26, 2019.
(Continued)

*Primary Examiner* — Lindsay J Uhl
(74) *Attorney, Agent, or Firm* — Perkins Coie LLP

(57) ABSTRACT

An image decoding method are provided, which comprises: generating a merge candidate list of a current block; specifying any one of a plurality of merge candidates included in the merge candidate list; on the basis of a first affine seed vector and a second affine seed vector of the specified merge candidate, inducing a first affine seed vector and a second affine seed vector of the current block; using the first affine seed vector and the second affine seed vector of the current block, inducing an affine vector regarding a sub-block in the current block; and on the basis of the affine vector, performing motion compensation prediction regarding the sub-block.

8 Claims, 39 Drawing Sheets

(30) Foreign Application Priority Data

Sep. 21, 2018 (KR) .......................... 10-2018-0114347
Sep. 21, 2018 (KR) .......................... 10-2018-0114350
Feb. 26, 2019 (KR) .......................... 10-2019-0022754

(56) References Cited

U.S. PATENT DOCUMENTS

| | | |
|---|---|---|
| 9,578,347 B2 | 2/2017 | He et al. |
| 9,906,802 B2 | 2/2018 | He et al. |
| 2013/0272424 A1 | 10/2013 | Sole Rojals et al. |
| 2013/0336409 A1 | 12/2013 | He |
| 2014/0003530 A1 | 1/2014 | Sole Rojals et al. |
| 2016/0173901 A1 | 6/2016 | He et al. |
| 2017/0127066 A1 | 5/2017 | He et al. |
| 2018/0205972 A1 | 7/2018 | Piao et al. |
| 2020/0007873 A1* | 1/2020 | Coban .................... H04N 19/18 |
| 2020/0068206 A1* | 2/2020 | Hsiang ................. H04N 19/136 |

FOREIGN PATENT DOCUMENTS

| | | |
|---|---|---|
| EP | 3399753 A1 | 11/2018 |
| KR | 20130085977 A | 7/2013 |
| KR | 20180039578 A | 4/2018 |
| WO | 2017043760 A1 | 3/2017 |

OTHER PUBLICATIONS

Bross B et al: "Versatile Video Coding (Draft 2)", 11. JVET Meeting; Jul. 11, 2018-Jul. 18, 2018; Ljubljana; (The Joint Video Exploration Team of ISO/EC JTC1/SC29/WG11 and ITU-T SG.16), No. JVET-K1001 Sep. 18, 2018 (Sep. 18, 2018), XP030193566. 130 pages.

Supplementary European Search Report in the European application No. 19862684.8, dated Sep. 23, 2021. 7 pages.

* cited by examiner (a)

| -1 | 0 | -1 | 0 |

1×4 SUB-BLOCK
NUMBER OF HORIZONTAL NON-ZERO COEFFICIENTS : 2

| 1 | 0 | 0 | 0 |
| 2 | 0 | 0 | 0 |

1×4 SUB-BLOCK
NUMBER OF HORIZONTAL NON-ZERO COEFFICIENTS : 1

MAXIMUM NUMBER OF HORIZONTAL NON-ZERO COEFFICIENTS : 2

(b)

4×1 SUB-BLOCK
NUMBER OF VERTICAL NON-ZERO COEFFICIENTS : 3

4×1 SUB-BLOCK
NUMBER OF VERTICAL NON-ZERO COEFFICIENTS : 1

MAXIMUM NUMBER OF VERTICAL NON-ZERO COEFFICIENTS : 3

FIG. 40

IMAGE SIGNAL ENCODING/DECODING METHOD AND APPARATUS THEREFOR

CROSS-REFERENCE TO RELATED APPLICATION

This is a continuation application of International Patent Application No. PCT/KR2019/012291, filed on Sep. 20, 2019, which claims priority to Korean Patent Applications No. 10-2018-0114350, filed on Sep. 21, 2018, No. 10-2018-0114345, filed on Sep. 21, 2018, No. 10-2018-0114346, filed on Sep. 21, 2018, No. 10-2018-0114347, filed on Sep. 21, 2018, No. 10-2019-0022754, filed on Feb. 26, 2019, the contents of which are hereby incorporated by reference in their entirety.

BACKGROUND

With the trend of display panels becoming larger and larger, high-definition video services are in demand. The biggest problem of the high-definition video services is that the amount of data increases significantly, and in order to solve this problem, research has been actively conducted to improve a video compression rate. As a representative example, the Joint Collaborative Team on Video Coding (JCT-VC) was established in Video Coding Experts Group (VCEG) under International Telecommunication Union-Telecommunication (ITU-T) and Movement Picture Experts Group (MPEG) in 2009. JCT-VC proposed High Efficiency Video Coding (HEVC), which is a video compression standard of which the compression performance is about two times higher than that of H.264/AVC, and was approved as a standard on Jan. 25, 2013. With the rapid development of high-definition video services, HEVC performance is gradually revealing its limitations.

SUMMARY

Technical Problem

The present disclosure is directed to providing a method and apparatus for encoding or decoding a residual coefficient when encoding or decoding a video signal.

The present disclosure is directed to providing a method and apparatus for encoding or decoding a residual coefficient using a flag for comparing the size of the residual coefficient to a threshold value when encoding or decoding a video signal.

The present disclosure is directed to providing a method and apparatus for encoding or decoding a residual coefficient using a flag indicating whether the residual coefficient is an even number or an odd number when encoding or decoding a video signal.

Technical problems intended to be solved by the disclosure are not limited to the aforementioned problems, and other technical problems that are not described herein should be clearly understood by those skilled in the art from the following description.

Technical Solution

The present disclosure relates to a method and apparatus for encoding or decoding video signal.

According to one broad aspect, the disclosure provides a method for decoding a video, the method comprising: parsing a non-zero flag indicating whether a residual coefficient is non-zero from a bitstream; parsing absolute value information for determining an absolute value of the residual coefficient from the bitstream when the non-zero flag indicates that the residual coefficient is not non-zero; and determining the absolute value of the residual coefficient based on the absolute value information, wherein the absolute value information comprises a residual coefficient comparison flag indicating whether the residual coefficient is greater than a first value, and a parity flag is further parsed from the bitstream only when the residual coefficient is greater than the first value.

According to another broad aspect, the disclosure provides a method for encoding a video, the method comprising: encoding a non-zero flag indicating whether a residual coefficient is non-zero; and encoding absolute value information for determining an absolute value of the residual coefficient when the residual coefficient is not non-zero, wherein the absolute value information includes a residual coefficient comparison flag indicating whether the residual coefficient is greater than a first value, and a parity flag for the residual coefficient is further encoded only when the residual coefficient is greater than the first value.

In some embodiments, the parity flag may indicate whether the value of the residual coefficient is an even number or an odd number.

In some embodiments, when the residual coefficient is greater than the first value, a first adjusted remnant coefficient comparison flag indicating whether an adjusted remnant coefficient derived by bit-shifting the residual coefficient to the right by 1 is greater than a second value may be further parsed.

In some embodiments, when the adjusted remnant coefficient is less than or equal to the second value, the residual coefficient may be determined to be 2N or 2N+1 depending on a value of the parity flag.

In some embodiments, when the adjusted remnant coefficient is greater than the second value, a second adjusted remnant coefficient comparison flag indicating whether the adjusted remnant coefficient is greater than a third value may be further parsed.

In some embodiments, when the adjusted remnant coefficient is greater than the second value, residual value information may be further parsed, and the residual value information may be a value obtained by subtracting the second value from the adjusted remnant coefficient.

The features briefly summarized above with respect to the present disclosure are merely exemplary aspects of the detailed description of the present disclosure described below and do not limit the scope of the present disclosure.

Advantageous Effects

According to the present disclosure, it is possible to efficiently encode or decode a residual coefficient.

According to the present disclosure, it is possible to efficiently encode or decode a residual coefficient by using a flag for comparing the size of the residual coefficient to a threshold value.

According to the present disclosure, it is possible to efficiently encode or decode a residual coefficient by using a flag indicating whether the residual coefficient is an even number or an odd number.

Advantageous effects of the disclosure are not limited to the aforementioned effects, and other advantageous effects that are not described herein should be clearly understood by those skilled in the art from the following description.

BRIEF DESCRIPTION OF THE DRAWINGS

FIG. 40 is a diagram for describing an example in which the transform type of the current block is determined.

DETAILED DESCRIPTION

Hereinafter, embodiments of the present disclosure will be described in detail with reference to the accompanying drawings.

A video is encoded and decoded in units of blocks. As an example, encoding and decoding processing such as transform, quantization, prediction, in-loop filtering, or reconstruction may be performed on a coding block, a transform block, or a prediction block.

Hereinafter, a block to be encoded or decoded will be referred to as "the current block." As an example, the current block may indicate a coding block, a transform block, or a prediction block depending on the current step for encoding or decoding processing.

In addition, the term "unit" used herein may be understood as indicating a basic unit for performing a specific encoding and decoding process, and the term "block" may be understood as indicating a sample array of a predetermined size. Unless otherwise specified, the terms "block" and "unit" may be used interchangeably. As an example, in the following embodiments, a coding block and a coding unit may be understood as having equivalent meanings.

Figure 1:
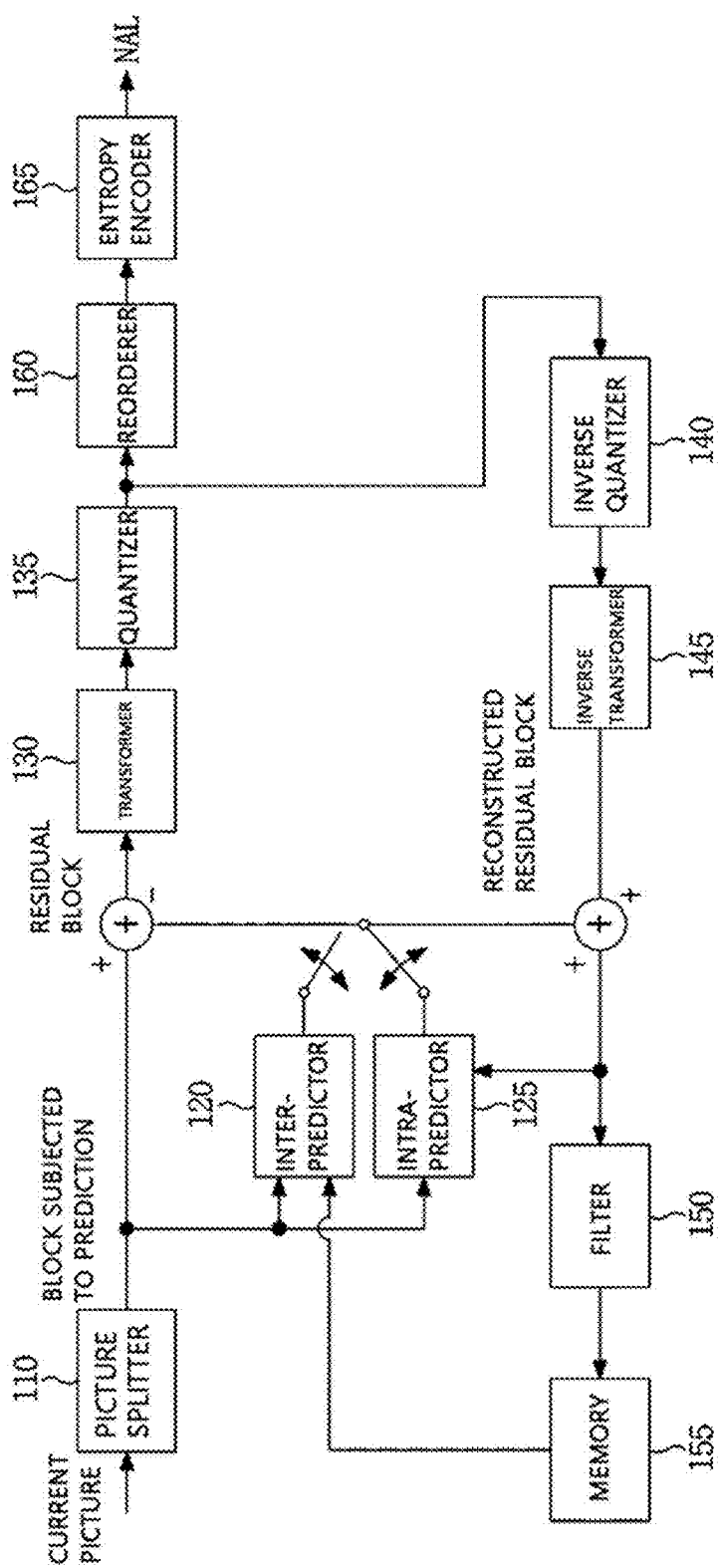
FIG. 1 is a block diagram of a video encoder according to an embodiment of the present disclosure.

FIG. 1 is a block diagram of an video encoder according to an embodiment of the present disclosure.

Referring to FIG. 1, a video encoding apparatus 100 may include a picture splitter 110, predictors 120 and 125, a transformer 130, a quantizer 135, a reorderer 160, an entropy encoder 165, an inverse quantizer 140, an inverse transformer 145, a filter 150, and a memory 155.

The elements of FIG. 1 are independently shown so as to represent different characteristic functions in the video encoding apparatus, and each of the elements is not meant to be configured in a separate hardware unit or as one software unit. In other words, the elements are independently arranged for convenience of description. In order to perform functions, at least two elements may be combined into one element, or one element may be divided into a plurality of elements. In this case, an embodiment for the combination of the elements and an embodiment for the division of the element are encompassed within the scope of the present disclosure without departing from the essence of the present disclosure.

Also, some of the elements may not be essential elements for performing essential functions in the present disclosure and may just be optional elements for improving performance. The present disclosure may be implemented by including only elements necessary to implement the essence of the present disclosure rather than elements used to just improve performance. Even a structure including only essential elements rather than optional elements used to just improve performance is encompassed within the scope of the present disclosure.

The picture splitter 110 may split an input picture into at least one processing unit. In this case, the processing unit may be a prediction unit (PU), a transform unit (TU), or a coding unit (CU). The picture splitter 110 may split one picture into a plurality of combinations of coding units, prediction units, and transform units and may select one combination of coding units, prediction units, and transform units according to a predetermined criterion (e.g., a cost function) to code the picture.

For example, one picture may be split into a plurality of coding units. A recursive tree structure, such as a quad-tree structure, may be used to split a picture into coding units. A coding unit split into other coding units using one picture or the largest coding unit as a root may have a number of child nodes corresponding to the number of split coding units. A coding unit which is no longer split due to a predetermined limitation serves as a leaf node. That is, when it is assumed that only square splitting is possible for one coding unit, one coding unit may be split into up to four other coding units.

In the following embodiments of the present disclosure, a coding unit may refer to a unit configured to perform encoding or a unit configured to perform decoding.

One coding unit may be split into at least one or more prediction units of the same size in a square or rectangular shape and may be split into prediction units such that one of the prediction units is different from another prediction unit in shape and/or size.

When a prediction unit subjected to intra-prediction based on a coding unit is generated and the coding unit is not a minimum coding unit, intra-prediction may be performed without splitting the coding unit into a plurality of N×N prediction units.

The predictors 120 and 125 may include an inter-predictor 120 configured to perform inter-prediction and an intra-predictor 125 configured to perform intra-prediction. The predictors 120 and 125 may determine whether to perform intra-prediction or to use inter-prediction on prediction units and may determine detailed information (e.g., an intra-prediction mode, a movement vector, a reference picture, and the like) corresponding to each prediction method. In this case, a processing unit in which prediction is performed may be different from a processing unit in which a prediction method and specific details are determined. For example, a prediction method, a prediction mode, and the like may be determined by a prediction unit, and prediction may be performed by a transform unit. A residual value (a residual block) between a generated prediction block and an original block may be input to the transformer 130. Also, movement vector information, prediction mode information, and the like, which are used for prediction, in addition to the residual value may be encoded by the entropy encoder 165 and delivered to a decoder. When a particular coding mode is used, the original block may be intactly encoded and transmitted to the decoder without the predictors 120 and 125 generating the prediction block.

The inter-predictor 120 may predict the prediction unit on the basis of information on at least one of a picture preceding the current picture or a picture following the current picture, and in some cases, the prediction unit may be predicted on the basis of information on some area of the current picture where encoding is completed. The inter-predictor 120 may include a reference picture interpolator, a movement predictor, and a movement compensator.

The reference picture interpolator may receive reference picture information from the memory 155 and may generate information on pixels smaller than or equal to integer pixels from a reference picture. In the case of luminance pixels, a DCT-based 8-tap interpolation filter having different filter coefficients may be used to generate information on pixels smaller than or equal to integer pixels in units of ¼ pixels. In the case of chrominance signals, a DCT-based 4-tap interpolation filter having different filter coefficients may be used to generate information on pixels smaller than or equal to integer pixels in units of ⅛ pixels.

The movement predictor may perform movement prediction on the basis of the reference picture interpolated by the reference picture interpolator. As a method for calculating a movement vector, various methods such as a full search-based block matching algorithm (FBMA), a three-step search (TSS) algorithm, and a new three-step search (NTS) algorithm may be used. The movement vector may have a movement vector value in units of ½ or ¼ pixels on the basis of the interpolated pixels. The movement prediction unit may predict the current prediction unit by using a movement prediction method differently. As the movement prediction method, various methods such as a skip method, a merge method, an advanced movement vector prediction (AMVP) method, and an intra-block copy method may be used.

The intra-predictor 125 may generate a prediction unit on the basis of information on a reference pixel near the current block, which is pixel information in the current picture. When the nearby block of the current prediction unit is a block subjected to inter-prediction and thus the reference pixel is a pixel subjected to inter-prediction, the reference pixel information of the nearby block subjected to intra-prediction may be used in place of the reference pixel included in the block subjected to inter-prediction. That is, when the reference pixel is not available, at least one available reference pixel may be used in place of unavailable reference pixel information.

Prediction modes in intra-prediction may include a directional prediction mode that uses reference pixel information depending on a prediction direction and a non-directional mode that does not use directionality information when performing prediction. A mode for predicting luminance information and a mode for predicting chrominance information may be different, and intra-prediction mode information used to predict the luminance information, or predicted luminance signal information may be utilized to predict the chrominance information.

When intra-prediction is performed and the prediction unit is equal in size to the transform unit, the intra-prediction may be performed on the prediction unit on the basis of pixels located on the left of the prediction unit, pixels located on the upper-left corner of the prediction unit, and pixels located on the top of the prediction unit. However, when intra-prediction is performed and the prediction unit is different in size from the transform unit, the intra-prediction may be performed using the reference pixel based on the transform unit. Also, intra-prediction using N×N splitting only for the minimum coding unit may be used.

In the intra-prediction method, a prediction block may be generated after applying an adaptive intra smoothing (AIS) filter to a reference pixel depending on the prediction mode. The type of the AIS filter applied to the reference pixel may vary. In order to perform the intra-prediction method, an intra-prediction mode of the current prediction unit may be predicted from an intra-prediction mode of a prediction unit near the current prediction unit. When the prediction mode of the current prediction unit is predicted using mode information predicted from the nearby prediction unit, information indicating that the current prediction unit and the nearby prediction unit have the same prediction mode may be transmitted using predetermined flag information when the intra-prediction mode of the current prediction unit is the same as the intra-prediction mode of the nearby prediction unit, and entropy encoding may be performed to encode prediction mode information of the current block when the prediction mode of the current prediction unit is different from the prediction mode of the nearby prediction unit.

Also, a residual block including information on a residual value, which is a difference between a prediction unit subjected to prediction and an original block of the prediction unit, may be generated on the basis of the prediction units generated by the predictors 120 and 125. The generated residual block may be input to the transformer 130.

The transformer 130 may transform the residual block including the information on the residual value between the original block and the prediction units generated by the predictors 120 and 125 by using a transform method such as discrete cosine transform (DCT), discrete sine transform (DST), and KLT. Whether to apply DCT, DST, or KLT to transform the residual block may be determined on the basis of intra-prediction mode information of the prediction unit used to generate the residual block The quantizer 135 may quantize values that are transformed into the frequency domain by the transformer 130. Quantization coefficients may vary depending on the block or the importance of an picture. The values calculated by the quantizer 135 may be provided to the inverse quantizer 140 and the reorderer 160.

The reorderer 160 may perform reordering of coefficient values on the quantized residual values.

The reorderer 160 may change coefficients from a two-dimensional block form to a one-dimensional vector form through a coefficient scanning method. For example, the reorderer 160 may scan DC coefficients and even high-frequency coefficients using a zigzag scanning method to change the coefficients to a one-dimensional vector form. Depending on the intra-prediction mode and the size of the transform unit, vertical scanning in which two-dimensional block-type coefficients are scanned in a column direction or horizontal scanning in which two-dimensional block-type coefficients are scanned in a row direction may be used instead of zigzag scanning. That is, the reorderer may determine a scanning method to be used among the zigzag scanning, the vertical scanning, and the horizontal scanning depending on the size of the transform unit and the intra-prediction mode.

The entropy encoder 165 may perform entropy encoding on the basis of the values calculated by the reorderer 160. Entropy encoding may use, for example, various encoding methods such as exponential Golomb coding, context-adaptive variable length coding (CAVLC), and context-adaptive binary arithmetic coding (CABAC).

The entropy encoder 165 may encode a variety of information such as residual value coefficient information and block type information of the coding unit, prediction mode information, splitting unit information, prediction unit information, transmission unit information, movement vector information, reference frame information, block interpolation information, and filtering information from the reorderer 160 and the predictors 120 and 125.

The entropy encoder 165 may perform entropy encoding on the coefficient values of the coding unit input from the reorderer 160.

The inverse quantizer 140 may inversely quantize the values quantized by the quantizer 135, and the inverse transformer 145 may inversely transform the values transformed by the transformer 130. The residual value generated by the inverse quantizer 140 and the inverse transformer 145 may be combined with a prediction unit predicted through a movement estimator, a movement compensator, and an intra-predictor of the predictors 120 and 125 to generate a reconstructed block.

The filter 150 may apply at least one of a deblocking filter, an offset corrector, and an adaptive loop filtering (ALF) filter.

The deblocking filter may remove block distortion that has occurred due to a border between blocks from a reconstructed picture. In order to determine whether to perform deblocking, whether to apply the deblocking filter to the current block may be determined on the basis of pixels included in several rows or columns in the block. When the deblocking filter is applied to the block, a strong filter or a weak filter may be applied depending on required deblocking filtering strength. Also, when the deblocking filter is applied, vertical filtering and horizontal filtering may be performed such that horizontal filtering and vertical filtering is processed in parallel.

The offset corrector may correct an offset from an original picture in an picture subjected to deblocking in units of pixels. A method of classifying pixels included in an picture into a certain number of areas, determining an area to be subjected to offsetting, and applying an offset to the determined area or a method of applying an offset in consideration of edge information of each pixel may be used to perform offset correction on a particular picture.

ALF may be performed on the basis of values obtained by comparing the filtered reconstructed picture and the original picture. By classifying the pixels included in the picture into predetermined groups and determining a filter to be applied to each of the groups, differential filtering may be performed for each group. Information on whether to apply ALF may be transmitted for each coding unit (CU), and the shape and filter coefficients of an AFL filter to be applied may vary depending on the block. Also, the ALF filter in the same form (fixed form) may be applied regardless of the characteristic of a block to be subjected to filtering.

The memory 155 may store a reconstructed block or picture calculated through the filter 150. The stored reconstructed block or picture may be provided to the predictors 120 and 125 when inter-prediction is performed.

Figure 2:
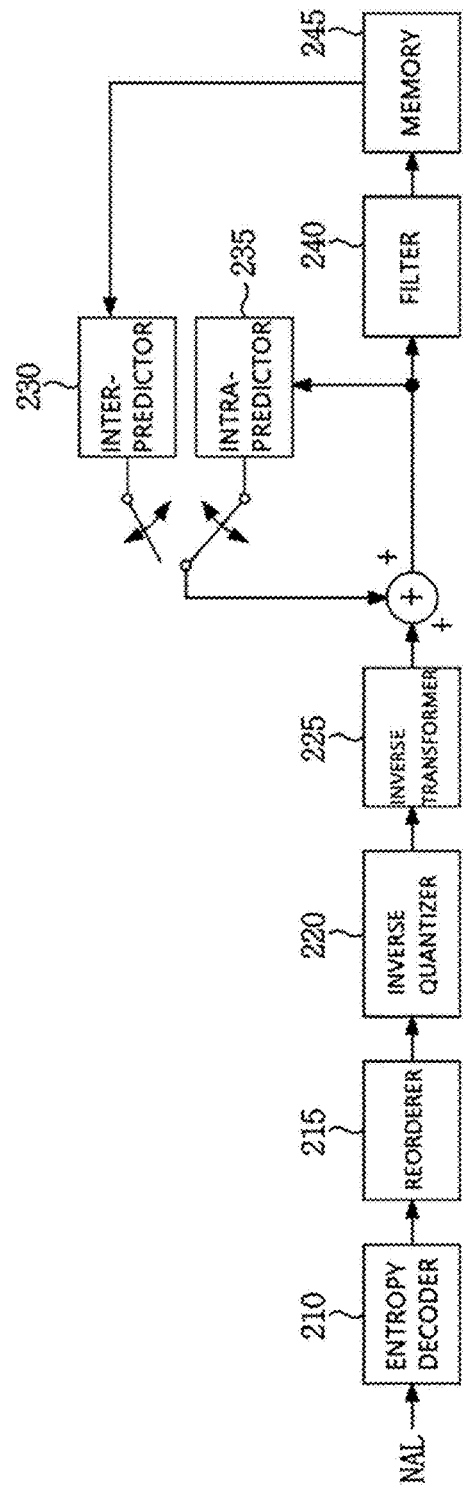
FIG. 2 is a block diagram of a video decoder according to an embodiment of the present disclosure.

FIG. 2 is a block diagram of a video decoder according to an embodiment of the present disclosure.

Referring to FIG. 2, a video decoder 200 may include an entropy decoder 210, a reorderer 215, an inverse quantizer 220, an inverse transformer 225, predictors 230 and 235, a filter 240, and a memory 245.

When a video bitstream is input from a video encoder, the input bitstream may be decoded in a procedure reverse to that of the video encoder.

The entropy decoder 210 may perform entropy decoding in a procedure reverse to the procedure in which the entropy encoder of the video encoder performs entropy encoding. For example, various methods such as exponential Golomb coding, context-adaptive variable length coding (CAVLC), and context-adaptive binary arithmetic coding (CABAC) may be applied to correspond to the method performed by the video encoder.

The entropy decoder 210 may decode information related to intra-prediction and inter-prediction performed by the encoder.

The reorderer 215 may perform reordering on the bitstream subjected to entropy-decoding by the entropy decoder 210 on the basis of the reordering method used by the encoder. The reorderer 215 may reconstruct coefficients expressed in the form of a one-dimensional vector into two-dimensional block-type coefficients to reorder the two-dimensional block-type coefficients. The reorderer 215 may receive information related to the coefficient scanning performed by the encoder and perform reordering through a reverse scanning method on the basis of the scanning order of the encoder.

The inverse quantizer 220 may perform inverse quantization on the basis of the reordered block coefficient values and quantization parameters provided by the encoder.

The inverse transformer 225 may perform inverse DCT, inverse DST, and inverse KLT on a result of the quantization performed by the video encoder, wherein the inverse DCT, the inverse DST, and the inverse KLT are the inverse of the transforms which have been performed by the transform unit, that is, DCT, DST, and KLT. The inverse transform may be performed on the basis of a transmission unit determined by the video encoder. In the inverse transformer 225 of the video decoder, transform techniques (e.g., DCT, DST, and KLT) may be selectively performed depending on multiple pieces of information such as a prediction method, the size of the current block, and a prediction direction.

The predictors 230 and 235 may generate a prediction block on the basis of information related to prediction block generation, which is provided by the entropy decoder 210, and information on a previously decoded block or picture, which is provided by the memory 245.

As described above, when intra-prediction is performed in the same manner as that of the video encoder and the prediction unit is equal in size to the transform unit, the intra-prediction may be performed on the prediction unit on the basis of pixels located on the left of the prediction unit, pixels located on the upper-left corner of the prediction unit, and pixels located on the top of the prediction unit. On the other hand, when intra-prediction is performed and the prediction unit is different in size from the transform unit, the intra-prediction may be performed using a reference pixel based on the transform unit. Also, intra-prediction using N×N splitting only for the minimum coding unit may be used.

The predictors 230 and 235 may include a prediction unit determinator, an inter-predictor, and an intra-predictor. The prediction unit determinator may receive a variety of information such as prediction unit information, prediction mode information for the intra-prediction method, and movement-prediction-related information for the inter-prediction method from the entropy decoder 210, classify the prediction unit in the current coding unit, and determine whether the prediction unit performs inter-prediction or intra-prediction. By using information necessary for the inter-prediction of the current prediction unit provided by the video encoder, the inter-predictor 230 may perform inter-prediction on the current prediction unit on the basis of information included in at least one of a picture preceding the current picture including the current prediction unit or a picture following the current picture. Alternatively, inter-prediction may be performed on the basis of information on some pre-reconstructed areas in the current picture including the current prediction unit.

The inter-predictor 230 may determine whether the movement prediction method for the prediction unit included in the corresponding coding unit is a skip mode, a merge mode, an AMVP mode, or an intra-block copy mode on the basis of the coding unit in order to perform inter-prediction.

The intra-predictor 235 may generate a prediction block on the basis of information on pixels in the current picture. When the prediction unit is a prediction unit subjected to intra-prediction, the intra-predictor 235 may perform intra-prediction on the basis of intra-prediction mode information of the prediction unit provided by the video encoder. The intra-predictor 235 may include an AIS filter, a reference pixel interpolator, and a DC filter. The AIS filter, which is a part that performs filtering on the reference pixel of the current block, may determine whether to apply filtering depending on the prediction mode of the current prediction unit. The AIS filter may perform AIS filtering on the reference pixel of the current block using AIS filter information and the prediction mode of the prediction unit provided by the video encoder. When the prediction mode of the current block is a mode in which the AIS filtering is not performed, the AIS filter may not be applied.

When the prediction mode of the prediction unit is a prediction mode in which intra-prediction is performed on the basis of a pixel value obtained by interpolating the reference pixel, the reference pixel interpolator may interpolate the reference pixel to generate the reference pixel in a pixel unit less than or equal to an integer. When the prediction mode of the current prediction unit is a prediction mode in which the prediction block is generated without interpolating the reference pixel, the reference pixel may not be interpolated. When the prediction mode of the current block is a DC mode, the DC filter may generate the prediction block through filtering.

The reconstructed block or picture may be provided to the filter 240. The filter 240 may include a deblocking filter, an offset corrector, and an ALF filter.

The filter 240 may receive information on whether the deblocking filter is applied to a corresponding block or picture or information on whether a strong filter or a weak filter is applied when the deblocking filter is applied from the video encoder. The deblocking filter of the video decoder may receive information related to the deblocking filter, which is provided by the video encoder, and the video decoder may perform deblocking filtering on a corresponding block.

The offset corrector may perform offset correction on the reconstructed picture on the basis of the type of offset correction, offset value information, and the like which are applied to the picture upon encoding.

The ALF may be applied to the coding unit on the basis of information on whether to apply the ALF, ALF coefficient information, and the like which are provided from the encoder. The ALF information may be provided by being included in a particular parameter set.

The memory 245 may store the reconstructed picture or block so that the picture or block can be used as a reference picture or a reference block and also may provide the reconstructed picture to an output unit.

Figure 3:
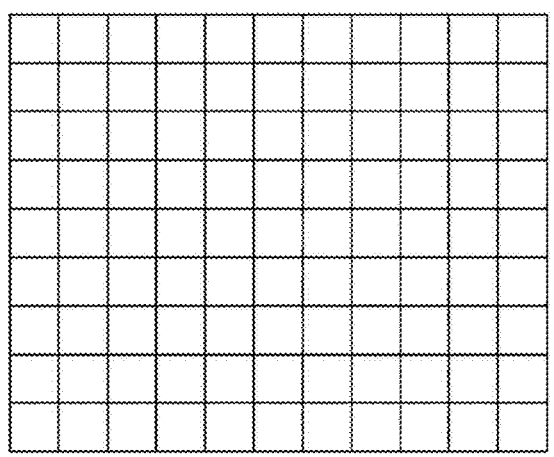
FIG. 3 is a diagram showing a basic coding tree unit according to an embodiment of the present disclosure.

FIG. 3 is a diagram showing a basic coding tree unit according to an embodiment of the present disclosure.

A coding unit of the largest size may be defined as a coding tree block. One picture is split into a plurality of coding tree units (CTUs). A coding tree unit, which is a coding unit of the largest size, may be referred to as a largest coding unit (LCU). FIG. 3 shows an example in which one picture is split into a plurality of coding tree units.

The size of the coding tree unit may be defined at the picture level or the sequence level. To this end, information indicating the size of the coding tree unit may be signaled through a picture parameter set or a sequence parameter set.

As an example, the size of the coding tree unit for the entire picture in a sequence may be set to 128×128. Alternatively, one of 128×128 or 256×256 may be determined as the size of the coding tree unit at the picture level. As an example, the size of a coding tree unit in a first picture may be set to 128×128, and the size of a coding tree unit in a second picture may be set to 256×256.

The coding tree unit may be split to generate a coding block. A coding block indicates a basic unit for encoding or decoding processing. As an example, prediction or transform may be performed for each coding block, or a prediction mode may be determined for each coding block. Here, the prediction mode indicates a method of generating a prediction picture. As an example, the prediction mode may include intra-prediction, inter-prediction, current picture referencing (CPR) (or intra-block copy (IBC)), or combined prediction. A prediction block for a coding block may be generated using at least one prediction mode among intra-prediction, inter-prediction, current picture referencing, or combined prediction for the coding block.

Information indicating the prediction mode of the current block may be signaled in a bitstream. As an example, the information may be a 1-bit flag indicating whether the prediction mode is an intra-mode or an inter-mode. Current picture referencing or combined prediction may be available only when it is determined that the prediction mode of the current block is the inter-mode.

Current picture referencing is for setting the current picture as the reference picture and acquiring the prediction block of the current block from an area of the current picture where encoding or decoding is completed. Here, the current picture refers to a picture including the current block. Information indicating that current picture referencing is applied to the current block may be signaled in a bitstream. As an example, the information may be a 1-bit flag. It may be determined that the prediction mode of the current block is current picture referencing when the flag is true, and it may be determined that the prediction mode of the current block is inter-prediction when the flag is false.

Alternatively, the prediction mode of the current block may be determined on the basis of a reference picture index. As an example, when the reference picture index indicates the current picture, it may be determined that the prediction mode of the current block is current picture referencing. When the reference picture index indicates a picture other than the current picture, it may be determined that the prediction mode of the current block is inter-prediction. That is, current picture referencing is a prediction method that uses information of an area of the current picture where encoding or decoding is completed, and inter-prediction is a prediction method that uses information of another picture where encoding or decoding is completed.

Combined prediction indicates a coding mode obtained by combining two or more of intra-prediction, inter-prediction, and current picture referencing. As an example, when combined prediction is applied, a first prediction block may be generated on the basis of one of intra-prediction, inter-prediction, or current picture referencing, and a second prediction block may be generated on the basis of another one. When the first prediction block and the second prediction block are generated, a final prediction block may be generated through an averaging operation or a weighted-sum operation between the first prediction block and the second prediction block. Information indicating whether combined prediction is applied may be signaled in a bitstream. The information may be a 1-bit flag.

Figure 4:
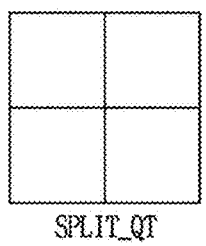
FIG. 4 is a diagram showing various splitting types of a coding block.
Figure 4:
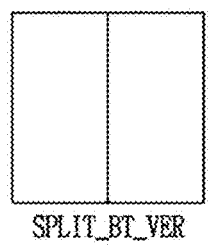
Figure 4:
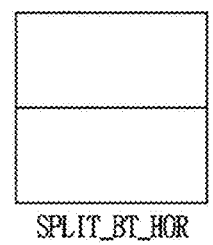
Figure 4:
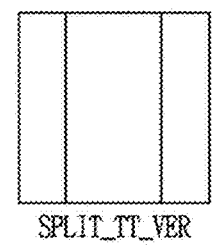
Figure 4:
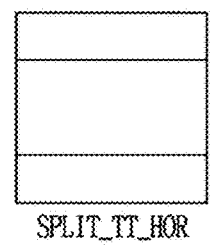

FIG. 4 is a diagram showing various splitting types of a coding block.

A coding block may be split into a plurality of coding blocks on the basis of quad-tree splitting, binary-tree splitting, or triple-tree splitting. A coding block obtained through the splitting may be re-split into a plurality of coding blocks on the basis of quad-tree splitting, binary-tree splitting, or triple-tree splitting.

The quad-tree splitting indicates a splitting technique to split the current block into four blocks. As a result of the quad-tree splitting, the current block may be split into four square partitions (see "SPLIT_QT" of FIG. 4A).

The binary-tree splitting indicates a splitting technique to split the current block into two blocks. Splitting the current block into two blocks in a vertical direction (i.e., using a vertical line across the current block) may be referred to as vertical binary-tree splitting, and splitting the current block into two blocks in a horizontal direction (i.e., using a horizontal line across the current block) may be referred to as horizontal binary-tree splitting. As a result of the binary-tree splitting, the current block may be split into two non-square partitions. In FIG. 4B, "SPLIT_BT_VER" represents a result of the vertical binary-tree splitting. In FIG. 4C, "SPLIT_BT_HOR" represents a result of the horizontal binary-tree splitting.

The triple-tree splitting indicates a splitting technique to split the current block into three blocks. Splitting the current block into three blocks in a vertical direction (i.e., using two vertical lines across the current block) may be referred to as vertical triple-tree splitting, and splitting the current block into three blocks in a horizontal direction (i.e., using two horizontal lines across the current block) may be referred to as horizontal triple-tree splitting. As a result of the triple-tree splitting, the current block may be split into three non-square partitions. In this case, the width and height of the partition located at the center of the current block may be twice those of the other partitions. In FIG. 4D, "'SPLIT_TT_VER'" represents a result of the vertical triple-tree splitting. In FIG. 4E, "SPLIT_TT_HOR" represents a result of the horizontal triple-tree splitting.

The number of times a coding tree unit is split may be defined as a splitting depth (partitioning depth). The maximum splitting depth of the coding tree unit may be determined at the sequence level or the picture level. Thus, the maximum splitting depth of the coding tree unit may vary depending on the sequence or the picture.

Alternatively, the maximum splitting depth may be determined individually for each splitting technique. As an example, the maximum splitting depth allowed for quad-tree splitting may be different from the maximum splitting depth allowed for binary-tree splitting and/or the triple-tree splitting.

The encoder may signal information indicating at least one of the splitting type or the splitting depth of the current block in a bitstream. The decoder may determine the splitting type and splitting depth of the coding tree unit on the basis of information parsed from the bitstream.

Figure 5:
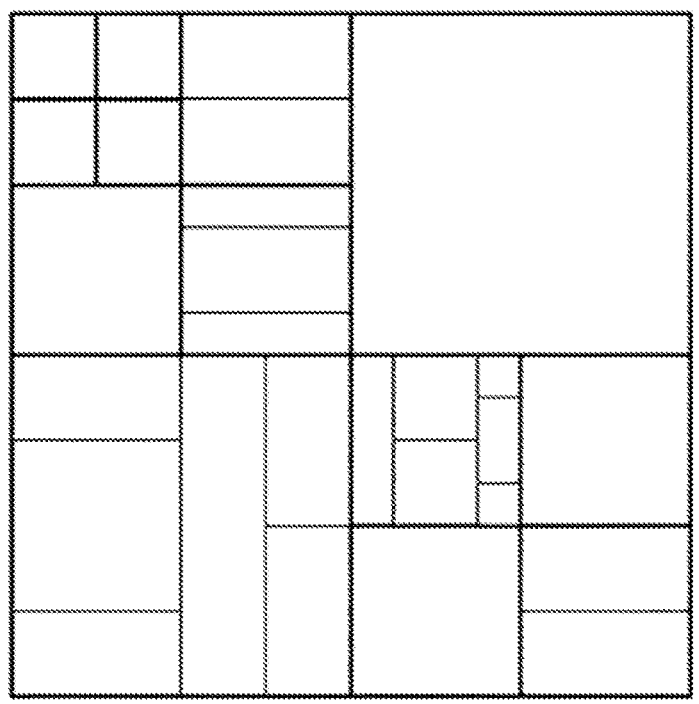
FIG. 5 is a diagram illustrating a splitting aspect of a coding tree unit.

FIG. 5 is a diagram illustrating a splitting aspect of a coding tree unit.

Splitting a coding block using a splitting technique such as quad-tree splitting, binary-tree splitting, and/or triple-tree splitting may be referred to as multi-tree splitting.

Coding blocks generated by applying multi-tree splitting to the coding block may be referred to as lower coding blocks. When the splitting depth of the coding block is k, the splitting depth of the lower coding blocks is set to k+1.

On the contrary, with respect to coding blocks with a splitting depth of k+1, a coding block with a splitting depth of k may be referred to as an upper coding block.

The splitting type of the current coding block may be determined on the basis of at least one of the splitting type of the upper coding block or the splitting type of a neighboring coding block. Here, the neighboring coding block is adjacent to the current coding block and may include at least one of a neighboring block located above the current coding block, a neighboring block located to the left of the current coding block, or a neighboring block adjacent to the upper-left corner of the current coding block. Here, the splitting type may include at least one of the presence of quad-tree splitting, the presence of binary-tree splitting, the direction of binary-tree splitting, the presence of triple-tree splitting, or the direction of triple-tree splitting.

In order to determine the splitting type of the coding block, information indicating whether the coding block is split may be signaled in a bitstream. The information is a 1-bit flag "split_cu_flag," and the flag being true indicates that the coding block is split by a multi-tree splitting technique.

When split_cu_flag is true, information indicating whether the coding block is split through quad-tree splitting may be signaled in a bitstream. The information is a 1-bit flag "split_qt_flag," and when the flag is true, the coding block may be split into four blocks.

For example, it is shown in FIG. 5 that four coding blocks with a splitting depth of one are generated because the coding tree unit is split through quad-tree splitting. It is also shown that quad-tree splitting is re-applied to the first coding block and the fourth coding block among the four coding blocks generated by performing the quad-tree splitting. As a result, four coding blocks with a splitting depth of two may be generated.

Also, by re-applying quad-tree splitting to a coding block with a splitting depth of two, a coding block with a splitting depth of three may be generated.

When quad-tree splitting is not applied to a coding block, whether to perform binary-tree splitting or triple-tree splitting on the coding block may be determined in consideration of at least one of the size of the coding block, whether the coding block is located at a picture edge, the maximum splitting depth, or the splitting aspect of a neighboring block. When it is determined that binary-tree splitting or triple-tree splitting is performed on the coding block, information indicating a splitting direction may be signaled in a bitstream. The information may be a 1-bit flag mtt_split_cu_vertical_flag. On the basis of the flag, whether the splitting direction is vertical or horizontal may be determined. In addition, information indicating which of binary-tree splitting and triple-tree splitting is applied to the coding block may be signaled in a bitstream. The information may be a 1-bit flag mtt_split_cu_binary_flag. On the basis of the flag, whether binary-tree splitting or triple-tree splitting is applied to the coding block may be determined.

As an example, it is shown in FIG. 5 that vertical binary-tree splitting is applied to a coding block with a splitting depth of one, vertical triple-tree splitting is applied to a left coding block among coding blocks generated as a result of the vertical binary-tree splitting, and vertical binary-tree splitting is applied to a right coding block.

Since a picture is split into coding tree units, a block smaller than a preset size may be present in an area adjacent to a right edge or a lower edge of the picture. When it is assumed that the block is a coding tree unit, a coding tree unit smaller than a preset size may be generated at the right edge or the lower edge of the picture. In this case, the size of the coding tree unit may be determined on the basis of information signaled through a sequence parameter set or a picture parameter set.

Figure 6:
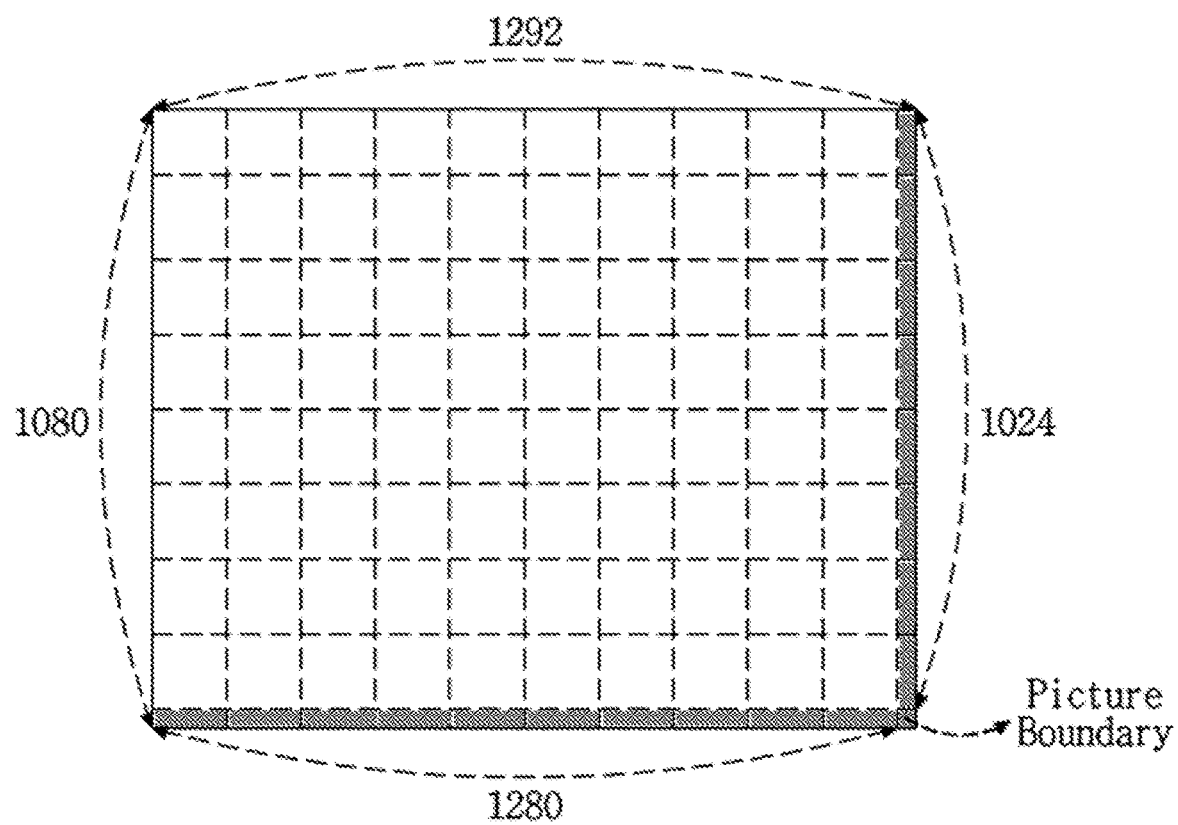
FIG. 6 shows an example in which a block smaller than a coding tree unit of a predetermined size occurs at a picture edge.

FIG. 6 shows an example in which a block smaller than a coding tree unit of a predetermined size occurs at a picture edge.

When a 1292×1080 picture is split into 128×128 coding tree units, a block smaller than 128×128 is present at a right edge and a lower edge of the picture in the example shown in FIG. 6. In the following embodiments, a block smaller than a coding tree unit of a preset size occurring at a picture edge is referred to as an atypical boundary edge block.

Only a predefined splitting method may be allowed for the atypical boundary edge block. Here, the predefined splitting method may include at least one of quad-tree splitting, triple-tree splitting, or binary-tree splitting.

As an example, only quad-tree splitting may be allowed for an atypical boundary edge block. In this case, the quad-tree splitting may be repeated until the block corresponding to the picture edge becomes a minimum quad-tree splitting size. Here, the minimum quad-tree splitting size may be predefined in an encoder and a decoder. Alternatively, information indicating the minimum quad-tree splitting size may be signaled in a bitstream.

Figure 7:
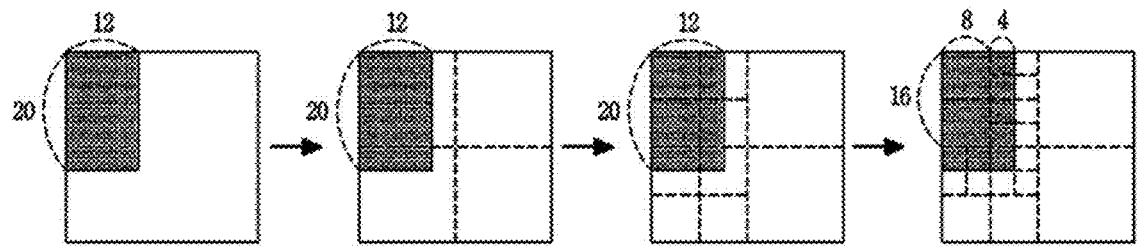
FIG. 7 is a diagram showing an example in which quad-tree splitting is performed on an atypical boundary edge block.

FIG. 7 is a diagram showing an example in which quad-tree splitting is performed on an atypical boundary edge block. For convenience of description, it is assumed that the minimum quad-tree splitting size is 4×4.

The atypical boundary edge block may be split on the basis of a square block. The square block may be derived on the basis of a larger one between the width and height of the atypical boundary edge block. As an example, a power of 2 greater than the reference value and closest to the reference value may be regarded as the length of one side of the square block. As an example, a 12×20 block shown in FIG. 7 may be considered to belong to a 32×32 block, and the splitting result for the 32×32 block may be applied to the 12×20 block.

When quad-tree splitting is performed on the 12×20 block, the block may be split into a 12×16 block and a 12×4 block. When quad-tree splitting is performed on each of the blocks, the 12×16 block is split into two 8×8 blocks and two 4×8 blocks, and the 12×4 block is split into an 8×4 block and a 4×4 block.

Quad-tree splitting may be performed again on the 4×8 block located at the picture edge again, and thus two 4×4 blocks may be generated. Likewise, quad-tree splitting may be performed again on the 8×8 block located at the picture edge, and thus two 4×4 blocks may be generated.

Alternatively, when at least one of the width or height of a block is smaller than or equal to the minimum quad-tree splitting size, binary tree splitting may be performed. Here, the minimum quad-tree splitting size may indicate a minimum quad-tree splitting width or a minimum quad-tree splitting height. As an example, when the minimum quad-tree splitting size is 4×4, the minimum quad-tree splitting width and the minimum quad-tree splitting height may be 4.

In this case, vertical binary-tree splitting may be performed when the width of the block is smaller than or equal to the minimum quad-tree splitting size, and horizontal binary-tree splitting may be performed when the height of the block is smaller than or equal to the minimum quad-tree splitting height.

On the contrary, the quad-tree splitting may be performed when the width or height of the block is greater than the minimum quad-tree splitting size. As an example, when the upper-right location and the lower-left location of the block deviates from the picture and the width or height of the block is larger than the minimum quad-tree splitting size, the quad-tree splitting may be applied to the corresponding block.

Figure 8:
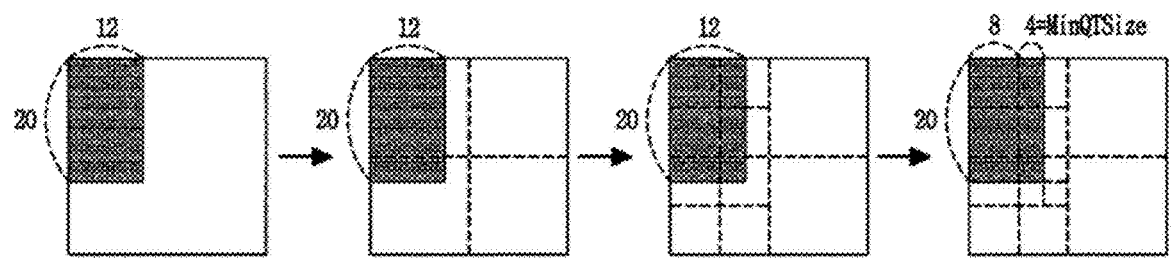
FIG. 8 is a diagram showing an example in which quad-tree splitting is performed on a block adjacent to a picture edge.

FIG. 8 is a diagram showing an example in which quad-tree splitting is performed on a block adjacent to both of a right edge and a lower edge of a picture. For convenience of description, it is assumed that the minimum quad-tree splitting size is 4×4.

In the example shown in FIG. 8, when quad-tree splitting is performed on a 32×32 block including a 12×20 block, four 16×16 blocks are generated. Among the generated blocks, quad-tree splitting may be performed again on two 16×16 blocks including texture data. As a result, the x-coordinate and the y-coordinate may deviate from the picture edge, and an 8×8 block including texture data with a size of 4×4 may be generated. Since the width and height of the 8×8 block are greater than the minimum quad-tree splitting size, quad-tree splitting may be performed on the corresponding block.

When quad-tree splitting is performed on a 12×20 block, the 12×20 block may be split into a 12×16 block and a 12×4 block. When quad-tree splitting is performed again on the blocks, the 12×16 block is split into two 8×8 blocks and two 4×8 blocks, and the 12×4 block is split into an 8×4 block and a 4×4 block.

Since the width of a 4×8 block located at the picture edge is equal to the minimum quad-tree splitting size, binary-tree splitting may be performed on the 4×8 block. In detail, vertical binary-tree splitting may be performed on the basis of a square block (i.e., 8×8) including a 4×8 block.

Also, since the width of an 8×4 block located at the picture edge is equal to the minimum quad-tree splitting size, binary-tree splitting may be performed on the 8×4 block. In detail, horizontal binary-tree splitting may be performed on the basis of a square block (i.e., 8×8) including a 4×8 block.

As a result of the splitting, the 8×4 block, the 4×4 block, and the 4×8 block may be located adjacent to the picture edge.

Alternatively, when at least one of the width or height of a block is smaller than or equal to a threshold value, binary tree splitting may be performed. Otherwise, quad-tree splitting may be performed. Here, the threshold value may be derived on the basis of the minimum quad-tree splitting size. As an example, when the minimum quad-tree splitting size is minQTsize, the threshold value may be set to "minQTsize<<1." Alternatively, information for determining the threshold value may be separately signaled in a bitstream.

Figure 9:
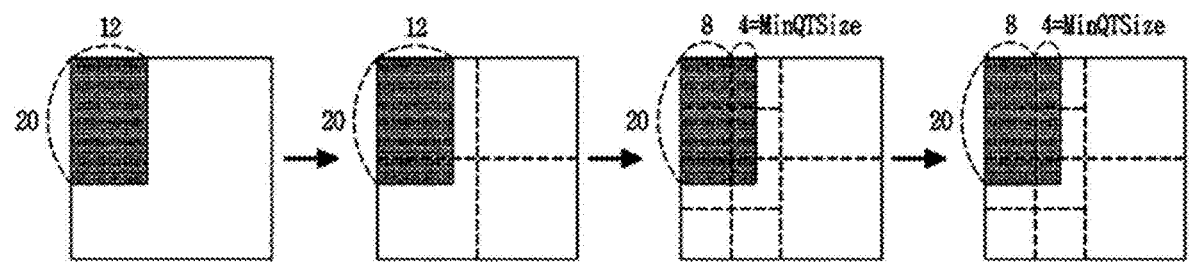
FIG. 9 is a diagram showing a splitting aspect of a block adjacent to a picture edge.

FIG. 9 is a diagram showing a splitting aspect of a block adjacent to a picture edge. For convenience of description, it is assumed that the minimum quad-tree splitting size is 4×4. The threshold value may be set to 8.

First, quad-tree splitting may be performed on the 12×20 block. As a result, the block may be split into a 12×16 block and a 12×4 block. Since the width and height of the 12×16 block is larger than a threshold value, quad-tree splitting may be applied to the block. Accordingly, the block may be split into two 8×8 blocks and two 4×8 blocks.

The width of the 12×4 block is greater than a threshold value. Accordingly, quad-tree splitting may be applied to the 12×4 block. As a result, the block may be split into an 8×4 block and a 4×4 block.

Subsequently, since the widths and heights of the 4×8 block and the 8×4 block located at the picture edge are smaller than or equal to the threshold value, binary-tree splitting may be applied to the blocks.

Unlike the above example, when at least one of the width or height of a block is greater than the threshold value, binary tree splitting may be performed. Otherwise, quad-tree splitting may be performed.

Alternatively, only quad-tree splitting or binary tree splitting may be applied to an atypical boundary edge block. As an example, quad-tree splitting may be repeated until a block located at a picture edge has the minimum size, or binary-tree splitting may be repeated until a block located at a picture edge has the minimum size.

An atypical boundary edge block may be defined as a coding unit. A skip mode may be fixedly applied to an atypical boundary edge block, or all transform coefficients may set to 0. Thus, the value of a coded block flag (CBF) indicating whether the atypical boundary edge block has non-zero transform coefficients may be set to 0. A coding unit coded in the skip mode or a coding unit having a transform coefficient set to 0 may be referred to as a boundary zero coding unit.

Alternatively, by comparing at least one of the width or height of a coding block generated by splitting the atypical boundary edge block to the threshold value, whether to set the corresponding coding unit as the boundary zero coding unit may be determined. As an example, a coding block in which at least one of the width or height of the coding block is smaller than the threshold value may be coded in the skip mode, or the transform coefficients may be set to 0.

Figure 10:
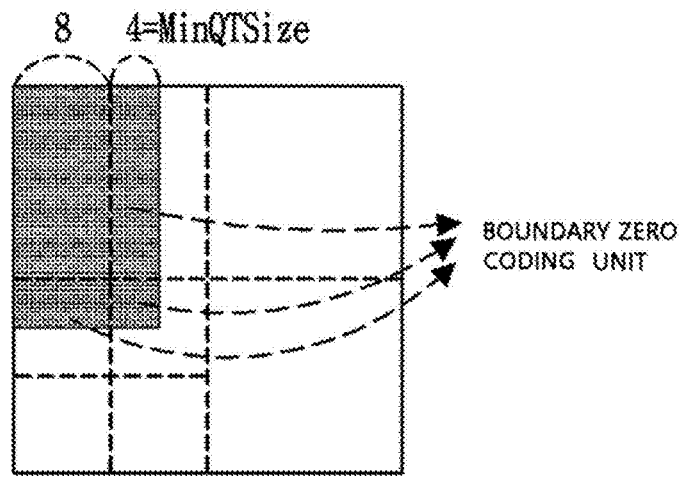
FIG. 10 is a diagram showing a coding aspect of a block adjacent to a picture edge.

FIG. 10 is a diagram showing a coding aspect of a block adjacent to a picture border. It is assumed that the threshold value is 8.

A coding block in which at least one of the width or height is smaller than the threshold value among the coding blocks generated by splitting the atypical boundary edge block may be set as the boundary zero coding unit.

As an example, in the example shown in FIG. 10, the 4×16 coding block, the 8×4 coding block, and the 4×4 coding block may be set as boundary zero coding units. Accordingly, the blocks may be coded in the skip mode, or the transform coefficients of the blocks may be set to 0.

Whether the skip mode or the transform coefficient is set to 0 may be selectively applied to a coding block having a width and height greater than or equal to a threshold value. To this end, a flag indicating whether the skip mode is applied to the coding block or a flag indicating whether the transform coefficient is set to 0 may be coded and signaled.

Alternatively, only coding units generated by binary tree splitting may be allowed to be set as boundary zero coding units. Alternatively, only coding units generated by quadtree splitting may be allowed to be set as boundary zero coding units.

Inter-prediction is a prediction mode in which the current block is predicted using information on the preceding picture. As an example, a block included in the preceding picture and placed at the same location as that of the current block (hereinafter referred to as a collocated block) may be set as a prediction block of the current block. A prediction block generated based on a block placed at the same location as that of the current block will be referred to as a collocated prediction block.

Meanwhile, when an object present in the preceding picture is moved to a different location in the current picture, the current block may be effectively predicted using the movement of the object. For example, when the movement direction and the size of the object can be found by comparing the preceding picture to the current picture, a prediction block (or a prediction picture) of the current block may be generated in consideration of movement information of the object. Hereinafter, the prediction block generated using the movement information may be referred to as a movement prediction block.

A residual block may be generated by subtracting the prediction block from the current block. At this time, when the movement of the object is present, it is possible to reduce the energy of the residual block, and accordingly it is possible to improve the compression performance of the residual block by using a movement prediction block instead of the collocated prediction block.

As described above, generating a prediction block using movement information may be referred to as movement compensation prediction. In the inter-prediction, a prediction block may usually be generated based on the movement compensation prediction.

The movement information may include at least one of a movement vector, a reference picture index, a prediction direction, or a bidirectional weight index. The movement vector indicates the movement direction and size of the object. The reference picture index specifies a reference picture of the current block among reference pictures included in a reference picture list. The prediction direction indicates one of unidirectional L0 prediction, unidirectional L1 prediction, or bidirectional prediction (L0 prediction and L1 prediction). At least one of L0 direction movement information or L1 direction movement information may be used depending on the prediction direction of the current block. The bidirectional weight index specifies a weight applied to an L0 prediction block and a weight applied to an L1 prediction block.

Figure 11:
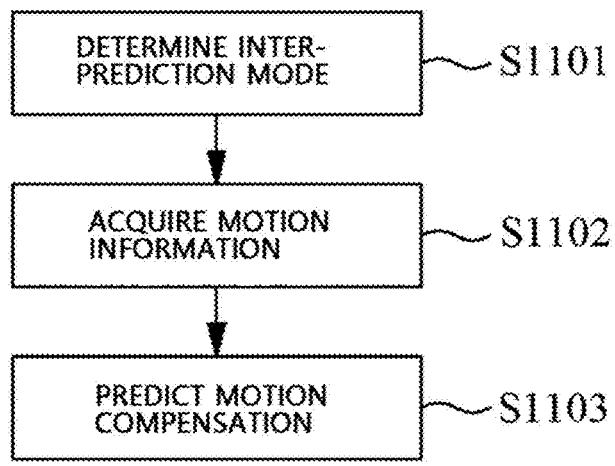
FIG. 11 is a flowchart of an inter-prediction method according to an embodiment of the present disclosure.

FIG. 11 is a flowchart of an inter-prediction method according to an embodiment of the present disclosure.

Referring to FIG. 11, the inter-prediction method includes determining an inter-prediction mode of the current block (S1101), acquiring movement information of the current block according to the determined inter-prediction mode (S1102), and performing movement compensation prediction on the current block on the basis of the acquired movement information (S1103).

Here, the inter-prediction mode, which represents various techniques to determine the movement information of the current block, may include an inter-prediction mode using translation movement information and an inter-prediction mode using affine movement information. As an example, the inter-prediction mode using translation movement information may include a merge mode and a movement vector prediction mode, and the inter-prediction mode using affine movement information may include an affine merge mode and an affine movement vector prediction mode. The movement information of the current block may be determined on the basis of the information parsed from the bitstream or the blocks neighboring the current block according to the inter-prediction mode.

The inter-prediction method using translation movement information will be described in detail below.

The movement information of the current block may be derived from movement information of a block other than the current block. Here, the other block may be a block that is encoded or decoded through inter-prediction earlier than the current block. Setting the movement information of the current block to be the same as the movement information of the other block may be defined as a merge mode. Also, setting the movement vector of the other block as a prediction value of the movement vector of the current block may be defined as a movement vector prediction mode.

Figure 12:
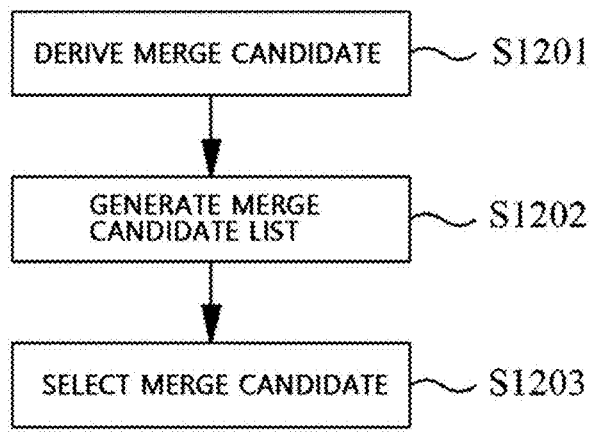
FIG. 12 is a flowchart of a process of deriving movement information of the current block in a merge mode.

FIG. 12 is a flowchart of a process of deriving movement information of the current block in a merge mode.

A merge candidate of the current block may be derived (S1201). The merge candidate of the current block may be derived from a block that is encoded or decoded through inter-prediction earlier than the current block.

Figure 13:
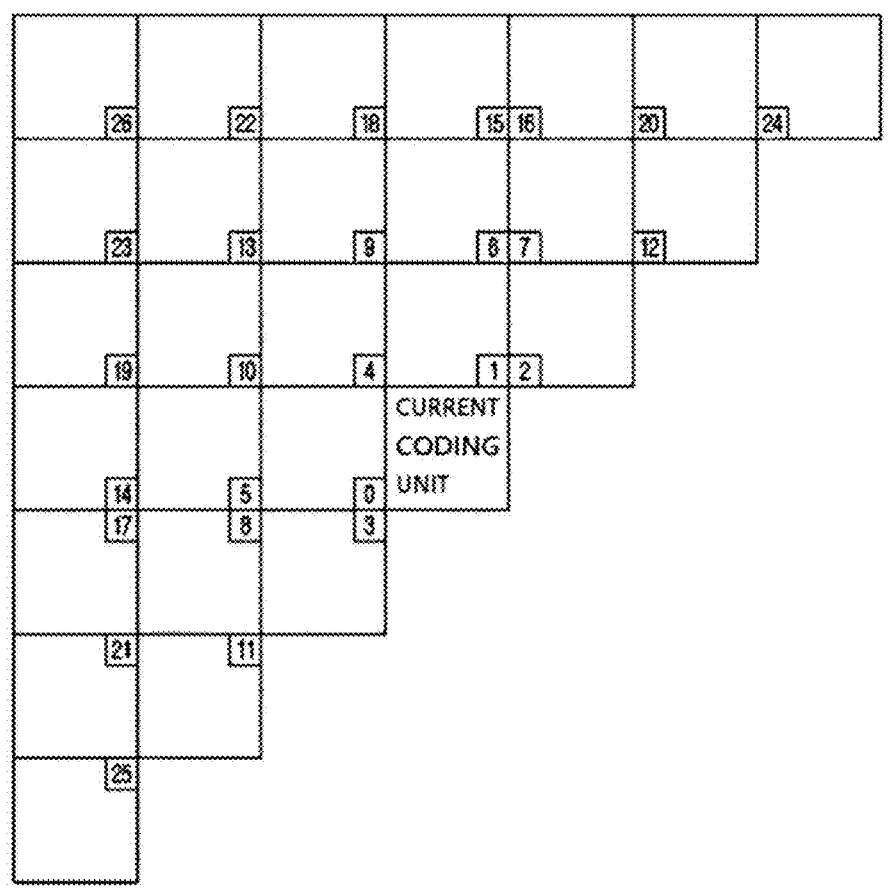
FIG. 13 is a diagram illustrating candidate blocks used to derive a merge candidate.

FIG. 13 is a diagram illustrating candidate blocks used to derive a merge candidate.

The candidate blocks may include at least one of neighboring blocks including a sample adjacent to the current block or non-neighboring blocks including a sample not adjacent to the current block. Hereinafter, samples for determining candidate blocks are defined as reference samples. Also, a reference sample adjacent to the current block will be referred to as a neighboring reference sample, and a reference sample not adjacent to the current block will be referred to as a non-neighboring reference sample.

The neighboring reference sample may be included in a column neighboring the leftmost column of the current block or a row neighboring the top row of the current block. As an example, when the coordinates of the upper-left sample of the current block are (0, 0), at least one of a block including a reference sample located at $(-1, H-1)$, a block including a reference sample located at $(W-1, -1)$, a block including a reference sample located at $(W, -1)$, a block including a reference sample located at $(-1, H)$, or a block including a reference sample located at $(-1, -1)$ may be used as a candidate block. Referring to the drawing, neighboring blocks with indices of 0 to 4 may be used as candidate blocks.

A non-neighboring reference sample indicates a sample in which at least one of an x-axis distance or a y-axis distance from the reference sample adjacent to the current block has a predefined value. As an example, at least one of a block including a reference sample in which an x-axis distance from a left reference sample has a predefined value, a block including a non-neighboring sample in which a y-axis distance from an upper reference sample has a predefined value, or a block including a non-neighboring sample in which an x-axis distance and a y-axis distance from an upper-left reference sample have a predefined value may be used as a candidate block. The predefined value may be a natural number such as 4, 8, 12, and 16. Referring to the drawing, at least one of the blocks with indices of 5 to 26 may be used as a candidate block.

A sample not located on the same vertical line, horizontal line, or diagonal line as that of a neighboring reference sample may be set as a non-neighboring reference sample.

Figure 14:
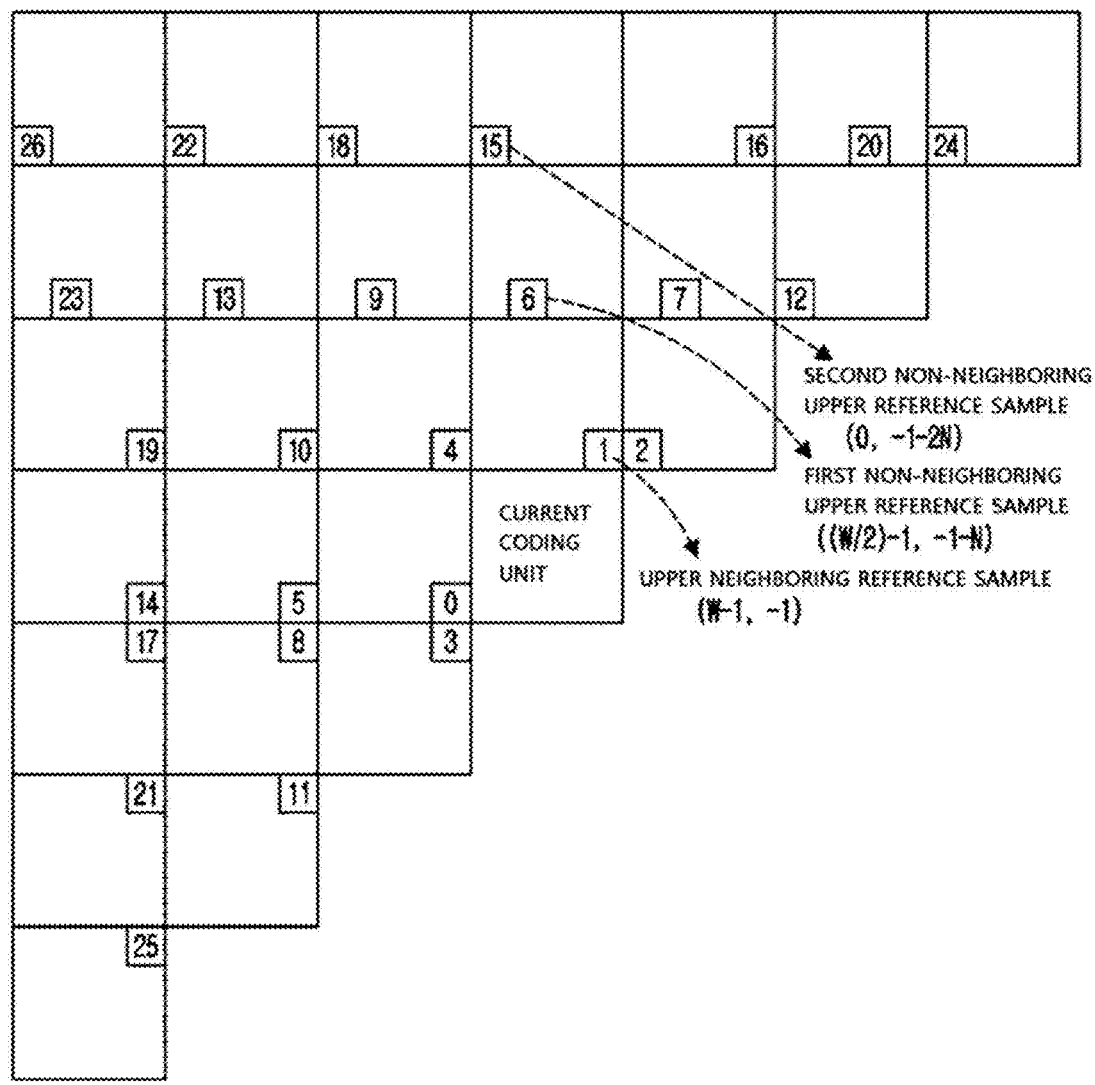
FIG. 14 is a diagram showing the locations of reference samples.

FIG. 14 is a diagram showing the locations of reference samples.

As in the example shown in FIG. 14, the x-coordinates of upper non-neighboring reference samples may be set to be different from the x-coordinates of upper neighboring reference samples. As an example, when the location of the upper neighboring reference sample is (W−1, −1), the location of the upper non-neighboring reference sample spaced apart from the upper neighboring reference sample by N in the y-axis is set to ((W/2)−1, −1−N), and the location of the upper non-neighboring reference sample spaced apart from the upper neighboring reference sample in the y-axis by 2N may be set to (0, −1−2N). That is, the location of the non-adjacent reference sample may be determined on the basis of the location of the adjacent reference sample and a distance from the adjacent reference sample.

Hereinafter, among the candidate blocks, a candidate block including a neighboring reference sample will be referred to as a neighboring block, and a block including a non-neighboring reference sample will be referred to as a non-neighboring block.

When the distance between the current block and the candidate block is greater than or equal to a threshold value, the candidate block may be set to be unavailable as the merge candidate. The threshold value may be determined on the basis of the size of the coding tree unit. As an example, the threshold value may be set to the height of the coding tree unit (ctu_height) or the height of the coding tree unit plus or minus an offset (e.g., ctu_height±N). The offset N, which is a value predefined in an encoder or a decoder, may be set to 4, 8, 16, 32, or ctu_height.

When a distance between the y-coordinate of the current block and the y-coordinate of a sample included in the candidate block is greater than the threshold value, it may be determined that the candidate block is not available as a merge candidate.

Alternatively, a candidate block that does not belong to the same coding tree unit as the current block may be set to be unavailable as the merge candidate. As an example, when the reference sample deviates from the upper edge of the coding tree unit to which the current block belongs, the candidate block including the reference sample may be set to be unavailable as a merge candidate.

When the upper edge of the current block is adjacent to the upper edge of the coding tree unit, it may be determined that a plurality of candidate blocks are not available as merge candidates, and encoding or decoding efficiency of the current block may be reduced. In order to solve such a problem, candidate blocks may be set such that the number of candidate blocks located to the left of the current block is greater than the number of candidate blocks located above the current block.

Figure 15:
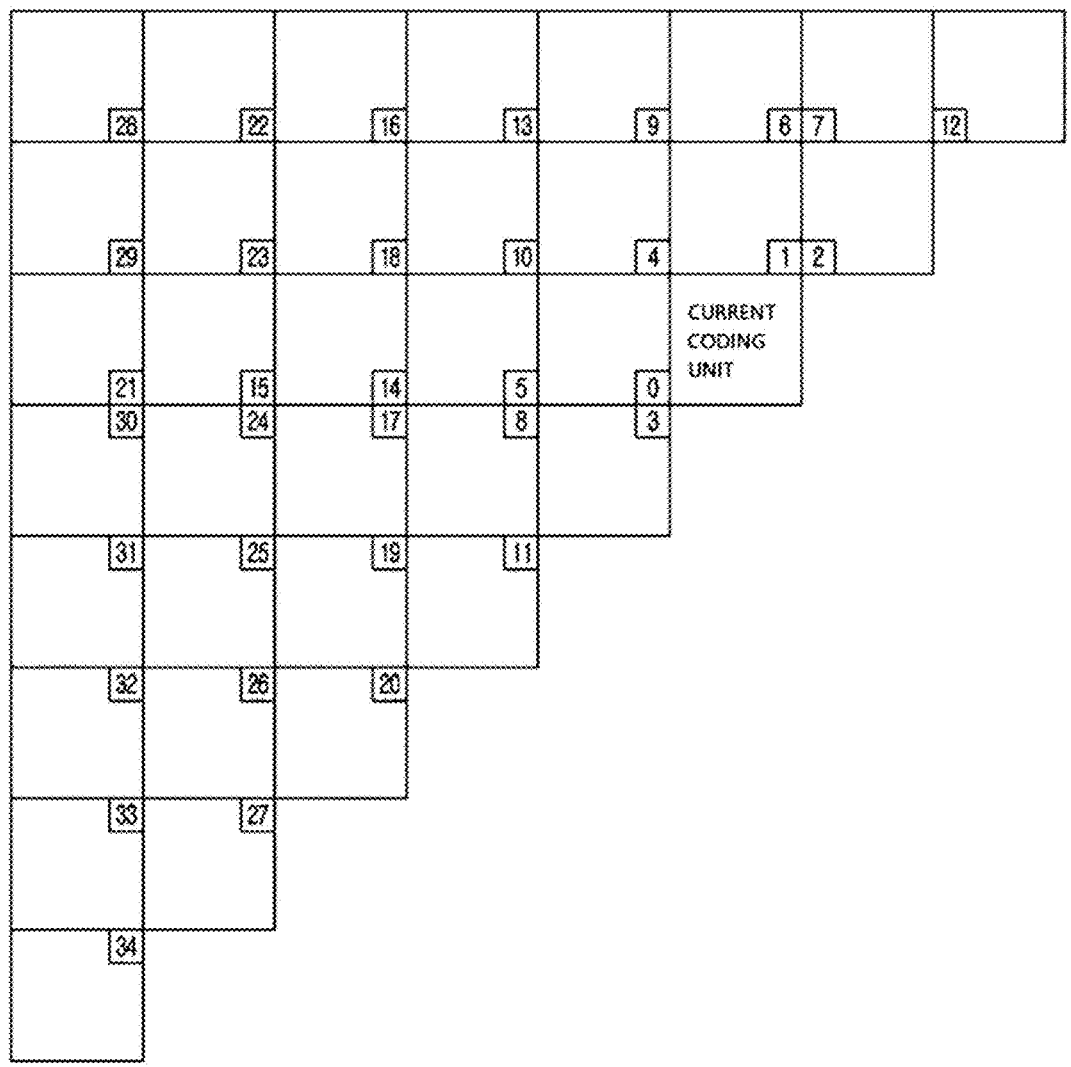
FIG. 15 is a diagram illustrating candidate blocks used to derive a merge candidate.

FIG. 15 is a diagram illustrating candidate blocks used to derive a merge candidate.

As in the example shown in FIG. 15, upper blocks belonging to N upper block columns of the current block and left blocks belonging to M left block columns of the current block may be set as candidate blocks. In this case, by setting M to be greater than N, the number of left candidate blocks may be set to be greater than the number of upper candidate blocks.

As an example, a setting may be made such that a difference between the y-coordinate of the reference sample in the current block and the y-coordinate of an upper block available as a candidate block does not exceed N times the height of the current block. Also, a setting may be made such that a difference between the x-coordinate of the reference sample in the current block and the x-coordinate of a left block available as a candidate block does not exceed M times the width of the current block.

As an example, it is shown in FIG. 15 that blocks belonging to two upper block columns of the current block and blocks belonging to five left block columns of the current block are set as candidate blocks.

As another example, when a candidate block does not belong to the sample coding tree unit as the current block, a merge candidate may be derived using a block belonging to the same coding tree unit as the current block or a block including a reference sample adjacent to an edge of the coding tree unit instead of the candidate block.

Figure 16:
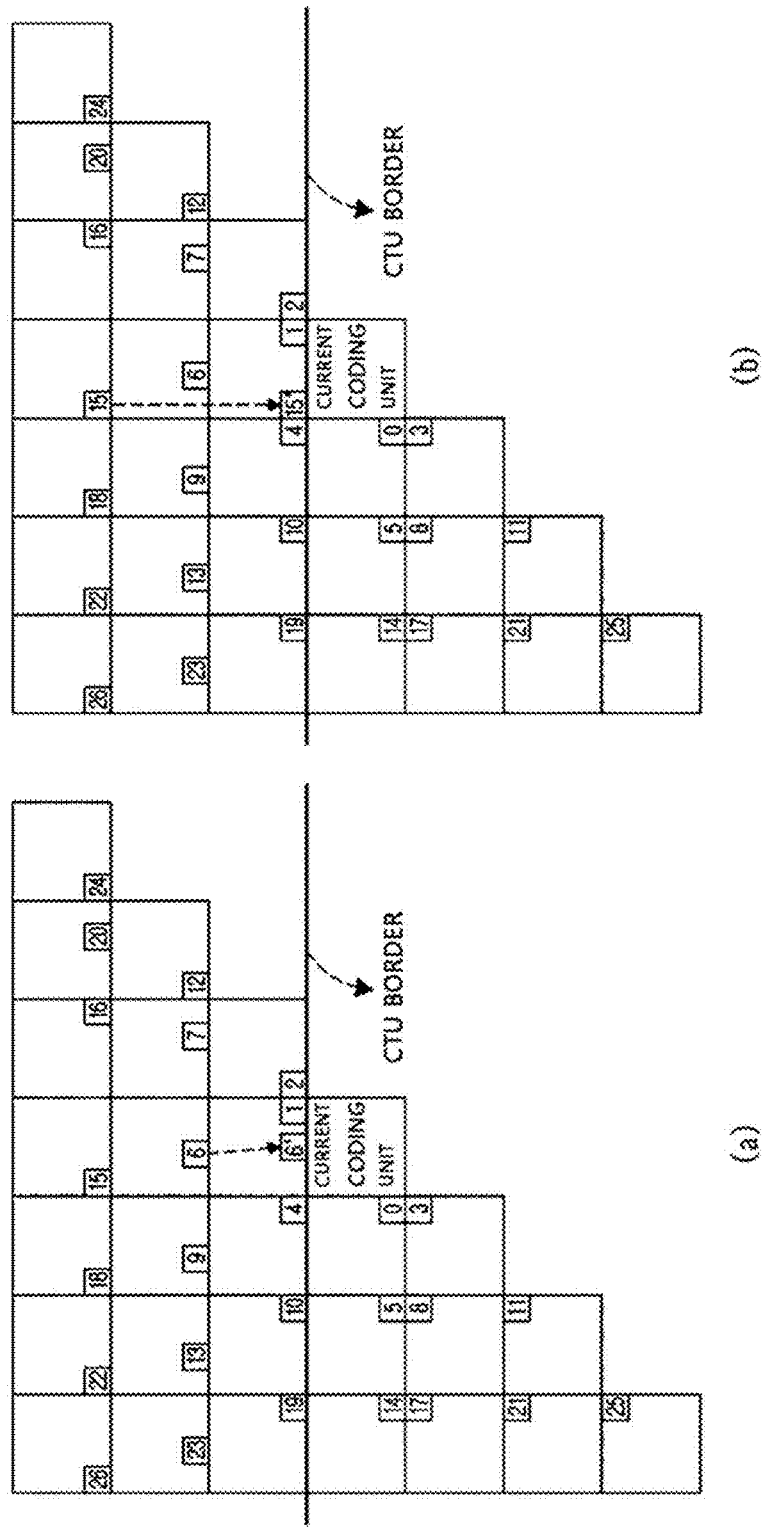
FIG. 16 is a diagram showing an example in which the location of a reference sample is changed.

FIG. 16 is a diagram showing an example in which the location of a reference sample is changed.

When the reference sample is included in a coding tree unit different from that of the current block and is not adjacent to the edge of the coding tree unit, a candidate block may be determined using a reference sample adjacent to the edge of the coding tree unit instead of the reference sample.

As an example, in the examples shown in FIGS. 16A and 16B, when an upper edge of the current block is contiguous to an upper edge of the coding tree unit, reference samples located above the current block belong to a coding tree unit different from that of the current block. A reference sample not adjacent to the upper edge of the coding tree unit among reference samples belonging to the coding tree unit different from that of the current block may be replaced with a sample adjacent to the upper edge of the coding tree unit.

For example, a reference sample at location #6 may be replaced with a sample at location #6' placed at the upper edge of the coding tree unit, as in the example shown in FIG. 16A, and a reference sample at location #15 may be replaced with a sample at location #15' placed at the upper edge of the coding tree unit, as in the example shown in FIG. 16B. In this case, the y-coordinate of the alternative sample may be changed to that of a location adjacent to the coding tree unit, and the x-coordinate of the alternative sample may be set to be the same as that of the reference sample. As an example, the sample at location #6' may have the same x-coordinate as the sample at location #6, and the sample at location #15' may have the same x-coordinate as the sample at location #15.

Alternatively, a value obtained by adding or subtracting an offset to or from the x-coordinate of the reference sample may be set as the x-coordinate of the alternative sample. As an example, when a non-neighboring reference sample and a neighboring reference sample located above the current block have the same x-coordinate, a value obtained by adding or subtracting an offset to or from the x-coordinate of the reference sample may be set as the x-coordinate of the alternative sample. This is to prevent the alternative sample replacing the non-neighboring reference sample from being placed at the same location as another non-neighboring reference sample or neighboring reference sample.

Figure 17:
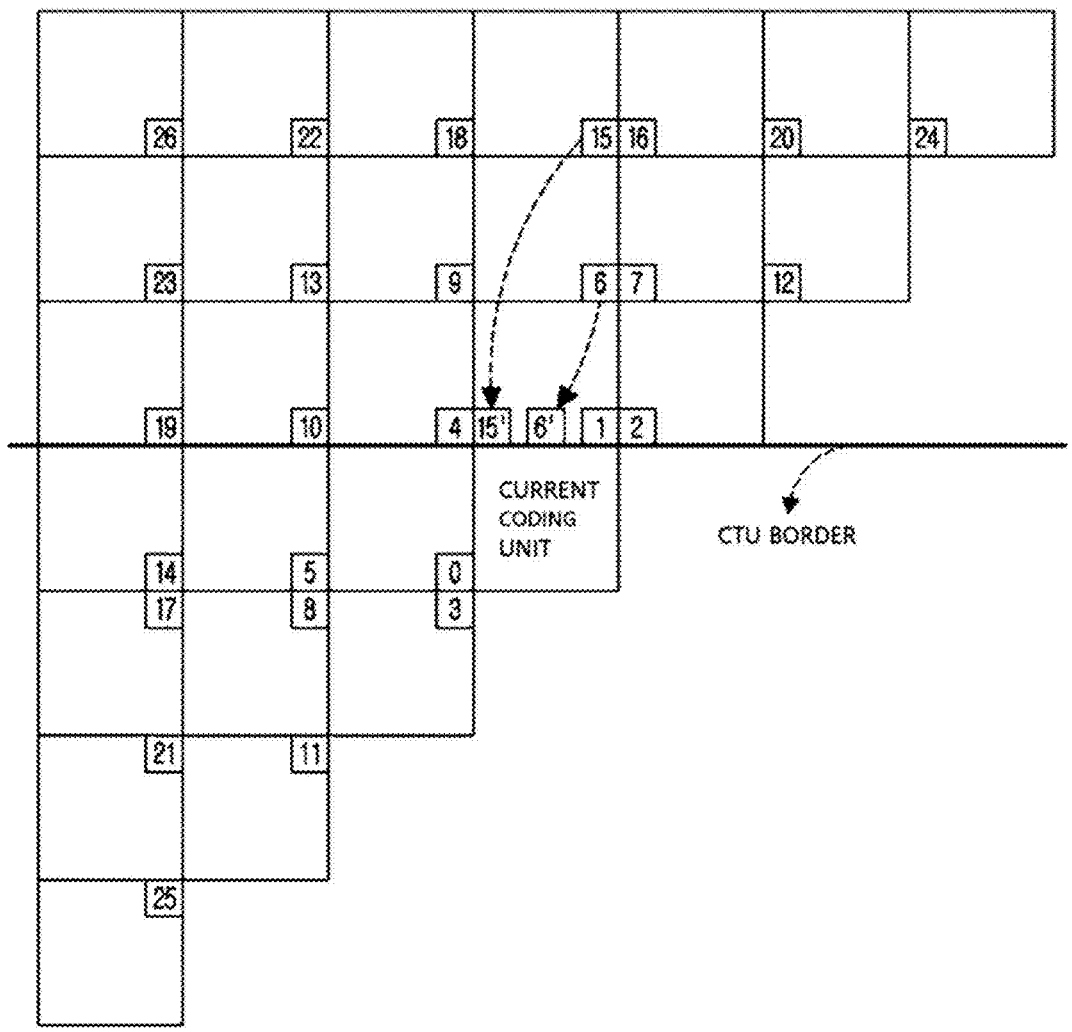
FIG. 17 is a diagram showing an example in which the location of a reference sample is changed.

FIG. 17 is a diagram showing an example in which the location of a reference sample is changed.

When a reference sample that is included in a coding tree unit different from that of the current block and that is not adjacent to an edge of the coding tree unit is replaced with a sample located at the edge of the coding tree unit, a value obtained by adding or subtracting an offset to or from the x-coordinate of the reference sample may be set as the x-coordinate of the alternative sample.

As an example, in the example shown in FIG. 17, the reference sample at location #6 and the reference sample at location #15 may be replaced with the sample at location #6' and the sample at location #15', which have the same y-coordinate as a row adjacent to the upper edge of the coding tree unit. In this case, the x-coordinate of the sample at location #6' may be set to a value obtained by subtracting W/2 from the x-coordinate of the reference sample at location #6, and the x-coordinate of the sample at location #15' may be set to a value obtained by subtracting W−1 from the x-coordinate of the reference sample at location #15.

Unlike the examples shown in FIGS. 16 and 17, the y-coordinate of a row located above the top row of the current block or the y-coordinate of an upper edge of the coding tree unit may be set to the y-coordinate of the alternative sample.

Although not shown, a sample replacing the reference sample may be determined on the basis of a left edge of the coding tree unit. As an example, when a reference sample is not included in the same coding tree unit as that of the current block and is not adjacent to the left edge of the coding tree unit, the reference sample may be replaced with a sample adjacent to the left edge of the coding tree unit. In this case, the alternative sample may have the same y-coordinate as the reference sample and may have a y-coordinate acquired by adding or subtracting an offset to or from the y-coordinate of the reference sample.

Subsequently, a block including the alternative sample may be set as a candidate block, and a merge candidate of the current block may be derived on the basis of the candidate block.

A merge candidate may be derived from a temporal neighboring block included in a picture different from that of the current block. As an example, a merge candidate may be derived from a collocated block included in a collocated picture.

The movement information of the merge candidate may be set to be the same as the movement information of the candidate block. As an example, at least one of the movement vector, reference picture index, prediction direction, or bidirectional weight index of the candidate block may be set as the movement information of the merge candidate.

A merge candidate list including merge candidates may be generated (S1202). The merge candidates may be classified into adjacent merge candidates derived from neighboring blocks adjacent to the current block and non-adjacent merge candidates derived from non-neighboring blocks.

Indices may be assigned to the merge candidates of the merge candidate list in a predetermined order. As an example, an index assigned to an adjacent merge candidate may have a smaller value than an index assigned to a non-adjacent merge candidate. Alternatively, an index may be assigned to each of the merge candidates on the basis of the indices of the blocks shown in FIG. 13 or 15.

When a plurality of merge candidates are included in the merge candidate, at least one of the plurality of merge candidates may be selected (S1203). In this case, information indicating whether the movement information of the current block is derived from the adjacent merge candidate may be signaled in a bitstream. The information may be a 1-bit flag. As an example, syntax element isAdjancent-MergeFlag, which indicates whether the movement information of the current block is derived from the adjacent merge candidate, may be signaled in a bitstream. When the value of syntax element isAdjancentMergeFlag is 1, the movement information of the current block may be derived on the basis of the adjacent merge candidate. On the other hand, when the value of syntax element isAdjancent-MergeFlag is 0, the movement information of the current block may be derived on the basis of the non-adjacent merge candidate.

Table 1 represents a syntax table including syntax element isAdjancentMergeFlag.

TABLE 1

| coding_unit( x0, y0, cbWidth, cbHeight, treeType ) { | Descriptor |
|---|---|
|   if( slice_type != I) { | |
|     pred_mode_flag | ae(v) |
|   } | |
|   if( CuPredMode[ x0 ][ y0 ] = = MODE_INTRA ) { | |
|     if( treeType = = SINGLE_TREE \| \| treeType = = DUAL_TREE_LUMA ) { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \| \| treeType = = DUAL_TREE_CHROMA ) | |
|       intra_chroma_pred_mode[ x0 ][ y0 ] | ae(v) |
|   } else { | |
|     if (cu_skip_falg[x0][y0]) { | |
|       if (MaxNumMergeCand > 1){ | |
|         isAdjacentMergeflag | ae(v) |
|         if (isAdjcanetMergeflag){ | |
|           merge_idx[x0][y0] | ae(v) |
|         } else{ | |
|           NA_merge_idx[x0][y0] | ae(v) |
|         } | |
|       } | |
|     } else {/* MODE_INTER*/ | |
|       merge_flag[x0][y0] | ae(v) |
|       if (merge_flag[x0][y0]){ | |
|         if (MaxNumMergeCand > 1){ | |
|           isAdjacentMergeflag | ae(v) |
|           if (isAdjcanetMergeflag){ | |
|             merge_idx[x0][y0] | ae(v) |

TABLE 1-continued

```
        } else{
            NA_merge_idx[x0][y0]                                         ae(v)
        }
      }
    }
  }
  if( CuPredMode[ x0 ][ y0 ] != MODE_INTRA)
      cu_cbf                                                             ae(v)
  if( cu_cbf ) {
      transform tree( x0, y0, cbWidth, cbHeight,treeType )
}
```

Information for specifying one of a plurality of merge candidates may be signaled in a bitstream. As an example, information indicating an index of one of the merge candidates included in the merge candidate list may be signaled in a bitstream.

When isAdjacentMergeflag is 1, syntax element merge_idx, which is for specifying one of the adjacent merge candidates, may be signaled. The maximum value of syntax element merge_idx may be set to a value obtained by subtracting one from the number of adjacent merge candidates.

When isAdjacentMergeflag is 0, syntax element NA_merge_idx, which is for specifying one of the non-adjacent merge candidates, may be signaled. Syntax element NA_merge_idx represents a value obtained by subtracting the number of adjacent merge candidates from the index of the non-adjacent merge candidate. The decoder may select a non-adjacent merge candidate by adding the number of adjacent merge candidates to an index specified by NA_merge_idx.

When the number of merge candidates included in the merge candidate list is smaller than the maximum value, a merge candidate included in an inter-region movement information table may be added to the merge candidate list. The inter-region movement information table may include a merge candidate derived on the basis of a block that is encoded or decoded earlier than the current block.

The inter-region movement information table includes a merge candidate derived from a block that is encoded or decoded on the basis of inter-prediction in the current picture. As an example, the movement information of the merge candidate included in the inter-region movement information table may be set to be the same as the movement information of the block encoded or decoded on the basis of the inter-prediction. Here, the movement information may include at least one of a movement vector, a reference picture index, a prediction direction, or a bidirectional weight index.

For convenience of description, the merge candidate included in the inter-region movement information table will be referred to as an inter-region merge candidate.

The maximum number of merge candidates that can be included in the inter-region movement information table may be pre-defined in an encoder and a decoder. As an example, the maximum number of merge candidates that can be included in the inter-region movement information table may be 1, 2, 3, 4, 5, 6, 7, 8, or more (e.g., 16).

Alternatively, information indicating the maximum number of merge candidates of the inter-region movement information table may be signaled in a bitstream. The information may be signaled at the sequence, picture, or slice level.

Alternatively, the maximum number of merge candidates of the inter-region movement information table may be determined depending on the size of the picture, the size of the slice, or the size of the coding tree unit.

The inter-region movement information table may be initialized in units of pictures, slices, bricks, coding tree units, or coding tree unit lines (rows and columns). As an example, when a slice is initialized, the inter-region movement information table is also initialized and may include no merge candidate.

Alternatively, information indicating whether to initialize the inter-region movement information table may be signaled in a bitstream. The information may be signaled at the slice, tile, brick, or block level. A pre-configured inter-region movement information table may be used until the information indicates the initialization of the inter-region movement information table.

Alternatively, information regarding an initial inter-region merge candidate may be signaled through a picture parameter set or a slice header. Even though a slice is initialized, the inter-region movement information table may include the initial inter-region merge candidate. Accordingly, the inter-region merge candidate may be used for a block that is to be encoded or decoded first in the slice.

Blocks may be encoded or decoded in an encoding or decoding order, and blocks encoded or decoded on the basis of inter-prediction may be sequentially set as the inter-region merge candidates in the encoding or decoding order.

Figure 18:
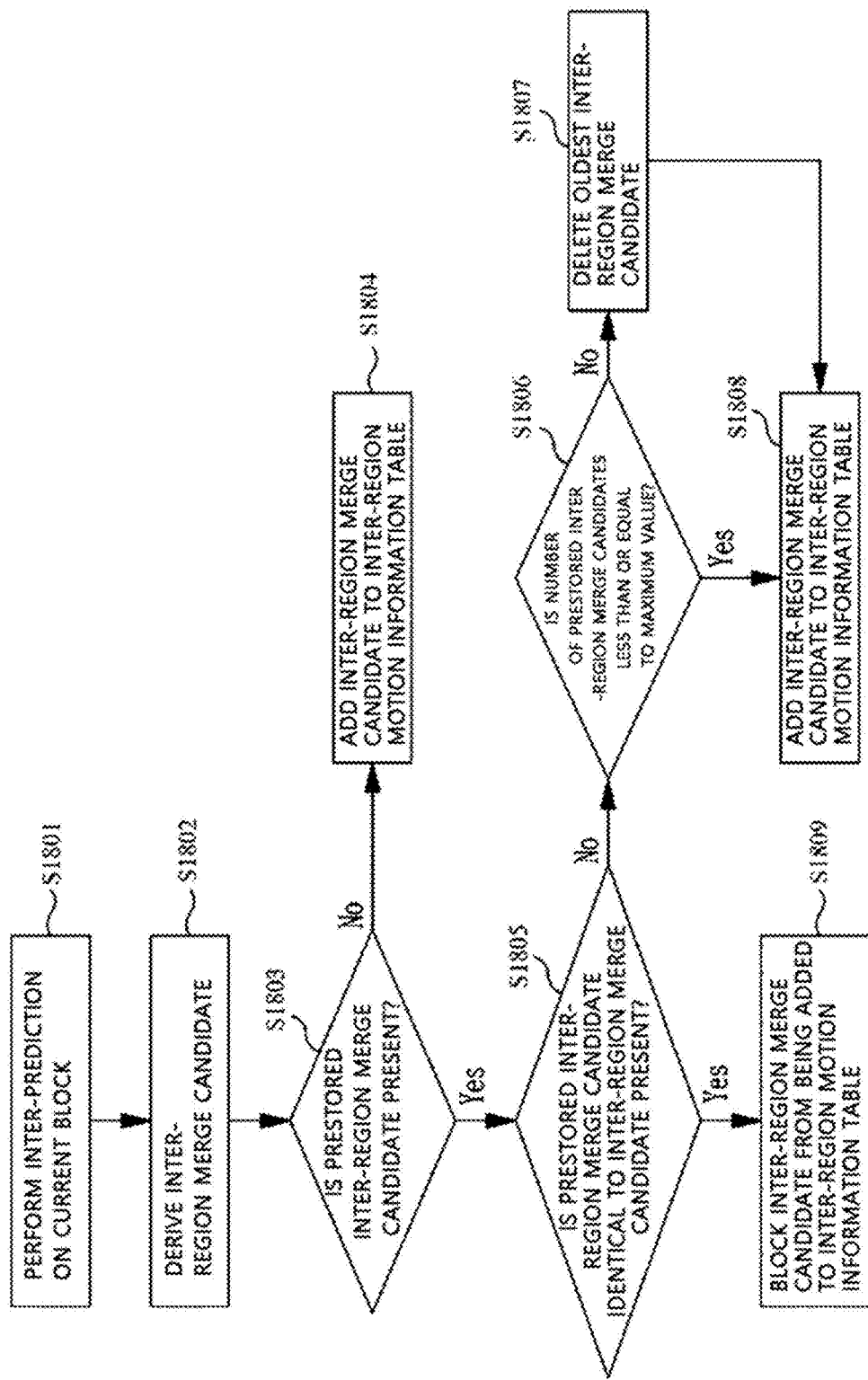
FIG. 18 is a diagram for describing an update aspect of an inter-region movement information table.

FIG. 18 is a diagram for describing an update aspect of an inter-region movement information table.

When inter-prediction is performed on the current block (S1801), an inter-region merge candidate may be derived on the basis of the current block (S1802). The movement information of the inter-region merge candidate may be set to be the same as the movement information of the current block.

When the inter-region movement information table is empty (S1803), the inter-region merge candidate derived on the basis of the current block may be added to the inter-region movement information table (S1804).

When the inter-region movement information table already includes an inter-region merge candidate (S1803), a redundancy check may be performed on the movement information of the current block (or an inter-region merge candidate derived on the basis of the movement information) (S1805). The redundancy check is to determine whether the movement information of the current block is the same as the movement information of the inter-region merge candidate prestored in the inter-region movement information table. The redundancy check may be performed on all inter-region merge candidates prestored in the inter-region movement information table. Alternatively, the redundancy check may be performed on inter-region merge candidates with indices greater than or equal to a threshold value or indices less than or equal to a threshold value among the inter-region merge candidates pre-stored in the inter-region movement information table.

When no inter-prediction merge candidate having the same movement information as the current block is included, the inter-region merge candidate derived on the basis of the current block may be added to the inter-region movement information table (S1808). Whether the inter-prediction merge candidates are identical may be determined on the basis of whether the inter-prediction merge candidates have the same movement information (e.g., movement vector and/or reference picture index).

In this case, when a maximum number of inter-region merge candidates are prestored in the inter-region movement information table (S1806), the oldest inter-region merge candidate is deleted (S1807), and the inter-region merge candidate derived on the basis of the current block may be added to the inter-region movement information table (S1808).

The inter-region merge candidates may be identified by their indices. When the inter-region merge candidate derived from the current block is added to the inter-region movement information table, the lowest index (e.g., 0) is assigned to the inter-region merge candidate, and the indices of the prestored inter-region merge candidates may be increased by one. In this case, when a maximum number of inter-prediction merge candidates are prestored in the inter-region movement information table, the inter-region merge candidate with the largest index is removed.

Alternatively, when the inter-region merge candidate derived from the current block is added to the inter-region movement information table, the largest index may be assigned to the inter-region merge candidate. As an example, when the number of inter-prediction merge candidates prestored in the inter-region movement information table is smaller than the maximum value, an index having the same value as the number of the prestored inter-prediction merge candidates may be assigned to the inter-region merge candidate. Alternatively, when the number of inter-prediction merge candidates prestored in the inter-region movement information table is equal to the maximum value, an index having the maximum value minus 1 may be assigned to the inter-region merge candidate. Also, the inter-region merge candidate with the smallest index is removed, and the indices of the other prestored inter-region merge candidates are decreased by 1.

Figure 19:
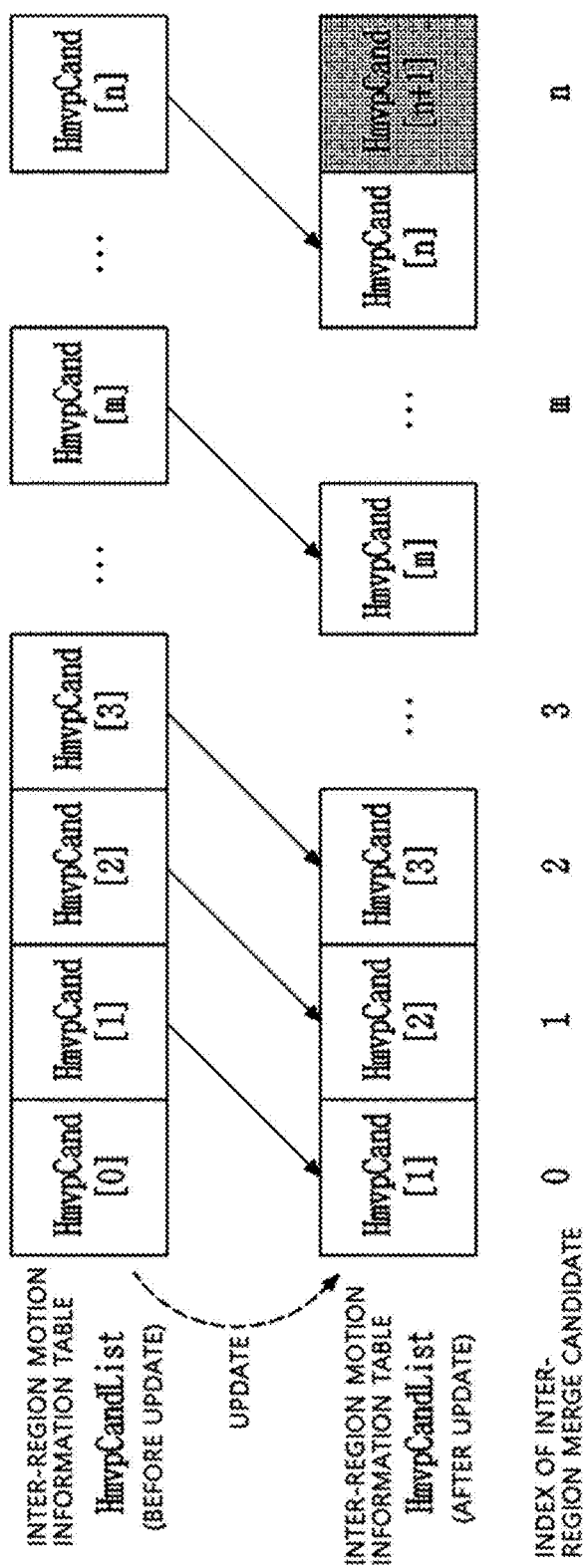
FIG. 19 is a diagram showing an update aspect of an inter-region merge candidate table.

FIG. 19 is a diagram showing an update aspect of an inter-region merge candidate table.

Since the inter-region merge candidate derived from the current block is added to the inter-region merge candidate table, it is assumed that the largest index is assigned to the inter-region merge candidate. Also, it is assumed that a maximum number of inter-region merge candidates are stored in the inter-region merge candidate table.

When an inter-region merge candidate HmvpCand[n+1], which is derived from the current block, is added to an inter-region merge candidate table HmvpCandList, an inter-region merge candidate HmvpCand[0], which has the smallest index among prestored inter-region merge candidates, may be deleted, and the indices of the other inter-region merge candidates may be decreased by 1. Also, the index of the inter-region merge candidate HmvpCand[n+1], which is derived from the current block, may be set as the maximum value (n in the example shown in FIG. 19).

When an inter-region merge candidate identical to the inter-region merge candidate derived on the basis of the current block is prestored (S1805), the inter-region merge candidate derived on the basis of the current block may not be added to the inter-region movement information table (S1809).

Alternatively, while the inter-region merge candidate derived on the basis of the current block is added to the inter-region movement information table, a prestored inter-region merge candidate identical to the inter-region merge candidate may be removed. This causes the same effect as updating the indices of the prestored inter-region merge candidates.

Figure 20:
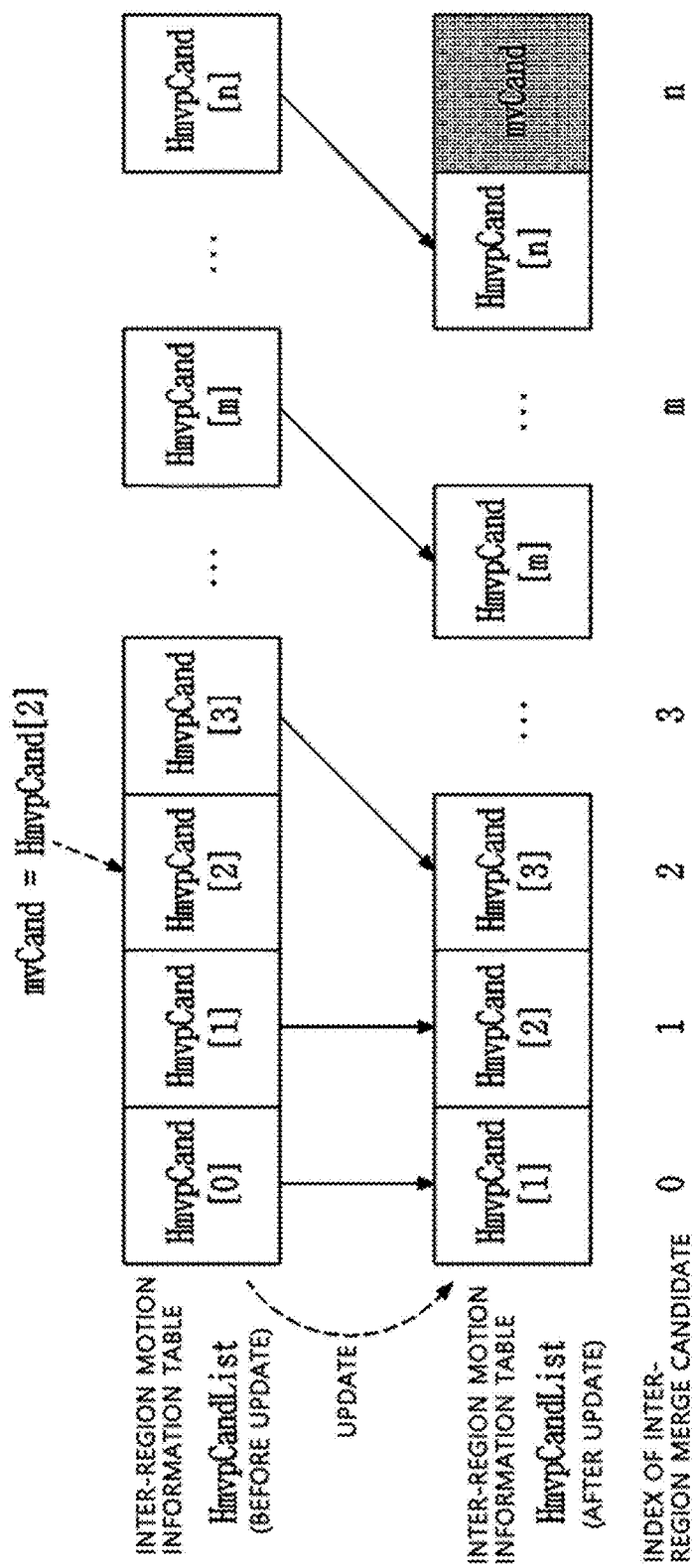
FIG. 20 is a diagram showing an example in which an index of a prestored inter-region merge candidate is updated.

FIG. 20 is a diagram showing an example in which an index of a prestored inter-region merge candidate is updated.

When the index of the prestored inter-prediction merge candidate identical to the inter-region merge candidate mvCand, which is derived on the basis of the current block, is hIdx, the prestored inter-prediction merge candidate may be deleted, and the indices of the inter-prediction merge candidates greater than hIdx may be decreased by 1. As an example, it is shown in FIG. 20 that HmvpCand[2], which is identical to mvCand, is deleted from the inter-region movement information table HvmpCandList, and that indices HmvpCand[3] to HmvpCand[n] are decreased by 1.

Also, the inter-region merge candidate mvCand, which is derived on the basis of the current block, may be added to the end of the inter-region movement information table.

Alternatively, the index assigned to the prestored inter-region merge candidate identical to the inter-region merge candidate derived on the basis of the current block may be updated. For example, the index of the prestored inter-region merge candidate may be changed to the minimum value or the maximum value.

A setting may be made such that the movement information of blocks included in a predetermined area is not added to the inter-region movement information table. As an example, an inter-region merge candidate derived on the basis of the movement information of a block included in a parallel merge area may not be added to the inter-region movement information table. Since an encoding or decoding order is not defined for blocks included in the parallel merge area, it is inappropriate to use the movement information of one of the blocks to perform inter-prediction on the other blocks. Accordingly, inter-region merge candidates derived on the basis of the blocks included in the parallel merge area may not be added to the inter-region movement information table.

When movement compensation prediction is performed in units of sub-blocks, an inter-region merge candidate may be derived on the basis of the movement information of a representative sub-block among the plurality of sub-blocks included in the current block. As an example, when a sub-block merge candidate is used for the current block, an inter-region merge candidate may be derived on the basis of the movement information of a representative sub-block among the sub-blocks.

The movement vectors of the sub-blocks may be derived in the following order. First, one merge candidate may be selected from among merge candidates included in a merge candidate list of the current block, and an initial shift vector shVector may be derived on the basis of the movement vector of the selected merge candidate. Then, a shift sub-block having a reference sample located at (xColSb, yColSb) may be derived by adding the initial shift vector to the location (xSb, ySb) of the reference sample (e.g., the upper-left sample or the middle sample) of each sub-block in the coding block. Equation 1 below indicates an equation for deriving the shift sub-block.

$$(x\text{ColSb}, y\text{ColSb}) = (x\text{Sb} + \text{shVector}[0] >> 4, y\text{Sb} + \text{shVector}[1] >> 4) \quad \text{[Equation 1]}$$

Then, the movement vector of the collocated block corresponding to the center position of the sub-block including (xColSb, yColSb) may be set as the movement vector of the sub-block including (xSb, ySb).

The representative sub-block may refer to a sub-block including the upper-left sample or the center sample of the current block.

Figure 21:
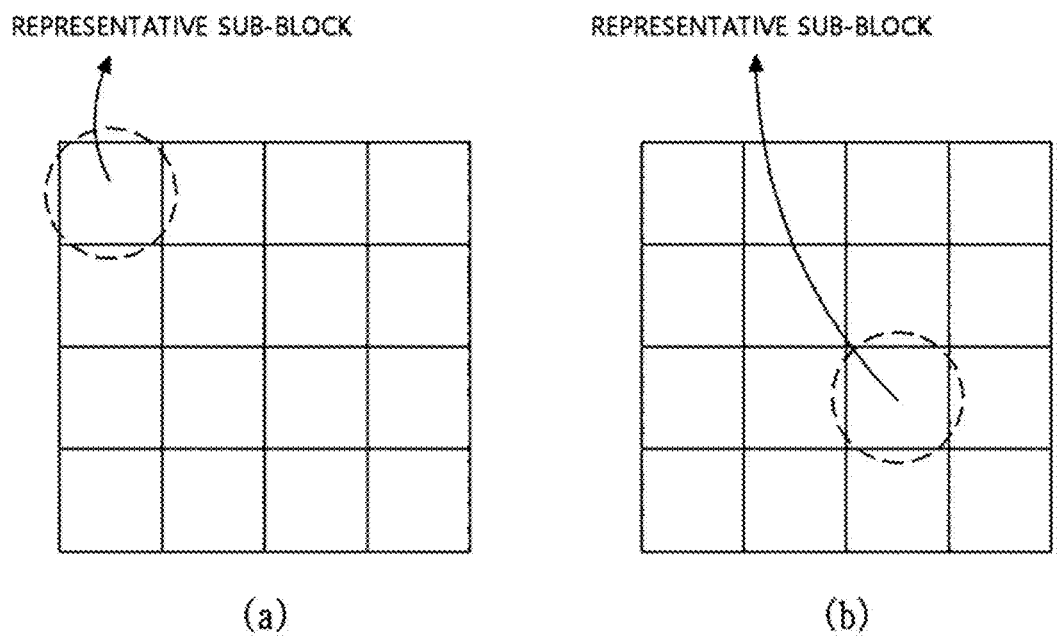
FIG. 21 is a diagram showing the location of a representative sub-block.

FIG. 21 is a diagram showing the location of a representative sub-block.

FIG. 21A shows an example in which a sub-block located on the upper-left corner of the current block, and FIG. 21B shows an example in which a sub-block located at the center of the current block is set as a representative sub-block. When movement compensation prediction is performed in units of sub-blocks, the inter-region merge candidate of the current block may be derived on the basis of the movement vector of a sub-block including the upper-left sample of the current block or a sub-block including the center sample of the current block.

Whether to use the current block as the inter-region merge candidate may also be determined on the basis of the inter-prediction mode of the current block. As an example, a block that is encoded or decoded on the basis of the affine movement model may be set to be unavailable as an inter-region merge candidate. Accordingly, though the current block is encoded or decoded through inter-prediction, the inter-prediction movement information table may not be updated on the basis of the current block when the inter-prediction mode of the current block is the affine prediction mode.

Alternatively, the inter-region merge candidate may be derived on the basis of the sub-block vector of at least one sub-block included in the block that is encoded or decoded on the basis of the affine movement model. As an example, the inter-region merge candidate may be derived using a sub-block located on the upper-left corner of the current block, a sub-block located at the center of the current block, or a sub-block located on the upper-right corner of the current block. Alternatively, the average of the sub-block vectors of the plurality of sub-blocks may be set as the movement vector of the inter-region merge candidate.

Alternatively, the inter-region merge candidate may be derived on the basis of the average of the affine seed vectors of the block that is encoded or decoded on the basis of the affine movement model. As an example, an average of at least one of the first affine seed vector, the second affine seed vector, or the third affine seed vector of the current block may be set as the movement vector of the inter-region merge candidate.

Alternatively, the inter-region movement information table may be configured for each inter-prediction mode. As an example, at least one of an inter-region movement information table for a block encoded or decoded with an intra-block copy, an inter-region movement information table for a block encoded or decoded on the basis of the translation movement model, or an inter-region movement information table for a block encoded or decoded on the basis of the affine movement model may be defined. One of the plurality of inter-region movement information tables may be selected according to the inter-prediction mode of the current block.

Figure 22:
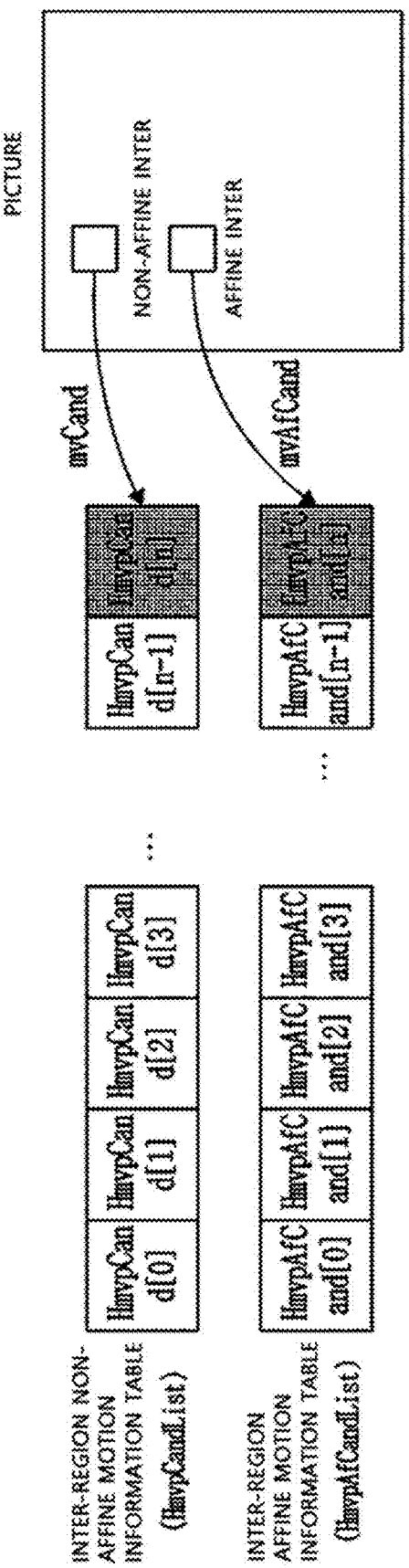
FIG. 22 shows an example in which an inter-region movement information table is generated for each inter-prediction mode.

FIG. 22 shows an example in which an inter-region movement information table is generated for each inter-prediction mode.

When a block is encoded or decoded on the basis of a non-affine movement model, an inter-region merge candidate mvCand, which is derived on the basis of the block, may be added to an inter-region non-affine movement information table HmvpCandList. On the other hand, when a block is encoded or decoded on the basis of an affine movement model, an inter-region merge candidate mvAfCand, which is derived on the basis of the block, may be added to an inter-region affine movement information table HmvpAfCandList.

The affine seed vectors of the block may be stored in an inter-region merge candidate derived from the block that is encoded or decoded on the basis of the affine movement model. Accordingly, the inter-region merge candidate may be used as a merge candidate for deriving the affine seed vector of the current block.

An additional inter-region movement information table may be defined in addition to the above-described inter-region movement information table. In addition to the above-described inter-region movement information table (hereinafter referred to as a first inter-region movement information table), a long-term movement information table (hereinafter referred to as a second inter-region movement information table) may be defined. Here, the long-term movement information table includes long-term merge candidates.

When both of the first inter-region movement information table and the second inter-region movement information table are empty, inter-region merge candidates may be preferentially added to the second inter-region movement information table. Until the number of inter-region merge candidates allowed for the second inter-region movement information table reaches the maximum number, inter-region merge candidates cannot be added to the first inter-region movement information table.

Alternatively, one inter-prediction merge candidate may be added to both of the first inter-region movement information table and the second inter-region movement information table.

In this case, the second inter-region movement information table where configuration is completed may no longer perform an update. Alternatively, when a decoded area is greater than or equal to a predetermined proportion of a slice, the second inter-region movement information table may be updated. Alternatively, the second inter-region movement information table may be updated every N coding tree unit lines.

On the other hand, the first inter-region movement information table may be updated whenever a block encoded or decoded through inter-prediction is generated. However, a setting may be made such that the inter-region merge candidates added to the second inter-region movement information table are not used to update the first inter-region movement information table.

Information for selecting one of the first inter-region movement information table or the second inter-region movement information table may be signaled in a bitstream. When the number of merge candidates included in the merge candidate list is smaller than the maximum value, the merge candidates included in the inter-region movement information table indicated by the information may be added to the merge candidate list.

Alternatively, an inter-region movement information table may be selected on the basis of the size, shape, or inter-prediction mode of the current block, the presence of bidirectional prediction, the presence of movement vector refinement, or the presence of triangular splitting.

Alternatively, when the number of merge candidates included in the merge candidate list is smaller than the maximum merge number even though the inter-region merge candidates included in the first inter-region movement information table are added to the merge candidate list, the inter-region merge candidates included in the second inter-region movement information table may be added to the merge candidate list.

Figure 23:
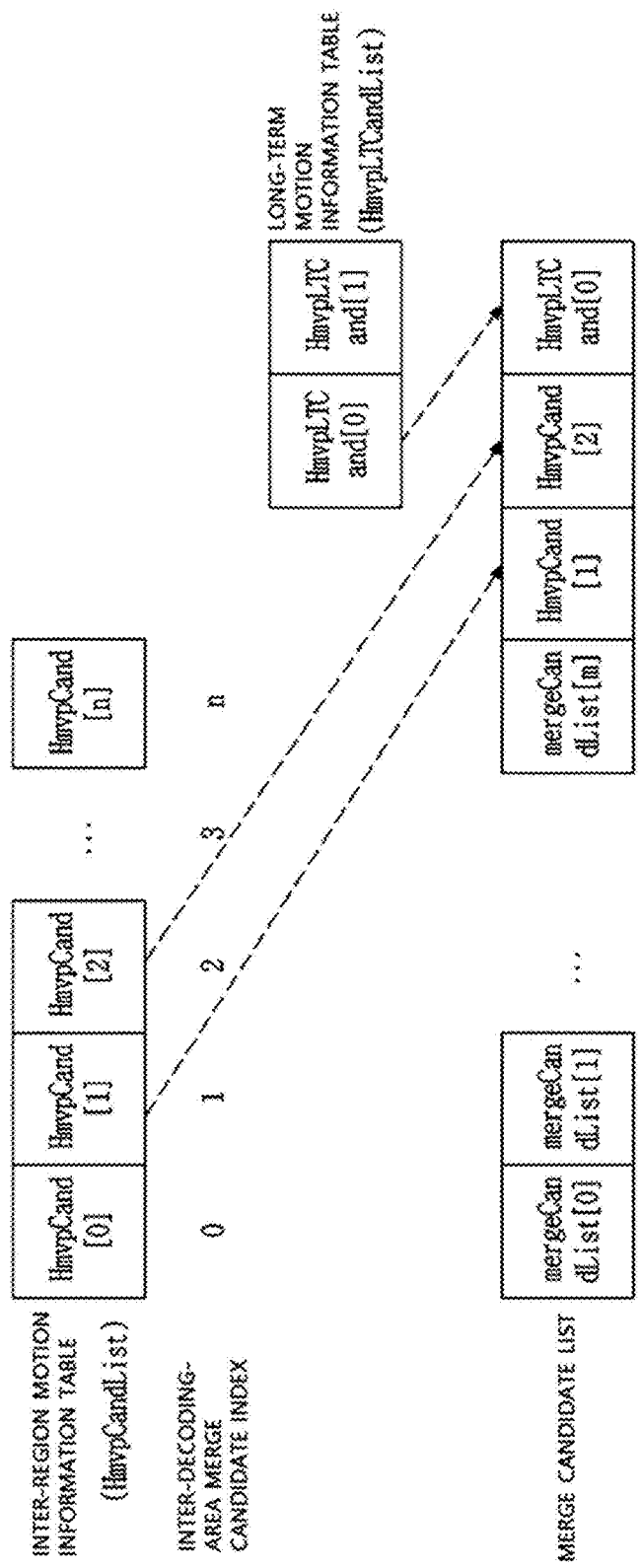
FIG. 23 is a diagram showing an example in which an inter-region merge candidate included in a long-term movement information table is added to a merge candidate list.

FIG. 23 is a diagram showing an example in which an inter-region merge candidate included in a long-term movement information table is added to a merge candidate list.

When the number of merge candidates included in the merge candidate list is smaller than the maximum number, the inter-region merge candidates included in the first inter-region movement information table HmvpCandList may be added to the merge candidate list. When the number of merge candidates included in the merge candidate list is smaller than the maximum number even though the inter-region merge candidates included in the first inter-region movement information table are added to the merge candidate list, the inter-region merge candidates included in the long-term movement information table HmvpLTCandList may be added to the merge candidate list.

Table 2 shows a process of adding the inter-region merge candidates included in the long-term movement information table to the merge candidate list.

TABLE 2

For each candidate in HMVPCandList with index HMVPLTIdx = 1..numHMVPLTCand, the following ordered steps are repeated until combStop is equal to true
- sameMovement is set to FALSE
- If hmvpStop is equal to FALSE and numCurrMergecand is less than (MaxNumMergeCand-1), hmvpLT is set to TRUE
- If HMVPLTCandList[NumLTHmvp-HMVPLTIdx] have the same movement vectors and the same reference indices with any mergeCandList[i] with I being 0.. numOrigMergeCand-1 and HasBeenPruned[i] equal to false, sameMovement is set to true
- If sameMovement is equal to false, mergeCandList[numCurrMergeCand++] is set to HMVPLTCandList[NumLTHmvp-HMVPLTIdx]
- If numCurrMergeCand is equal to (MaxNumMergeCand-1), hmvpLTStop is set to TRUE A setting may be made such that the inter-region merge candidate includes additional information as well as the movement information. As an example, the size, shape, or partition information of a block may be additionally stored for the inter-region merge candidate. When configuring the merge candidate list of the current block, only inter-prediction merge candidates having the same or similar size, shape, or partition information as the current block among the inter-prediction merge candidates may be used, or the inter-prediction merge candidates having the same or similar size, shape, or partition information as the current block may be preferentially added to the merge candidate list.

Alternatively, the inter-region movement information table may be generated for each size, shape, or piece of partition information of the block. The merge candidate list of the current block may be generated using an inter-region movement information table matching the shape, size, or partition information of the current block among a plurality of inter-region movement information tables.

Alternatively, an inter-region movement information table may be created for each resolution of the movement vector. As an example, when the movement vector of the current block has a resolution of ¼ pel, an inter-region merge candidate derived from the current block may be added to an inter-region quarter-pel movement information list. When the movement vector of the current block has a resolution of 1 integer pel, an inter-region merge candidate derived from the current block may be added to an inter-region integer-pel movement information list. When the movement vector of the current block has a resolution of 4 integer pel, an inter-region merge candidate derived from the current block may be added to an inter-region 4-integer-pel movement information list. One of the plurality of inter-region movement information lists may be selected according to the movement vector resolution of a block to be encoded or decoded.

When a merge offset vector coding method is applied to the current block, an inter-region merge candidate derived from the current block may be added to an inter-region merge offset movement information list HmvpHMVDCandList instead of being added to an inter-region movement information table HmvpCandList. In this case, the inter-region merge candidate may include movement vector offset information of the current block. HmvpHMVDCandList may be used to derive an offset of the block to which the merge offset vector coding method is applied.

When the number of merge candidates included in the merge candidate list of the current block is not equal to the maximum value, the inter-region merge candidate included in the inter-region movement information table may be added to the merge candidate list. The addition process may be in ascending or descending order based on indices. As an example, an inter-region merge candidate with the largest index may be preferentially added to the merge candidate list.

When the inter-region merge candidate included in the inter-region movement information table is to be added to the merge candidate list, a redundancy check between the inter-region merge candidate and the merge candidates prestored in the merge candidate list may be performed.

As an example, Table 3 shows a process of adding an inter-region merge candidate to the merge candidate list.

TABLE 3

For each candidate in HMVPCandList with index HMVPIdx = 1.. numCheckedHMVPCand, the following ordered steps are repeated until combStop is equal to true
- sameMovement is set to false
- If HMVPCandList[NumHmvp-HMVPIdx] have the same movement vectors and the same reference indices with any mergeCandList[i] with I being 0.. numOrigMergeCand-1 and HasBeenPruned[i] equal to false, sameMovement is set to true
- If sameMovement is equal to false, mergeCandList[numCurrMergeCand++] is set to HMVPCandList[NumHmvp-HMVPIdx]
- If numCurrMergeCand is equal to (MaxNumMergeCand-1), hmvpStop is set to TRUE The redundancy check may be performed on only some of the inter-region merge candidates included in the inter-region movement information table. As an example, the redundancy check may be performed on only inter-region merge candidates with indices greater than or equal to the threshold value or indices less than or equal to the threshold value.

Alternatively, the redundancy check may be performed on only some of the merge candidates prestored in the merge candidate list. As an example, the redundancy check may be performed on only a merge candidate with an index greater than or equal to the threshold value or an index less than or equal to the threshold value or a merge candidate derived from a block at a specific location. Here, the specific location may include at least one of the left neighboring block, the upper neighboring block, the upper-right neighboring block, or the lower-left neighboring block of the current block.

Figure 24:
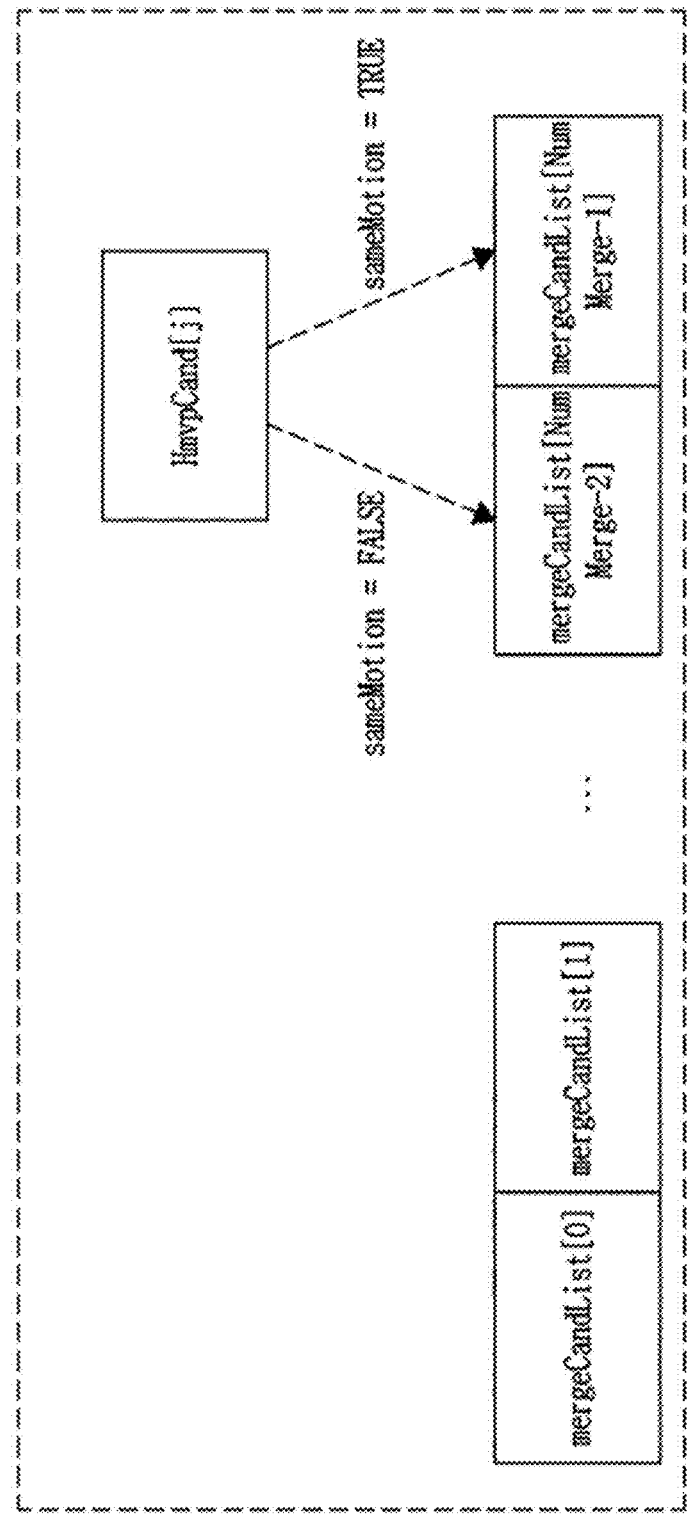
FIG. 24 is a diagram showing an example in which a redundancy check is performed on only some merge candidates.

FIG. 24 is a diagram showing an example in which a redundancy check is performed on only some merge candidates.

When an inter-region merge candidate HmvpCand[j] is to be added to the merge candidate list, a redundancy check may be performed on the inter-region merge candidate with respect to two merge candidates mergeCandList[Num-Merge-2] and mergeCandList[NumMerge-1], which have the largest indices. Here, NumMerge may represent the number of available spatial merge candidates and temporal merge candidates.

When a merge candidate identical to the first inter-region merge candidate is found, the redundancy check on the merge candidate identical to the first inter-region merge candidate may be omitted while the redundancy check is performed on the second inter-region merge candidate.

Figure 25:
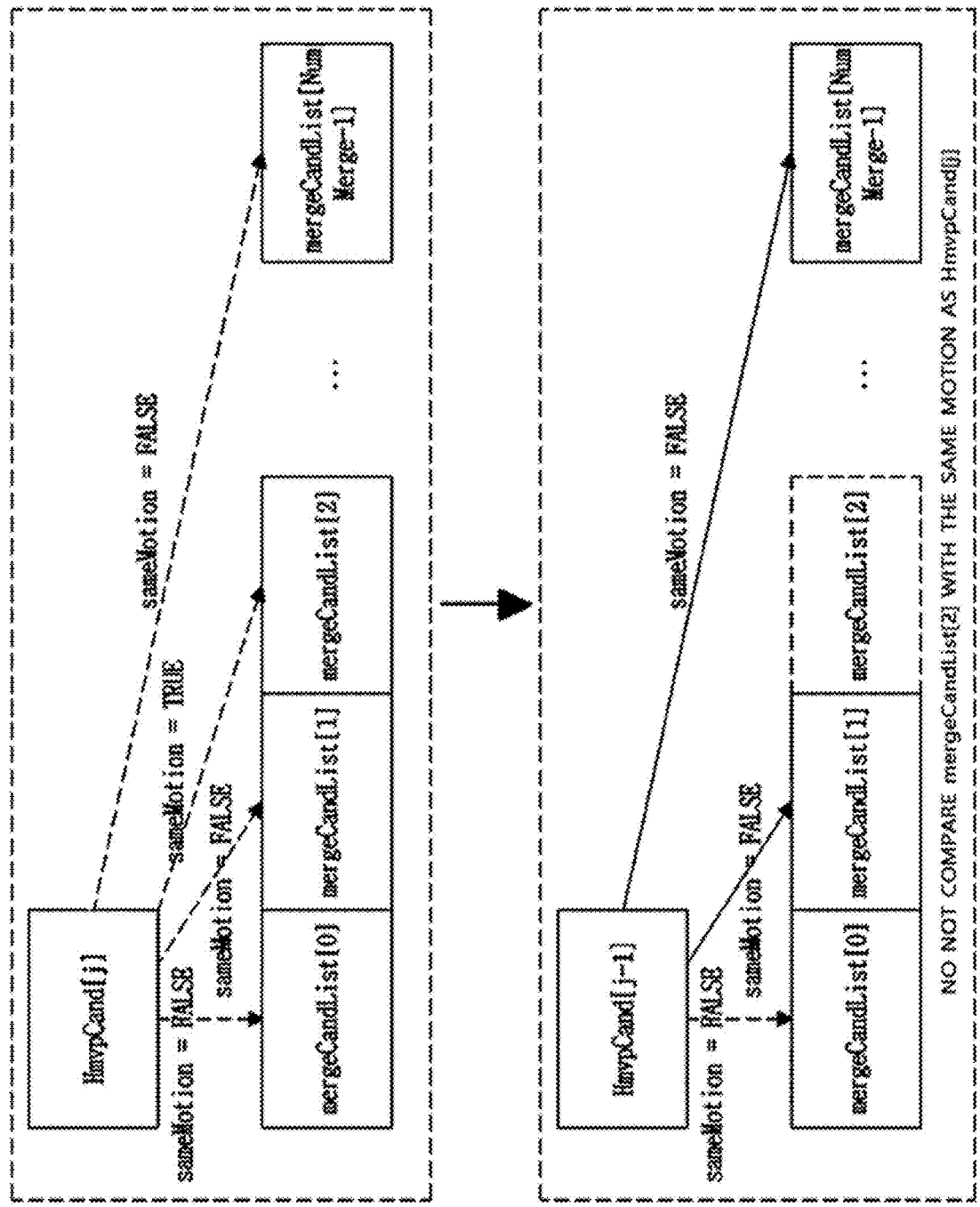
FIG. 25 is a diagram showing an example in which a redundancy check on a specific merge candidate is omitted.

FIG. 25 is a diagram showing an example in which a redundancy check on a specific merge candidate is omitted.

When an inter-region merge candidate HmvpCand[i] with an index of i is to be added to the merge candidate list, a redundancy check between the inter-region merge candidate and the merge candidates prestored in the merge candidate list may be performed. In this case, when a merge candidate mergeCandList[j] identical to the inter-region merge candidate HmvpCand[i] is found, the inter-region merge candidate HmvpCand[i] may not be added to the merge candidate list, and a redundancy check between an inter-region merge candidate HmvpCand[i-1], which has an index of i-1, and the merge candidates may be performed. In this case, a redundancy check between the inter-region merge candidate HmvpCand[i-1] and the merge candidate mergeCandList[j] may be omitted.

As an example, in the example shown in FIG. 25, it is determined that HmvpCand[i] and mergeCandList[2] are identical to each other. Accordingly, HmvpCand[i] may not be added to the merge candidate list, and a redundancy check may be performed on HmvpCand[i-1]. In this case, a redundancy check between HvmpCand[i-1] and mergeCandList[2] may be omitted.

When the number of merge candidates included in the merge candidate list of the current block is smaller than the maximum number, at least one of a pairwise merge candidate or a zero merge candidate may be further included in addition to the inter-region merge candidate. The pairwise merge candidate refers to a merge candidate with a movement vector equal to the average of the movement vectors of two or more merge candidates, and a zero merge candidate refers to a merge candidate with a movement vector of 0.

A merge candidate may be added to the merge candidate list of the current block in the following order.

Spatial merge candidate—Temporal merge candidate—Inter-region merge candidate—(Inter-region affine merge candidate)—Pairwise merge candidate—Zero merge candidate.

The spatial merge candidate refers to a merge candidate derived from at least one of a neighboring block or a non-neighboring block, and the temporal merge candidate refers to a merge candidate derived from a preceding reference picture. The inter-region affine merge candidate refers to an inter-region merge candidate derived from a block encoded or decoded by an affine movement model.

The inter-region movement information table may be used even in the movement vector prediction mode. As an example, when the number of movement vector prediction candidates included in the movement vector prediction candidate list of the current block is smaller than the maximum number, the inter-region merge candidate included in the inter-region movement information table may be set as the movement vector prediction candidate for the current block. In detail, the movement vector of the inter-region merge candidate may be set as the movement vector prediction candidate.

When one of the movement vector prediction candidates included in the movement vector prediction candidate list of the current block is selected, the selected candidate may be set as a movement vector predictor of the current block. Subsequently, the movement vector of the current block may be acquired by decoding a movement vector residual value of the current block and then adding the movement vector predictor and the movement vector residual value.

The movement vector prediction candidate list of the current block may be configured in the following order.

Spatial movement vector prediction candidate—Temporal movement vector prediction candidate—Inter-decoding-area merge candidate—(Inter-decoding-area affine merge candidate)—Zero movement vector prediction candidate The spatial movement vector prediction candidate refers to a movement vector prediction candidate derived from at least one of a neighboring block or a non-neighboring block, and the temporal movement vector prediction candidate refers to a movement vector prediction candidate derived from a preceding reference picture. The inter-region affine merge candidate refers to an inter-region movement vector prediction candidate derived from a block encoded or decoded by an affine movement model. The zero movement vector prediction candidate represents a candidate having a movement vector of 0.

A merge processing area larger than the coding block may be defined. Coding blocks included in the merge processing area may be processed in parallel without being sequentially encoded or decoded. Here, not sequentially encoding or decoding means that an encoding or decoding order is not defined. Accordingly, a process of encoding or decoding the blocks included in the merge processing area may be processed independently. Alternatively, the blocks included in the merge processing area may share merge candidates. Here, the merge candidates may be derived on the basis of the merge processing area.

According to the above-described characteristics, the merge processing area may be referred to as a parallel processing area, a shared merge region (SMR), or a merge estimation region (MER).

The merge candidate of the current block may be derived on the basis of the coding block. However, when the current block is included in the parallel merge area larger than the current block, a candidate block included in the same parallel merge area as that of the current block may be set to be unavailable as a merge candidate.

Figure 26:
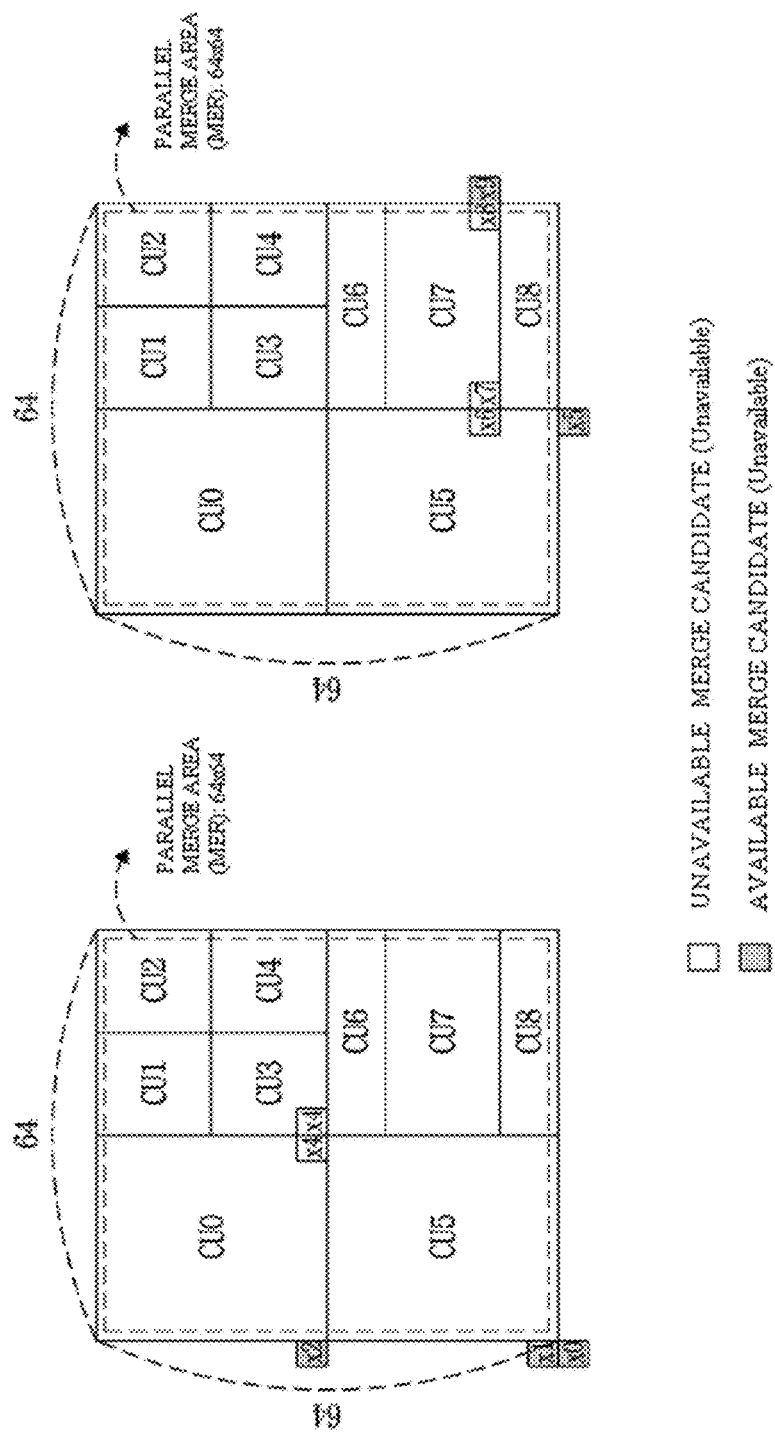
FIG. 26 is a diagram showing an example in which a candidate block included in the same parallel merge area as that of the current block is set to be unavailable as a merge candidate.

FIG. 26 is a diagram showing an example in which a candidate block included in the same parallel merge area as that of the current block is set to be unavailable as a merge candidate.

In the example shown in FIG. 26A, when CU5 is encoded or decoded, blocks including reference samples adjacent to CU5 may be set as candidate blocks. In this case, candidate blocks X3 and X4, which are included in the same parallel merge area as that of CU5, may be set to be unavailable as merge candidates. On the other hand, candidate blocks X0, X1, and X2, which are not included in the same parallel merge area as that of CU5, may be set to be available as merge candidates.

In the example shown in FIG. 26B, when CU8 is encoded or decoded, blocks including reference samples adjacent to CU8 may be set as candidate blocks. In this case, candidate blocks X6, X7, and X8, which are included in the same parallel merge area as that of CU8, may be set to be unavailable as merge candidates. On the other hand, candidate blocks X5 and X9, which are not included in the same merge area as that of CU8, may be set to be available as merge candidates.

The parallel merge area may be square or non-square. Information for determining the parallel merge area may be signaled in a bitstream. The information may include at least one of information indicating the shape of the parallel merge area or information indicating the size of the parallel merge area. When the parallel merge area is non-square, at least one of information indicating the size of the parallel merge area, information indicating the width and/or height of the parallel merge area, or information indicating a ratio between the width and height of the parallel merge area may be signaled in a bitstream.

The size of the parallel merge area may be determined on the basis of at least one of information signaled in a bitstream, picture resolution, a slice size, or a tile size.

When movement compensation prediction is performed on a block included in the parallel merge area, an inter-region merge candidate derived on the basis of movement information of a block subjected to the movement compensation prediction may be added to the inter-region movement information table.

However, when an inter-region merge candidate derived from the block included in the parallel merge area is added to the inter-region movement information table, an inter-region merge candidate derived from the block may be used when another block included in the parallel merge area is actually encoded or decoded later than the block. That is, although the dependency between blocks has to be excluded when encoding or decoding blocks included in the parallel merge area, movement prediction compensation may be performed using movement information of the other block included in the parallel merge area. In order to solve such a problem, even though the encoding or decoding of a block included in the parallel merge area is completed, movement information of the block in which encoding or decoding is completed may not be added to the inter-region movement information table.

Alternatively, when movement compensation prediction is performed on blocks included in the parallel merge area, the inter-region merge candidate derived from the blocks may be added to the inter-region movement information table in a predefined order. Here, the predefined order may be determined in the scanning order of the coding blocks in the coding tree unit or the parallel merge area. The scanning order may be at least one of raster scan, horizontal scan, vertical scan, or zigzag scan. Alternatively, the predefined order may be determined on the basis of movement information of each of the blocks or the number of blocks having the same movement information.

Alternatively, an inter-region merge candidate including unidirectional movement information may be added to the inter-region merge list earlier than an inter-region merge candidate including bidirectional movement information. On the contrary, an inter-region merge candidate including bidirectional movement information may be added to the inter-region merge candidate list earlier than an inter-region merge candidate including unidirectional movement information.

Alternatively, inter-region merge candidates may be added to the inter-region movement information table in ascending or descending order of usage frequency in the parallel merge area or the coding tree unit.

When the current block is included in the parallel merger area and the number of merge candidates included in the merge candidate list of the current block is smaller than the maximum number, the inter-region merge candidate included in the inter-region movement information table may be added to the merge candidate list. In this case, a setting may be made such that an inter-region merge candidate derived from a block included in the same parallel merge area as that of the current block is added to the merge candidate list of the current block.

Alternatively, a setting may be made such that when the current block is included in the parallel merger area, an inter-region merge candidate included in the inter-region movement information table is not used. That is, even when the number of merge candidates included in the merge candidate list of the current block is smaller than the maximum number, the inter-region merge candidate included in the inter-region movement information table may not be added to the merge candidate list.

The inter-region movement information table may be configured for the parallel merge area or the coding tree unit. This inter-region movement information table serves to temporarily store movement information of blocks included in the parallel merge area. In order to distinguish a general inter-region movement information table from an inter-region movement information table for the parallel merge area or the coding tree unit, the inter-region movement information table for the parallel merge area or the coding tree unit will be referred to as a temporary movement information table. In addition, an inter-region merge candidate stored in the temporary movement information table will be referred to as a temporary merge candidate.

Figure 27:
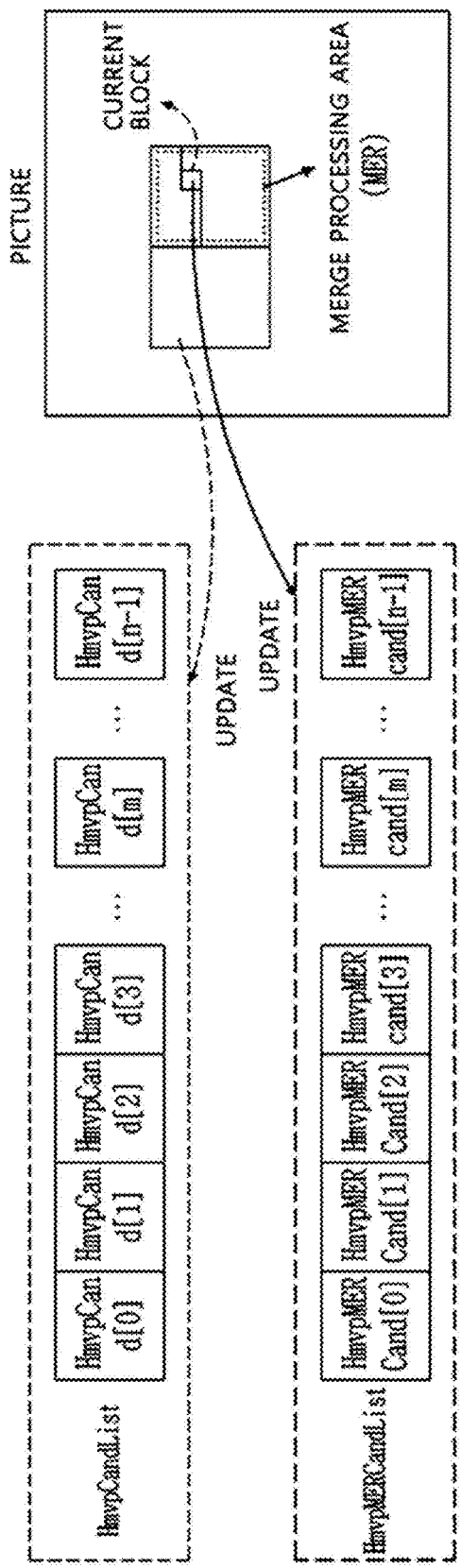
FIG. 27 is a diagram showing a temporary movement information table.

FIG. 27 is a diagram showing a temporary movement information table.

The temporary movement information table may be configured for the coding tree unit or the parallel merge area. When movement compensation prediction is performed on the current block included in the coding tree unit or the parallel merge area, the movement information of the block may not be added to the inter-prediction movement information table HmvpCandList. Instead, a temporary merge candidate derived from the block may be added to a temporary movement information table HmvpMERCandList. That is, the temporary merge candidate added to the temporary movement information table may not be added to the inter-region movement information table. Accordingly, the inter-region movement information table may not include an inter-region merge candidate derived on the basis of movement information of blocks included in the parallel merge area or coding tree unit including the current block.

The maximum number of merge candidates that can be included in the temporary movement information table may be set to be the same as that of the inter-region movement information table. Alternatively, the maximum number of merge candidates that can be included in the temporary movement information table may be determined according to the size of the coding tree unit or the parallel merge area.

The current block included in the coding tree unit or the parallel merge area may be set not to use the temporary movement information table for the corresponding coding tree unit or the corresponding parallel merge area. That is, when the number of merge candidates included in the merge candidate list of the current block is smaller than the maximum value, the inter-region merge candidate included in the inter-region movement information table may be added to the merge candidate list, and the temporary merge candidate included in the temporary movement information table may not be added to the merge candidate list. Accordingly, movement information of other blocks included in the same coding tree unit or parallel merge area as that of the current block may not be used for the movement compensation prediction of the current block.

When the encoding or decoding of all blocks included in the coding tree unit or the parallel merge area is completed, the inter-region movement information table and the temporary movement information table may be merged.

Figure 28:
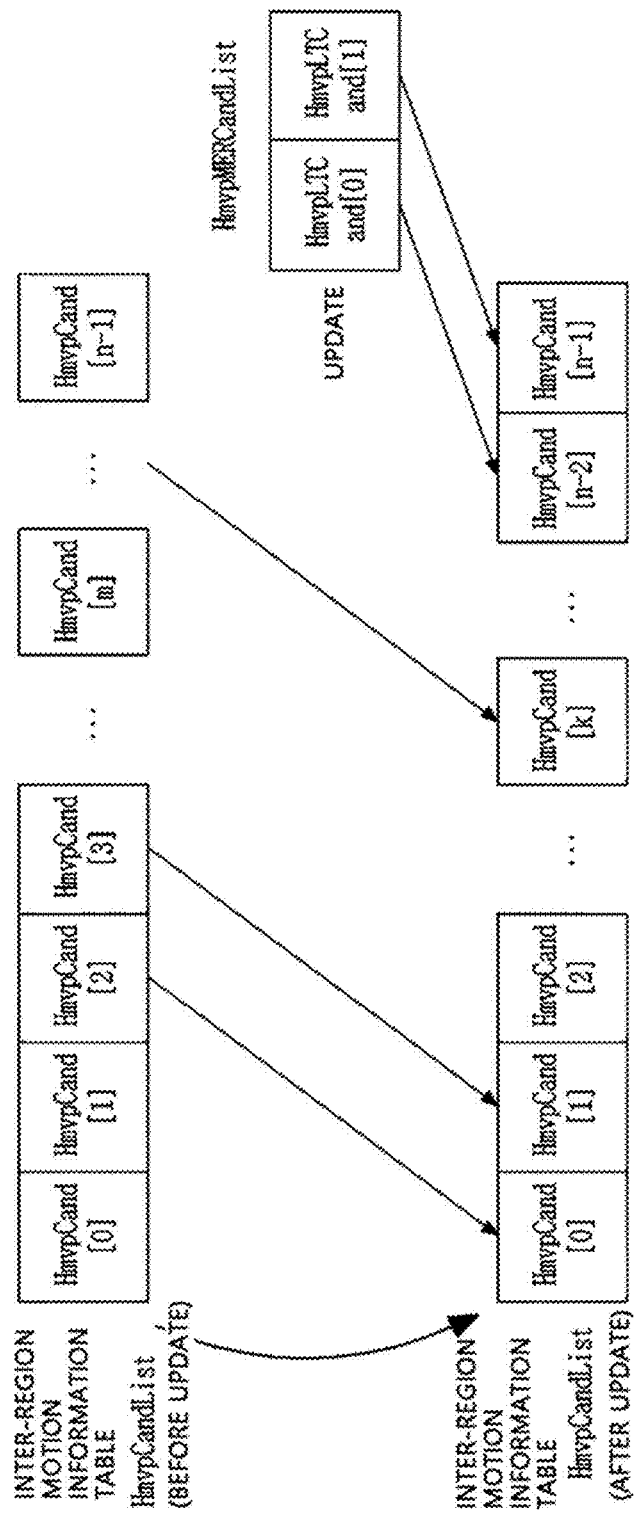
FIG. 28 is a diagram showing an example of merging a temporary movement information table with an inter-region movement information table.

FIG. 28 is a diagram showing an example of merging a temporary movement information table with an inter-region movement information table.

When the encoding or decoding of all blocks included in the coding tree unit or the parallel merge area is completed, the inter-region movement information table may be updated with the temporary merge candidate included in the temporary movement information table in the example shown in FIG. 28.

In this case, the temporary merge candidates included in the temporary movement information table may be added to the inter-region movement information table in the order in which the temporary merge candidates were inserted into the temporary movement information table (i.e., in ascending or descending order of index values).

As another example, the temporary merge candidates included in the temporary movement information table may be added to the inter-region movement information table in a predefined order.

Here, the predefined order may be determined in the scanning order of the coding blocks in the coding tree unit or the parallel merge area. The scanning order may be at least one of raster scan, horizontal scan, vertical scan, or zigzag scan. Alternatively, the predefined order may be determined on the basis of movement information of each of the blocks or the number of blocks having the same movement information.

Alternatively, a temporary merge candidate including unidirectional movement information may be added to the inter-region merge list earlier than a temporary merge candidate including bidirectional movement information. On the contrary, a temporary merge candidate including bidirectional movement information may be added to the inter-region merge candidate list earlier than a temporary merge candidate including unidirectional movement information.

Alternatively, temporary merge candidates may be added to the inter-region movement information table in ascending or descending order of usage frequency in the parallel merge area or the coding tree unit.

When a temporary merge candidate included in the temporary movement information table is added to the inter-region movement information table, a redundancy check for the temporary merge candidate can be performed. As an example, when an inter-region merge candidate identical to the temporary merge candidate included in the temporary movement information table is prestored in the inter-region movement information table, the temporary merge candidate may not be added to the inter-region movement information table. In this case, the redundancy check may be performed on only some of the inter-region merge candidates included in the inter-region movement information table. As an example, the redundancy check may be performed on only inter-prediction merge candidates with indices greater than or equal to a threshold value or indices less than or equal to a threshold value. As an example, when the temporary merge candidate is identical to an inter-region merge candidate with an index greater than or equal to a predefined value, the temporary merge candidate may not be added to the inter-region movement information table.

The intra-prediction is to predict the current block using a reconstructed sample where encoding or decoding is completed and which is near the current block. In this case, a reconstructed sample before an in-loop filter is applied may be used for the intra-prediction of the current block.

An intra-prediction technique includes matrix-based intra-prediction and normal intra-prediction considering directionality with respect to a nearby reconstructed sample. Information indicating the intra-prediction technique of the current block may be signaled in a bitstream. The information may be a 1-bit flag. Alternatively, the intra-prediction technique of the current block may be determined on the basis of at least one of the location, size, or shape of the current block or the intra-prediction technique of a neighboring block. As an example, when a current block is present across a picture boundary, a setting may be made such that matrix-based intra-prediction is not applied to the current block.

The matrix-based intra-prediction may be a method of acquiring a prediction block of the current block on the basis of a matrix product between a matrix prestored in an encoder and a decoder and reconstructed samples near the current block. Information for specifying one of a plurality of prestored matrices may be signaled in a bitstream. The decoder may determine a matrix for intra-prediction of the current block on the basis of the information and the size of the current block.

The normal intra-prediction is a method of acquiring a prediction block for the current block on the basis of a non-directional intra-prediction mode or a directional intra-prediction mode. A process of performing intra-prediction based on the normal intra-prediction will be described in detail below with reference to the drawings.

Figure 29:
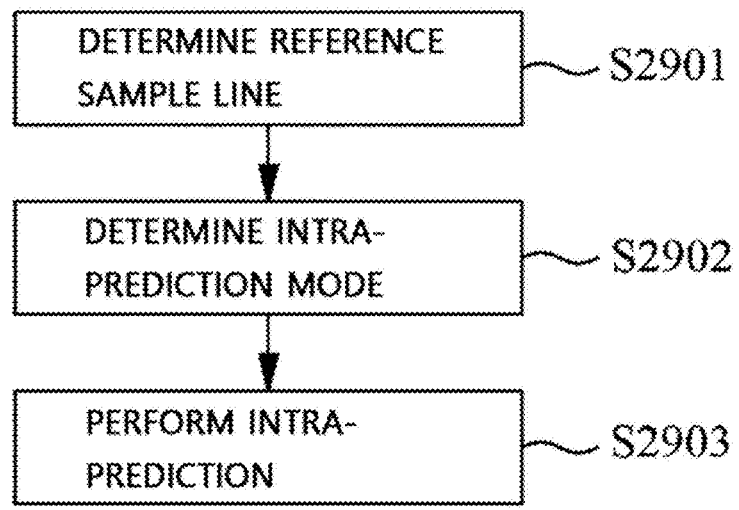
FIG. 29 is a flowchart of an intra-prediction method according to an embodiment of the present disclosure.

FIG. 29 is a flowchart of an intra-prediction method according to an embodiment of the present disclosure.

A reference sample line of the current block may be determined (S2901). The reference sample line refers to a set of reference samples included in the kth line away from the top and/or the left of the current block. The reference samples may be derived from reconstructed samples where encoding or decoding is completed and which are near the current block.

Index information for identifying the reference sample line of the current block among a plurality of reference sample lines may be signaled in a bitstream. The plurality of reference sample lines may include at least one of the first line, the second line, the third line, or the fourth line from the top and/or the left of the current block. Table 4 represents indices assigned to the reference sample lines. Table 4 assumes that the first line, the second line, and the fourth line are used as reference sample line candidates.

TABLE 4

| Index | Reference Sample Line |
|---|---|
| 0 | First Reference Sample Line |
| 1 | Second Reference Sample Line |
| 2 | Fourth Reference Sample Line |

The reference sample line of the current block may be determined on the basis of at least one of the location, size, or shape of the current block or the prediction mode of a neighboring block. As an example, when the current block is contiguous to an edge of a picture, tile, slice, or coding tree unit, the first reference sample line may be determined as the reference sample line of the current block.

The reference sample line may include upper reference samples located above the current block and left reference samples located to the left of the current block. The upper reference samples and the left reference samples may be derived from reconstructed samples near the current block. The reconstructed samples may be in a state before an in-loop filter is applied.

Figure 30:
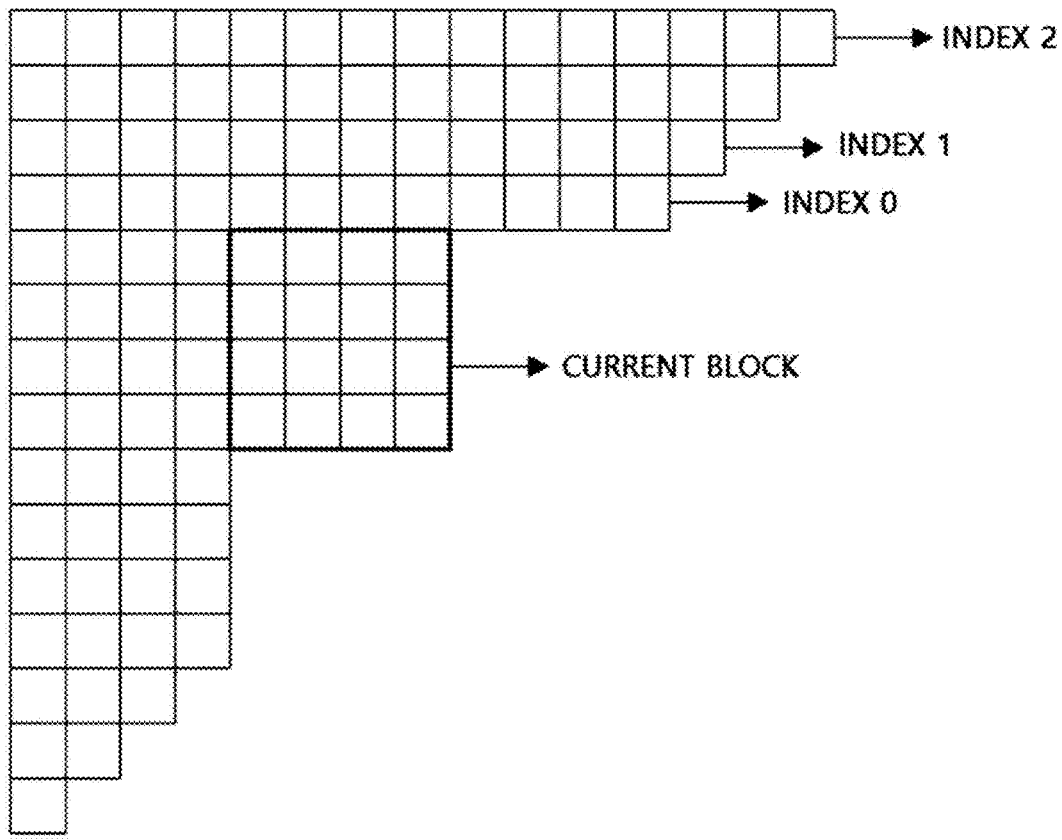
FIG. 30 is a diagram showing reference samples included in each reference sample line.

FIG. 30 is a diagram showing reference samples included in each reference sample line.

A prediction sample may be acquired using at least one reference sample belonging to a reference sample line according to an intra-prediction mode of the current block.

Next, the intra-prediction mode of the current block may be determined (S2902). At least one of a non-directional intra-prediction mode or a directional intra-prediction mode may be determined as the intra-prediction mode of the current block. The non-directional intra-prediction mode includes Planar and DC, and the directional intra-prediction includes 33 or 65 modes from a diagonal lower-left direction to a diagonal upper-right direction.

Figure 31:
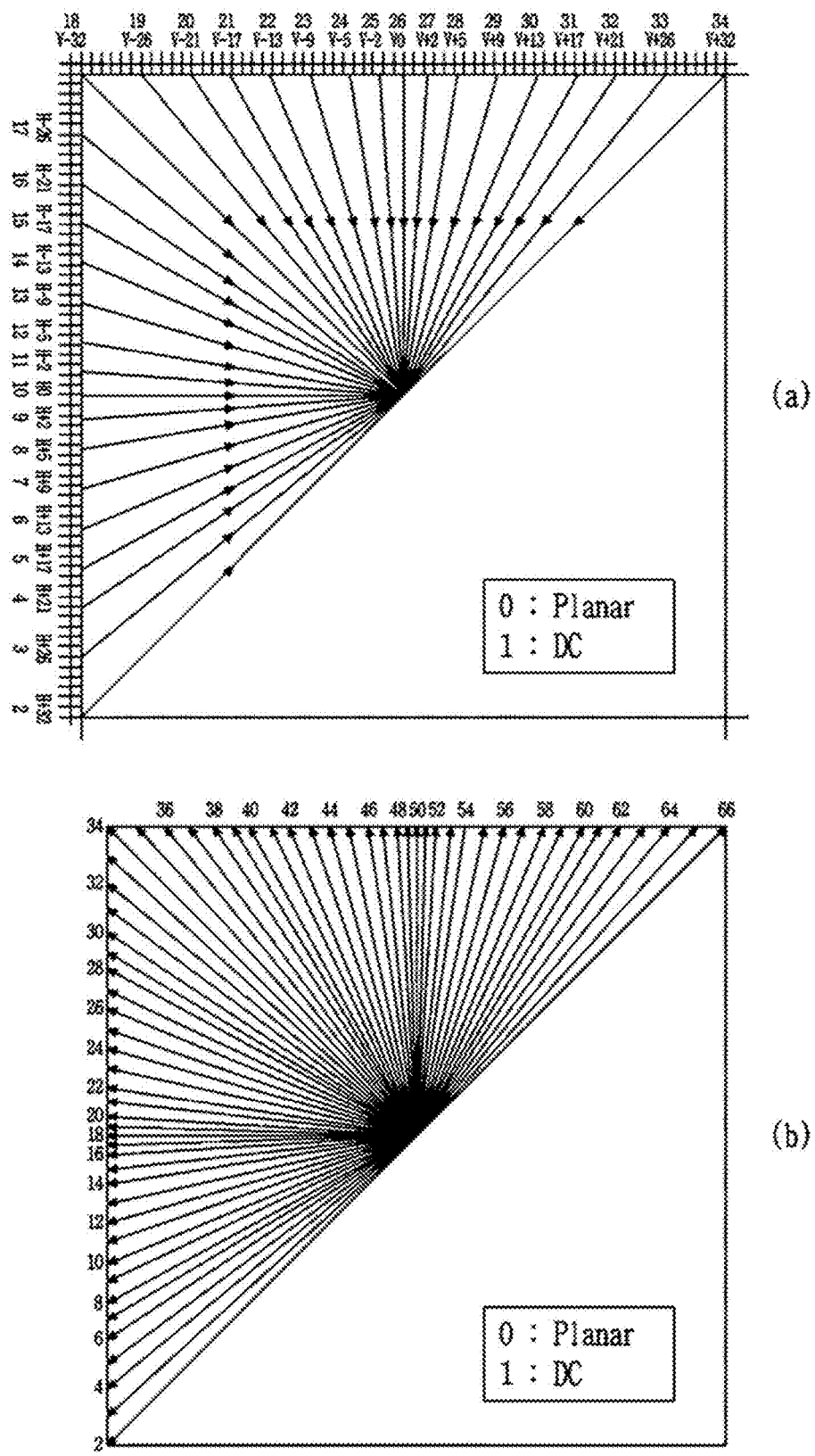
FIG. 31 is a diagram showing intra-prediction modes.

FIG. 31 is a diagram showing intra-prediction modes.

FIG. 31A shows 35 intra-prediction modes, and FIG. 31B shows 67 intra-prediction modes.

A larger number of intra-prediction modes or a smaller number of intra-prediction modes may be defined than are shown in FIG. 31.

A most probable mode (MPM) may be set on the basis of the intra-prediction mode of a block neighboring the current block. Here, the neighboring block may include a left neighboring block adjacent to the left of the current block and an upper neighboring block adjacent to the top of the current block. When the coordinates of the upper-left sample of the current block are (0, 0), the left neighboring block may include a sample located at (−1, 0), (−1, H−1), or (−1, (H−1)/2). Here, H represents the height of the current block. The upper neighboring block may include a sample located at (0, −1), (W−1, −1), or ((W−1)/2, −1). Here, W represents the width of the current block.

When the neighboring block is coded through normal intra-prediction, an MPM may be derived on the basis of an intra-prediction mode of a neighboring block. In detail, an intra-prediction mode of a left neighboring block may be set using variable candIntraPredModeA, and an intra-prediction mode of an upper neighboring block may be set using variable candIntraPredModeB.

In this case, when a neighboring block is not available (e.g., when a neighboring block has not yet been encoded or decoded or when the location of a neighboring block deviates from a picture edge), when a neighboring block is coded through matrix-based intra-prediction, when a neighboring block is coded through inter-prediction, or when a neighboring block is included in a coding tree unit different from that of the current block, variable candIntraPredModeX (here, X is A or B), which is derived on the basis of the intra-prediction mode of the neighboring block may be set as a default mode. Here, the default mode may include at least one of Planar, DC, Vertical mode or Horizontal mode.

Alternatively, when a neighboring block is coded through matrix-based intra-prediction, an intra-prediction mode corresponding to an index value for specifying one of a plurality of matrices may be set as candIntraPredModeX. To this end, a lookup table indicating a mapping relationship between intra-prediction modes and index values for specifying matrices may be prestored in an encoder and a decoder.

MPMs may be derived on the basis of variable candIntraPredModeA and variable candIntraPredModeB. The number of MPMs included in an MPM list may be preset in an encoder and a decoder. As an example, the number of MPMs may be three, four, five, or six. Alternatively, information indicating the number of MPMs may be signaled in a bitstream. Alternatively, the number of MPMs may be determined on the basis of at least one of the prediction mode of the neighboring block or the size or shape of the current block.

The following embodiments assume that the number of MPMs is three, and three MPMs are referred to as MPM[0], MPM[1], and MPM[2]. When the number of MPMs is greater than three, the MPMs may be configured to include three MPMs which will be described in the following embodiments.

When candIntraPredA and candIntraPredB are identical and candIntraPredA is Planar or DC mode, MPM[0] and MPM[1] may be set for Planar and DC mode, respectively. MPM[2] may be set for a vertical intra-prediction mode, a horizontal intra-prediction mode, or a diagonal intra-prediction mode. The diagonal intra-prediction mode may be diagonal lower-left intra-prediction mode, upper-left intra-prediction mode, or upper-right intra-prediction mode.

When candIntraPredA and candIntraPredB are identical and candIntraPredA is directional intra-prediction mode, MPM[0] may be set to be identical to candIntraPredA. MPM[1] and MPM[2] may be set for intra-prediction modes similar to candIntraPredA. An intra-prediction mode similar to candIntraPredA may be an intra-prediction mode in which an index difference value with respect to candIntraPredA is ±1 or ±2. A modular operation (%) and an offset may be used to derive the intra-prediction mode similar to candIntraPredA.

When candIntraPredA and candIntraPredB are different, MPM[0] may be set to be identical to candIntraPredA, and MPM[1] may be set to be identical to candIntraPredB. In this case, when both of candIntraPredA and candIntraPredB are non-directional intra-prediction modes, MPM[2] may be set to be a vertical intra-prediction mode, a horizontal intra-prediction mode, or a diagonal intra-prediction mode. Alternatively, when at least one of candIntraPredA and candIntraPredB is a directional intra-prediction mode, MPM[2] may be set to be an intra-prediction mode derived by adding or subtracting the offset to or from Planer, DC, or a larger one between candIntraPredA and candIntraPredB. Here, the offset may be 1 or 2.

An MPM list including a plurality of MPMs is created, and information indicating whether an MPM identical to the intra-prediction mode of the current block is included in the MPM list may be signaled in a bitstream. The information is a 1-bit flag, and the flag may be referred to as an MPM flag. When the MPM flag indicates that an MPM identical to the current block is included in the MPM list, index information for identifying one of the MPMs may be signaled in a bitstream. The MPM specified by the index information may be set as the intra-prediction mode of the current block. When the MPM flag indicates that an MPM identical to the current block is not included in the MPM list, residual mode information indicating one of the remaining intra-prediction modes other than the MPMs may be signaled in a bitstream. The residual mode information indicates an index value corresponding to the intra-prediction mode of the current block when indices are re-assigned to the remaining intra-prediction modes other than the MPMs. The decoder may sort the MPMs in ascending order and compare the MPMs to the residual mode information to determine the intra-prediction mode of the current block. As an example, when the residual mode information is smaller than or equal to an MPM, the intra-prediction mode of the current block may be derived by adding one to the residual mode information.

Instead of setting an MPM as a default mode, information indicating whether the intra-prediction mode of the current block is the default mode may be signaled in a bitstream. The information may be a 1-bit flag, and the flag may be referred to as a default mode flag. The default mode flag may be signaled only when the MPM flag indicates that an MPM identical to the current block is included in the MPM list. As described above, the default mode may include at least one of Planar, DC, Vertical mode or Horizontal mode. As an example, when Planar is set as the default mode, the default mode flag may indicate whether the intra-prediction mode of the current block is Planar. When the default mode flag indicates that the intra-prediction mode of the current block is not the default mode, one of the MPMs indicated by the index information may be set as the intra-prediction mode of the current block.

When a plurality of intra-prediction modes are set as default modes, index information indicating one of the default modes may be further signaled. The intra-prediction mode of the current block may be set as the default mode indicated by the index information.

When the index of the reference sample line of the current block is not zero, a setting may be made such that the default mode is not used. Accordingly, when the index of the reference sample line is not zero, the default mode flag may not be signaled, and the value of the default mode flag may set to a predefined value (i.e., false).

When the intra-prediction mode of the current block is determined, prediction samples for the current block may be acquired on the basis of the determined intra-prediction mode (S2903).

When DC mode is selected, the prediction samples for the current block may be generated on the basis of the average of the reference samples. In detail, the values of all the samples in the prediction block may be generated on the basis of the average of the reference samples. The average may be derived using at least one of the upper reference samples located above the current block and the left reference samples located to the left of the current block.

The number or range of reference samples used to derive the average may vary depending on the shape of the current block. As an example, when the current block is a non-square block in which the width is greater than the height, the average may be computed using only the upper reference samples. On the other hand, when the current block is a non-square block in which the width is smaller than the height, the average may be computed using only the left reference samples. That is, when the width and height of the current block are different from each other, the average may be computed using only reference samples adjacent to a longer one between the width and the height. Alternatively, whether to compute the average using the upper reference samples or to compute the average using the left reference samples may be determined on the basis of the width-to-height ratio of the current block.

When Planar mode is selected, the prediction sample may be acquired using a horizontal prediction sample and a vertical prediction sample. Here, the horizontal prediction sample is acquired on the basis of a left reference sample and a right reference sample located on the same horizontal line as the prediction sample, and the vertical prediction sample is acquired on the basis of an upper reference sample and a lower reference sample located on the same vertical line as the prediction sample. Here, the right reference sample may be generated by copying a reference sample adjacent to the upper-right corner of the current block, and the lower reference sample may be generated by copying a reference sample adjacent to the lower-left corner of the current block. The horizontal prediction sample may be acquired on the basis of a weighted-sum operation of the left reference sample and the right reference sample, and the vertical prediction sample may be acquired on the basis of a weighted-sum operation of the upper reference sample and the lower reference sample. In this case, a weight assigned to each reference sample may be determined depending on the location of the prediction sample. The prediction sample may be acquired on the basis of an averaging operation or a weighted-sum operation of the horizontal prediction sample and the vertical prediction sample. When the weighted-sum operation is performed, weights assigned to the horizontal prediction sample and the vertical prediction sample may be determined on the basis of the location of the prediction sample.

When a directional prediction mode is selected, a parameter indicating the prediction direction (or the prediction angle) of the selected directional prediction mode may be determined. Table 5 below represents intra-direction parameter intraPredAng for each intra-prediction mode.

TABLE 5

| PredModeIntraI ntraPredAng | 1- | 232 | 326 | 421 | 517 | 613 | 79 |
|---|---|---|---|---|---|---|---|
| PredModeIntraI ntraPredAng | 85 | 92 | 100 | 11-2 | 12-5 | 13-9 | 14-13 |
| PredModeIntraI ntraPredAng | 15-17 | 16-21 | 17-26 | 18-32 | 19-26 | 20-21 | 21-17 |
| PredModeIntraI ntraPredAng | 22-13 | 23-9 | 24-5 | 25-2 | 260 | 272 | 285 |
| PredModeIntraI ntraPredAng | 299 | 3013 | 3117 | 3221 | 3326 | 3432 | |

Table 5 represents an intra-direction parameter for each intra-prediction mode with an index between 2 and 34 when 35 intra-prediction modes are defined. When more than 33 directional intra-prediction modes are defined, Table 5 may be subdivided to set intra-direction parameters for each directional intra-prediction mode.

After arranging the upper reference samples and the left reference samples of the current block in a line, the prediction sample may be acquired on the basis of the value of the intra-direction parameter. In this case, when the value of the intra-direction parameter is negative, the left reference samples and the upper reference samples may be arranged in a line.

Figure 32:
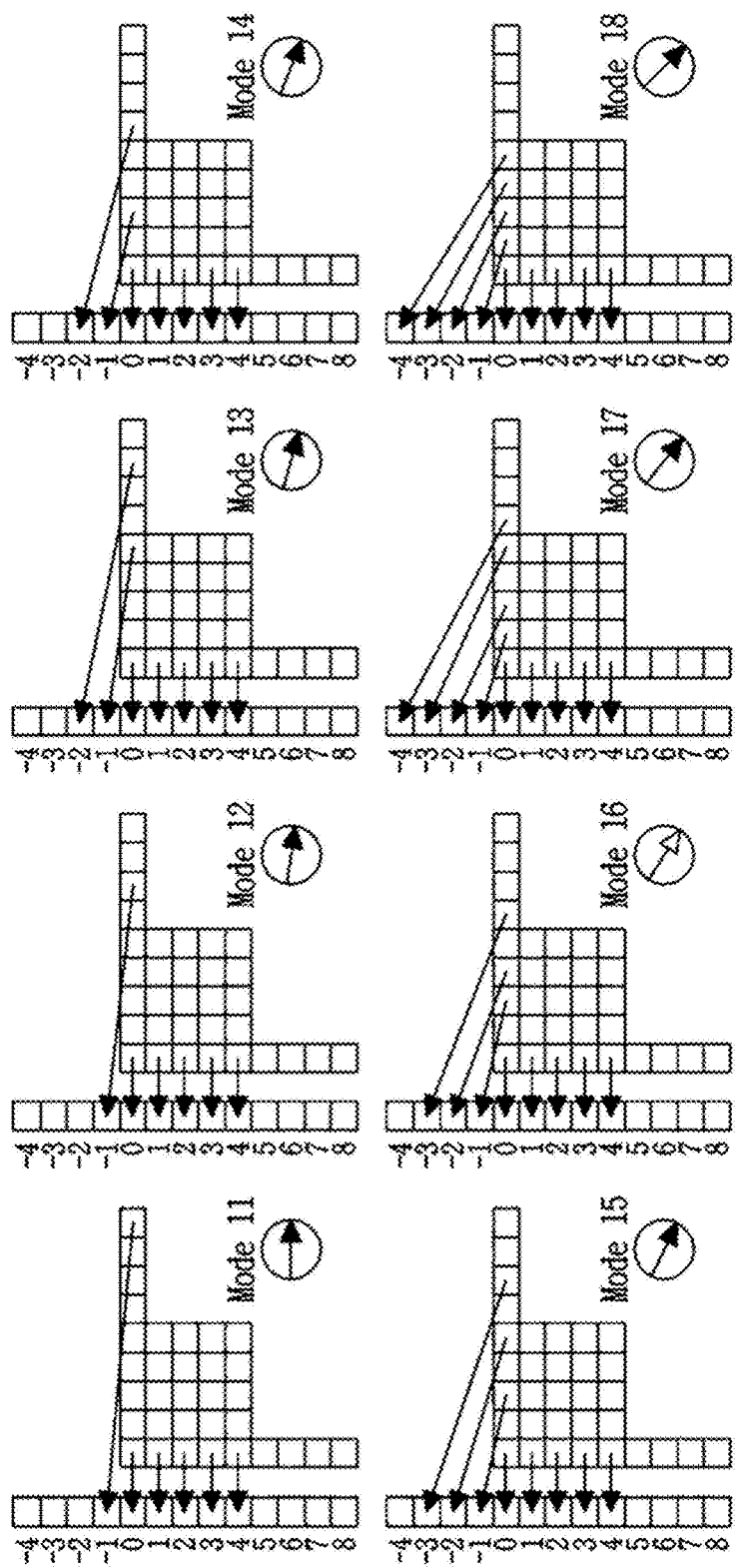
FIGS. 32 and 33 are diagrams showing an example of a one-dimensional array in which reference samples are arranged in a line.
Figure 33:
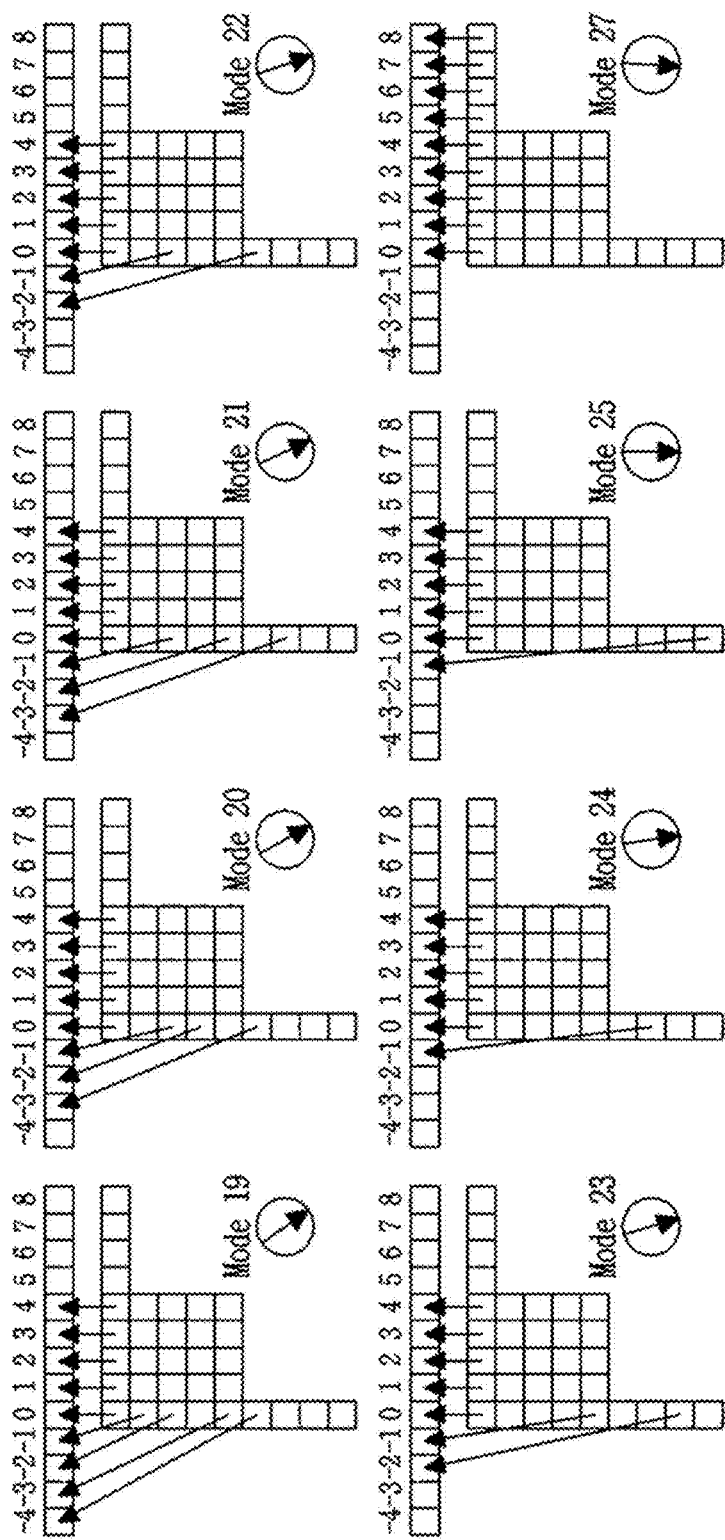

FIGS. 32 and 33 are diagrams showing an example of a one-dimensional array in which reference samples are arranged in a line.

FIG. 32 shows an example of a one-dimensional vertical array in which reference samples are vertically arranged, and FIG. 33 shows an example of a one-dimensional horizontal array in which reference samples are horizontally arranged. The embodiments of FIGS. 32 and 33 will be described on the assumption that 35 intra-prediction modes are defined.

A one-dimensional horizontal array in which the upper reference samples are rotated counterclockwise may be applied when an intra-prediction mode index is between 11 and 18, and a one-dimensional vertical array in which the left reference samples are rotated clockwise may be when an intra-prediction mode index is between 19 and 25. When the reference samples are arranged in a line, an intra-prediction mode angle may be considered.

A reference sample determination parameter may be determined on the basis of the intra-direction parameter. The reference sample determination parameter may include a reference sample index for specifying a reference sample and a weight parameter for determining a weight to be applied to a reference sample.

Reference sample index iIdx and weight parameter $i_{fact}$ may be acquired through Equations 2 and 3 below.

$$iIdx=(y+1)*P_{ang}/32 \quad \text{[Equation 2]}$$

$$i_{fact}=[(y+1)*P_{ang}]\&31 \quad \text{[Equation 3]}$$

In Equations 2 and 3, $P_{ang}$ represents an intra-direction parameter. A reference sample specified by reference sample index iIdx corresponds to integer-pel.

In order to derive the prediction sample, at least one reference sample may be specified. In detail, the location of the reference sample to be used to derive the prediction sample may be specified in consideration of the slope of the prediction mode. As an example, the reference sample to be used to derive the prediction sample may be specified using reference sample index iIdx.

In this case, when the slope of the intra-prediction mode cannot be expressed with one reference sample, the predication sample may be generated by interpolating a plurality of reference samples. As an example, when the slope of the intra-prediction mode is a value between the slope between the prediction sample and a first reference sample and the slope between the prediction sample and a second reference sample, the prediction sample may be acquired by interpolating the first reference sample and the second reference sample. That is, an angular line conforming to the infra-prediction angle does not pass the reference sample located at the integer-pel, the prediction sample may be acquired by interpolating reference samples adjacent to the left, the right, the top, or the bottom of a location that the angular line passes.

Equation 4 below shows an example of acquiring a prediction sample on the basis of reference samples.

$$P(x,y)=((32-i_{fact})/32)*Ref\_1D(x+iIdx+1)+(i_{fact}/32)*Ref\_1D(x+iIdx+2) \quad \text{[Equation 4]}$$

In Equation 4, P represents a prediction sample, and Ref_1D represents one of the reference samples arranged in one dimension. In this case, the location of the reference sample may be determined by reference sample index iIdx and the location (x, y) of the prediction sample.

When the slope of the intra-prediction mode can be expressed with one reference sample, weight parameter $i_{fact}$ may be set to zero. Accordingly, Equation 4 may be simplified into Equation 5 below.

$$P(x,y)=((32-i_{fact})/32)*Ref\_1D(x+iIdx+1)+(i_{fact}/32)*Ref\_1D(x+iIdx+2)$$

$$P(x,y)=Ref\_1D(x+iIdx+1) \quad \text{[Equation 5]}$$

The intra-prediction may be performed on the current block on the basis of a plurality of intra-prediction modes. As an example, an intra-prediction mode may be derived for each prediction sample, and a prediction sample may be derived on the basis of the intra-prediction mode assigned to the corresponding prediction sample.

Alternatively, an intra-prediction mode may be derived for each area, and intra-prediction may be performed on the corresponding area on the basis of the intra-prediction mode assigned to the corresponding area. Here, the area may include at least one sample. At least one of the size or shape of the area may be adaptively determined on the basis of at least one of the size, form, or intra-prediction mode of the current block. Alternatively, at least one of the size or shape of the area may be predefined in an encoder and a decoder independently of the size or shape of the current block.

Alternatively, intra-prediction may be performed multiple times, and a final prediction sample may be derived on the basis of an averaging operation or a weighted-sum operation of a plurality of prediction samples acquired by performing the intra-prediction multiple times. As an example, a first prediction sample may be acquired by performing intra-prediction on the basis of a first intra-prediction mode, and a second prediction sample may be acquired by performing intra-prediction on the basis of a second intra-prediction mode. Subsequently, the final prediction sample may be acquired on the basis of the averaging operation or the weighted-sum operation between the first prediction sample and the second prediction sample. In this case, weights assigned to the first prediction sample and the second prediction sample may be determined in consideration of at least one of whether the first intra-prediction mode is a non-directional prediction mode or a directional prediction mode, whether the second intra-prediction mode is a non-directional prediction mode or a directional prediction mode, or the intra-prediction mode of a neighboring block.

The plurality of intra-prediction modes may be a combination of a non-directional intra-prediction mode and a directional intra-prediction mode, a combination of directional intra-prediction modes, or a combination of non-directional intra-prediction modes.

Figure 34:
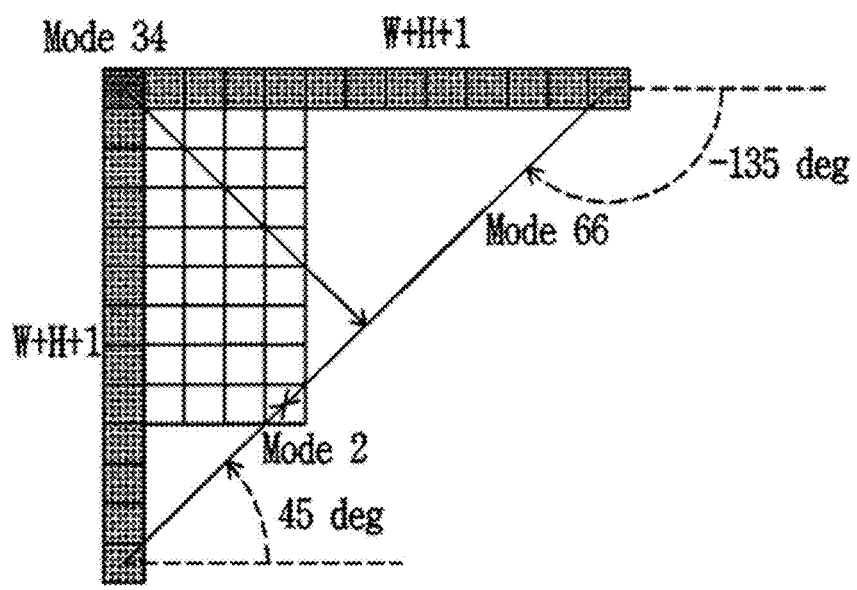
FIG. 34 is a diagram illustrating angles formed between a straight line parallel to the x-axis and directional intra-prediction modes.

FIG. 34 is a diagram illustrating angles formed between a straight line parallel to the x-axis and directional intra-prediction modes.

In the example shown in FIG. 34, the directional prediction modes may range from a diagonal lower-left direction to a diagonal upper-right direction. When the following description assumes an angle formed between the x-axis and the directional prediction mode, the directional prediction modes may range between 45 degrees (in the diagonal lower-left direction) and −135 degrees (in the diagonal upper-right direction).

When the current block is non-square, a prediction sample may be derived using a reference sample far from the prediction sample among reference samples located on the angular line conforming to the intra-prediction angle instead of a reference sample close to the prediction sample depending on the intra-prediction mode of the current block.

Figure 35:
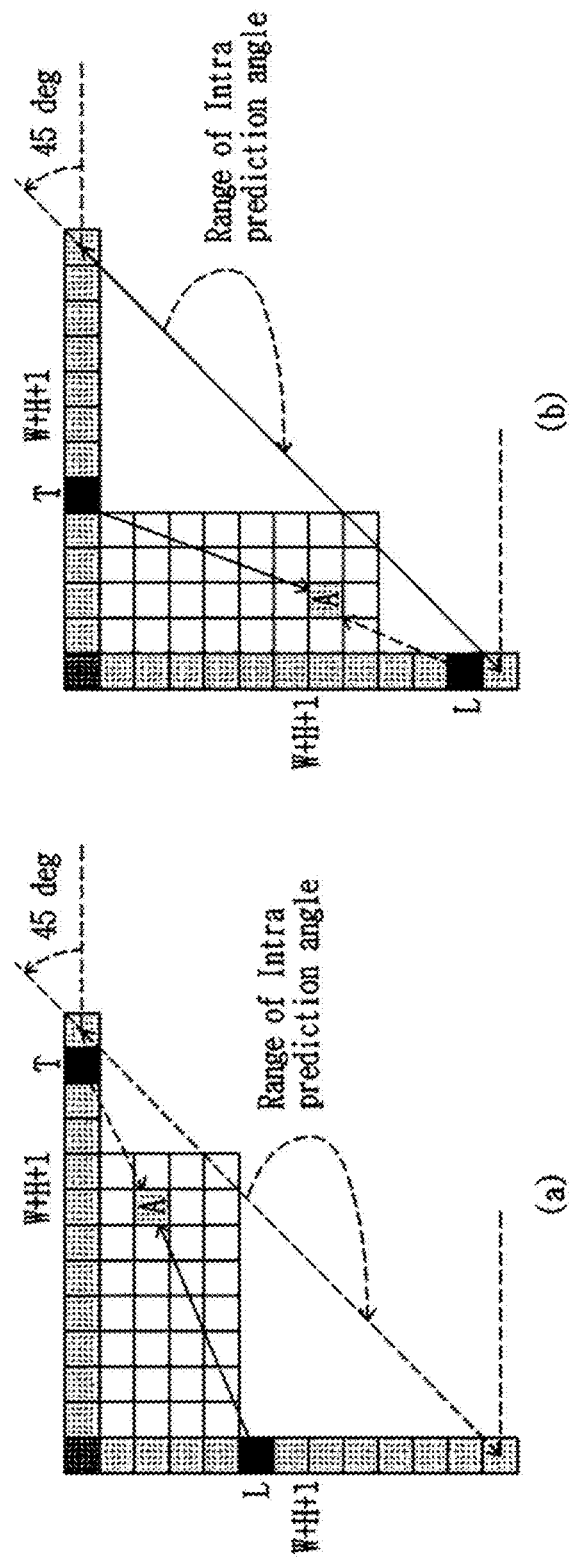
FIG. 35 is a diagram showing an aspect in which a prediction sample is acquired when the current block is non-square.

FIG. 35 is a diagram showing an aspect in which a prediction sample is acquired when the current block is non-square.

For example, as in the example shown in FIG. 35A, it is assumed that the current block has a non-square shape in which the width is greater than the height and that the intra-prediction mode of the current block is a directional intra-prediction mode having an angle between 0 degrees and 45 degrees. In this case, when deriving prediction sample A near the right column of the current block, left reference sample L far from the prediction sample rather than upper reference sample T close to the prediction sample among the reference samples located on the angular line conforming to the angle may be used.

As another example, as in the example shown in FIG. 35B, it is assumed that the current block has a non-square shape in which the height is greater than the width and that the intra-prediction mode of the current block is a directional intra-prediction mode having an angle between −90 degrees and −135 degrees. In this case, when deriving prediction sample A near the bottom row of the current block, upper reference sample T far from the prediction sample among the reference samples located on the angular line conforming to the angle may be used instead of left reference sample L close to the prediction sample.

In order to solve such a problem, when the current block is non-square, the intra-prediction mode of the current block may be replaced with the intra-prediction mode in the opposite direction. Thus, directional prediction modes having a larger or smaller angle than the directional prediction modes shown in FIG. 31 may be used for non-square blocks. Such a directional intra-prediction mode may be defined as a wide-angle intra-prediction mode. The wide-angle intra-prediction mode represents a directional intra-prediction mode that does not fall within the range between 45 degrees and −135 degrees.

Figure 36:
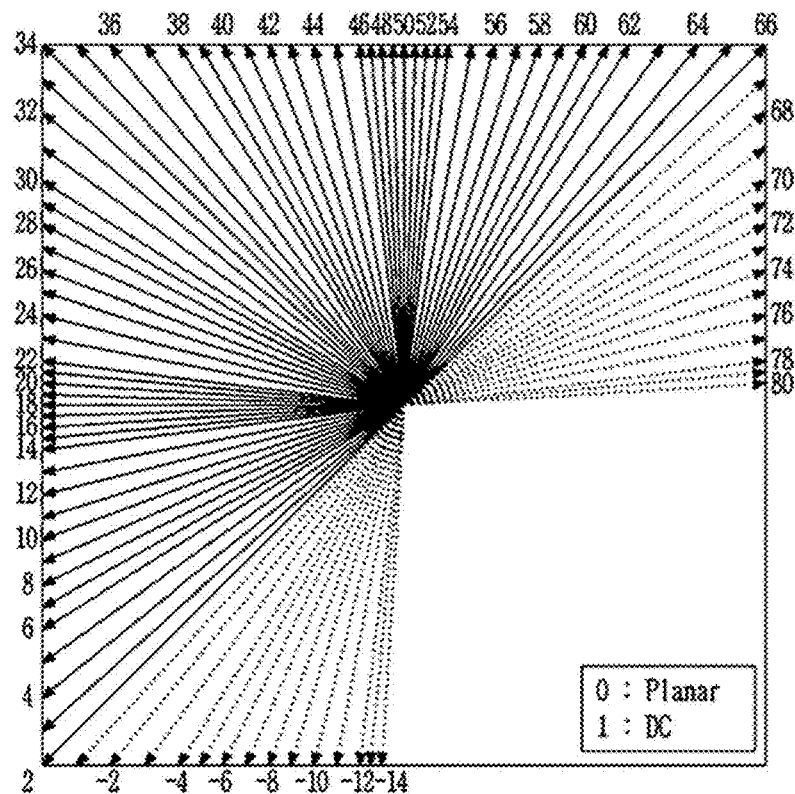
FIG. 36 is a diagram showing wide-angle intra-prediction modes.

FIG. 36 is a diagram showing wide-angle intra-prediction modes.

In the example shown in FIG. 36, intra-prediction modes with an index between −1 and −14 and intra-prediction modes with an index between 67 and 80 indicate wide-angle intra-prediction modes.

In FIG. 36, 14 wide-angle intra-prediction modes having an angle greater than 45 degrees (−1 to −14) and 14 wide-angle intra-prediction modes having an angle smaller than −135 degrees (67 to 80) are illustrated, but a larger or smaller number of wide-angle intra-prediction modes may be defined.

When a wide-angle intra-prediction mode is used, the length of the upper reference samples may be set to 2W+1, and the length of the left reference samples may be set to 2H+1.

When a wide-angle intra-prediction mode is used, sample A shown in FIG. 35A may be predicted using reference sample T, and sample A shown in FIG. 35B may be predicted using reference sample L.

A total of 67+N intra-prediction modes may be used by adding N wide-angle intra-prediction modes to the existing intra-prediction modes. As an example, Table 6 shows intra-direction parameters of the intra-prediction modes when 20 wide-angle intra-prediction modes are defined.

direction parameter for a specific intra-prediction mode when the current block is square may be different from that when the current block is non-square. As an example, intra-direction parameter intraPredAngle of intra-prediction mode #15 may have a greater value when the current block is square than when the current block is non-square.

Alternatively, intra-direction parameter intraPredAngle of intra-prediction mode #75 may have a greater value when the index of the reference sample line of the current block is 1 or greater than when the index of the reference sample line of the current block is 0.

When the current block is non-square and the intra-prediction mode of the current block acquired in S2902 falls within the transform range, the intra-prediction mode of the current block may be transformed into the wide-angle intra-prediction mode. The transform range may be determined on the basis of at least one of the size, form, or ratio of the current block. Here, the ratio may indicate a ratio between the width and the height of the current block.

When the current block has a non-square shape in which the width is greater than the height, the transform range may be set in a range from the intra-prediction mode index of the diagonal upper-right direction (e.g., 66) to the intra-prediction mode index of the diagonal upper-right direction minus N. Here, N may be determined on the basis of the ratio of the current block. When the intra-prediction mode of the current block falls within the transform range, the intra-prediction mode may be transformed into the wide-angle intra-prediction mode. The transform may be to subtract a predefined value from the intra-prediction mode, and the predefined value may be the total number (e.g., 67) of intra-prediction modes except the wide-angle intra-prediction modes.

According to the above embodiment, intra-prediction modes #66 to #53 may be transformed into wide-angle intra-prediction modes #-1 to #-14, respectively.

When the current block has a non-square shape in which the height is greater than the width, the transform range may be set in a range from the intra-prediction mode index of the lower-left diagonal direction (e.g., 2) to the intra-prediction mode index of the lower-left diagonal direction plus M. Here, M may be determined on the basis of the ratio of the current block. When the intra-prediction mode of the current block falls within the transform range, the intra-prediction

TABLE 6

| PredModeIntra | −10 | −9 | −8 | −7 | −6 | −5 | −4 | −3 | −2 |
|---|---|---|---|---|---|---|---|---|---|
| intraPredAngle | 114 | 93 | 79 | 68 | 60 | 54 | 49 | 45 | 39 |
| PredModeIntra | −1 | 2 | 3 | 4 | 5 | 6 | 7 | 8 | 9 |
| intraPredAngle | 35 | 32 | 29 | 26 | 23 | 21 | 19 | 17 | 15 |
| PredModeIntra | 10 | 11 | 12 | 13 | 14 | 15 | 16 | 17 | 18 |
| intraPredAngle | 13 | 11 | 9 | 7 | 5 | 3 | 2 | 1 | 0 |
| PredModeIntra | 19 | 20 | 21 | 22 | 23 | 24 | 25 | 26 | 27 |
| intraPredAngle | −1 | −2 | −3 | −5 | −7 | −9 | −11 | −13 | −15 |
| PredModeIntra | 28 | 29 | 30 | 31 | 32 | 33 | 34 | 35 | 36 |
| intraPredAngle | −17 | −19 | −21 | −23 | −26 | −29 | −32 | −29 | −26 |
| PredModeIntra | 37 | 38 | 39 | 40 | 41 | 42 | 43 | 44 | 45 |
| intraPredAngle | −23 | −21 | −19 | −17 | −15 | −13 | −11 | −9 | −7 |
| PredModeIntra | 46 | 47 | 48 | 49 | 50 | 51 | 52 | 53 | 54 |
| intraPredAngle | −5 | −3 | −2 | −1 | 0 | 1 | 2 | 3 | 5 |
| PredModeIntra | 55 | 56 | 57 | 58 | 59 | 60 | 61 | 62 | 63 |
| intraPredAngle | 7 | 9 | 11 | 13 | 15 | 17 | 19 | 21 | 23 |
| PredModeIntra | 64 | 65 | 66 | 67 | 68 | 69 | 70 | 71 | 72 |
| intraPredAngle | 26 | 29 | 32 | 35 | 39 | 45 | 49 | 54 | 60 |
| PredModeIntra | 73 | 74 | 75 | 76 | | | | | |
| intraPredAngle | 68 | 79 | 93 | 114 | | | | | |

The intra-direction parameters may be set differently based on at least one of the size, the shape, or the reference sample line of the current block. As an example, an intra-mode may be transformed into the wide-angle intra-prediction mode. The transform may be to add a predefined value to the intra-prediction mode, and the predefined value may be the total number (e.g., 65) of directional intra-prediction modes excluding the wide-angle intra-prediction modes.

According to the above embodiment, intra-prediction modes #2 to #15 may be transformed into wide-angle intra-prediction modes #67 to #80, respectively.

Intra-prediction modes falling within the transform range will be referred to as alternative wide-angle intra-prediction modes.

The transform range may be determined on the basis of the ratio of the current block. As an example, Table 7 and Table 8 represent a transform range when 35 intra-prediction modes except wide-angle intra-prediction modes are defined and a transform range when 67 intra-prediction modes are defined.

TABLE 7

| Condition | Replaced Intra Prediction Modes |
| --- | --- |
| W/H = 2 | Modes 2, 3, 4 |
| W/H > 2 | Modes 2, 3, 4, 5, 6 |
| W/H = 1 | None |
| H/W = 1/2 | Modes 32, 33, 34 |
| H/W < 1/2 | Modes 30, 31, 32, 33, 34 |

TABLE 8

| Condition | Replaced Intra Prediction Modes |
| --- | --- |
| W/H = 2 | Modes 2, 3, 4, 5, 6, 7 |
| W/H > 2 | Mode 2, 3, 4, 5, 6, 7, 8, 9, 10, 11 |
| W/H = 1 | None |
| H/W = 1/2 | Modes 61, 62, 63, 64, 65, 66 |
| H/W < 1/2 | Modes 57, 58, 59, 60, 61, 62, 63, 64, 65, 66 |

In the examples shown in Table 7 and Table 8, the number of alternative wide-angle intra-prediction modes falling within the transform range may differ depending on the ratio of the current block.

As wide-angle intra-prediction modes are used in addition to the existing intra-prediction modes, resources required for coding the wide-angle intra-prediction modes may be increased, and thus coding efficiency may be reduced. Accordingly, by coding alternative intra-prediction modes for the wide-angle intra-prediction modes, instead of coding the wide-angle intra-prediction modes as they are, it is possible to improve coding efficiency.

As an example, when the current block is coded in wide-angle intra-prediction mode #67, wide-angle intra-prediction mode #2, which is an alternative wide-angle intra-prediction mode for #67, may be coded to the intra-prediction mode of the current block. Also, when the current block is coded in wide-angle intra-prediction mode #-1, wide-angle intra-prediction mode #66, which is an alternative wide-angle intra-prediction mode for #-1, may be coded to the intra-prediction mode of the current block.

The decoder may decode the intra-prediction mode of the current block and may determine whether the decoded intra-prediction mode falls within the transform range. When the decoded intra-prediction mode is an alternative wide-angle intra-prediction mode, the intra-prediction mode may be transformed into the wide-angle intra-prediction mode.

Alternatively, when the current block is coded in the wide-angle intra-prediction mode, the wide-angle intra-prediction mode may be coded as it is.

The coding of the intra-prediction mode may be performed on the basis of the above-described MPM list. In detail, when a neighboring block is coded in the wide-angle intra-prediction mode, an MPM may be set on the basis of an alternative wide-angle intra-prediction mode corresponding to the wide-angle intra-prediction mode. As an example, when a neighboring block is coded in the wide-angle intra-prediction mode, variable candIntraPredX (X is A or B) may be set to be an alternative wide-angle intra-prediction mode.

When a prediction block is generated as a result of performing intra-prediction, prediction samples may be updated on the basis of the locations of the prediction samples included in the prediction block. The update method may be referred to as a sample-position-based intra-weighted-prediction method (or Position Dependent Prediction Combination (PDPC)).

Whether to use PDPC may be determined in consideration of the intra-prediction mode of the current block, the reference sample line of the current block, the size of the current block, or a color component. As an example, PDPC may be used when the intra-prediction mode of the current block is at least one of a mode having a smaller index value than Planar, DC, Vertical, and Horizontal or a mode having a greater index value than Horizontal. Alternatively, PDPC may be used only when at least one of the width and height of the current block is greater than 4. Alternatively, PDPC may be used only when the index of the reference picture line of the current block is 0. Alternatively, PDPC may be used only when the index of the reference picture line of the current block is greater than or equal to a predefined value. Alternatively, PDPC may be used only for a luminance component. Alternatively, whether to use PDPC may be determined according to whether two or more of the above conditions are satisfied.

As another example, information indicating whether PDPC is applied may be signaled in a bitstream.

When a prediction sample is acquired through an intra-prediction sample, a reference sample used to correct the prediction sample may be determined on the basis of the location of the acquired prediction sample. For convenience of description, in the following embodiments, a reference sample used to correct a prediction sample will be referred to as a PDPC reference sample. In addition, a prediction sample acquired through intra-prediction will be referred to as a first prediction sample, and a prediction sample acquired by correcting the first prediction sample will be referred to as a second prediction sample.

Figure 37:
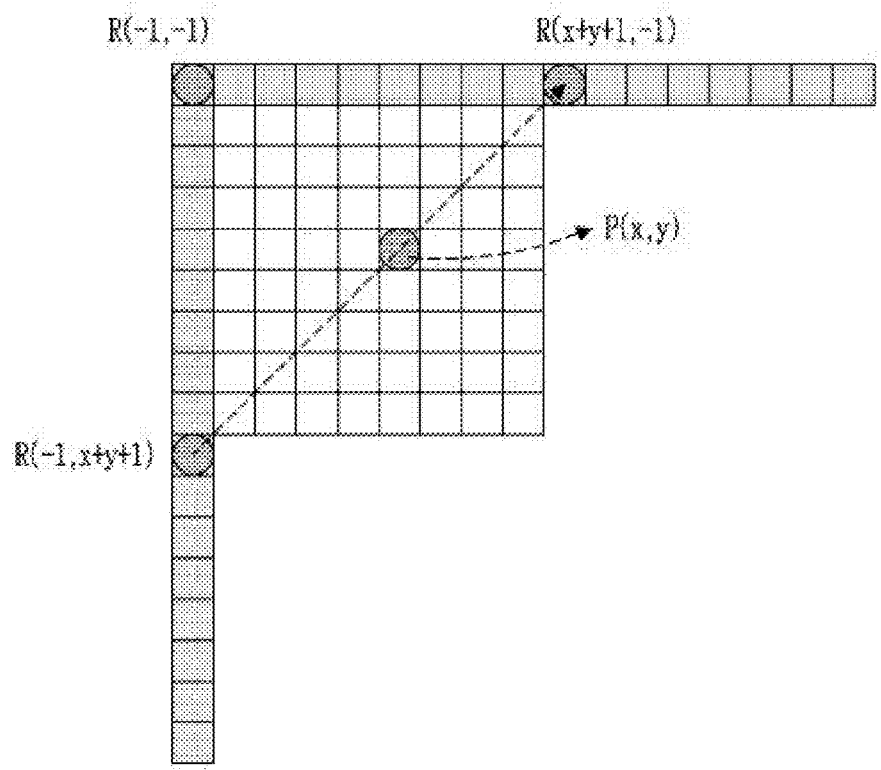
FIG. 37 is a diagram showing an application aspect of PDPC.

FIG. 37 is a diagram showing an application aspect of PDPC.

The first prediction sample may be corrected using at least one PDPC reference sample. The PDPC reference sample may include at least one of a reference sample adjacent to the upper-left corner of the current block, an upper reference sample located on the top of the current block, or a left reference sample located on the left of the current block.

At least one of the reference samples belonging to the reference sample line of the current block may be set as a PDPC reference sample. Alternatively, regardless of the reference sample line of the current block, at least one reference sample belonging to a reference sample line with index 0 may be set as a PDPC reference sample. As an example, although the first prediction sample is acquired using reference samples included in a reference sample line with index 1 or index 2, the second prediction sample may be acquired using reference samples included in a reference sample line with index 0.

The number or locations of PDPC reference samples used to correct the first prediction sample may be determined in consideration of at least one of the intra-prediction modes of the current block, the size of the current block, the shape of the current block, or the location of the first prediction sample.

As an example, when the intra-prediction mode of the current block is Planar or DC mode, the second prediction sample may be acquired using an upper reference sample and a left reference sample. In this case, the upper reference sample may be a reference sample perpendicular to the first prediction sample (e.g., a reference sample having the same x-coordinate), and the left reference sample may be a reference sample parallel to the first prediction sample (e.g., a reference sample having the same y-coordinate).

When the intra-prediction mode of the current block is a horizontal intra-prediction mode, the second prediction sample may be acquired using an upper reference sample. In this case, the upper reference sample may be a reference sample perpendicular to the first prediction sample.

When the intra-prediction mode of the current block is a vertical intra-prediction mode, the second prediction sample may be acquired using a left reference sample. In this case, the left reference sample may be a reference sample parallel to the first prediction sample.

When the intra-prediction mode of the current block is a diagonal lower-left intra-prediction mode or a diagonal upper-right intra-prediction mode, the second prediction sample may be acquired on the basis of an upper-left reference sample, an upper reference sample, and a left reference sample. The upper-left reference sample may be a reference sample adjacent to the upper-left corner of the current block (e.g., a reference sample located at (−1, −1)). The upper reference sample may be a reference sample diagonally located above and to the right of the first prediction sample, and the left reference sample may be a reference sample diagonally located below and to the left of the first prediction sample.

In summary, when the location of the first prediction sample is (x, y), R(−1, −1) may be set as the upper-left reference sample, and R(x+y+1, −1) or R(x, −1) may be set as the upper reference sample. Also, R(−1, x+y+1) or R(−1, y) may be set as the left reference sample.

As another example, the location of the left reference sample or the upper reference sample may be determined in consideration of at least one of the shape of the current block or whether a wide-angle intra-mode is applied.

In detail, when the intra-prediction mode of the current block is a wide-angle intra-prediction mode, a reference sample spaced by an offset from the reference sample located diagonally from the first prediction sample may be set as a PDPC reference sample. As an example, an upper reference sample R(x+y+k+1, −1) and a left reference sample R(−1, x+y−k+1) may be set as PDPC reference samples.

In this case, an offset k may be determined on the basis of the wide-angle intra-prediction mode. Equation 6 and Equation 7 represent an example of deriving an offset based on a wide-angle intra-prediction mode.

$$k = \text{CurrIntraMode} - 66$$

$$\text{if (CurrIntraMode} > 66) \quad \text{[Equation 6]}$$

$$k = -\text{CurrIntraMode}$$

$$\text{if (CurrIntraMode} < 0) \quad \text{[Equation 7]}$$

The second prediction sample may be determined on the basis of a weighted-sum operation between the first prediction sample and the PDPC reference samples. As an example, the second prediction sample may be acquired on the basis of Equation 8 below.

$$\text{pred}(x,y) = (xL*R_L + wT*R_T - wTL*R_{TL} + (64 - wL - wT + wTL)*\text{pre } d(x,y) + 32) >> 6 \quad \text{[Equation 8]}$$

In Equation 8, $R_L$ represents a left reference sample, $R_T$ represents an upper reference sample, and $R_{TL}$ represents an upper-left reference sample. pred(x,y) represents a prediction sample located at (x,y). wL represents a weight assigned to the left reference sample, wT represents a weight assigned to the upper reference sample, and wTL represents a weight assigned to the upper-left reference sample. The weight assigned to the first prediction sample may be derived by subtracting the weights assigned to the reference samples from the maximum value. For convenience of description, a weight assigned to the PDPC reference sample will be referred to as a PDPC weight.

A weight assigned to each reference sample may be determined on the basis of at least one of the intra-prediction mode of the current block or the location of the first prediction sample.

As an example, at least one of wL, wT, or wTL may be directly or inversely proportional to at least one of the x-coordinate or y-coordinate of the prediction sample. Alternatively, at least one of wL, wT, or wTL may be directly or inversely proportional to at least one of the width or height of the current block.

When the intra-prediction mode of the current block is DC, PDPC weights may be determined by Equation 9 below.

$$wT = 32 >> ((y<<1)>>\text{shift})$$

$$wL = 32 >> ((x<<1)>>\text{shift})$$

$$wTL = (wL>>4) + (wT>>4) \quad \text{[Equation 9]}$$

In Equation 9, x and y represent the location of the first prediction sample.

In Equation 9, variable shift, which is used for a bit shift operation, may be derived on the basis of the width or height of the current block. As an example, variable shift may be derived on the basis of Equation 10 or 11 below.

$$\text{shift} = (\log_2(\text{width}) - 2 + \log_2(\text{height}) - 2 + 2) >> 2 \quad \text{[Equation 10]}$$

$$\text{shift} = ((\text{Log}_2(n\text{TbW}) + \text{Log}_2(n\text{TbH}) - 2) >> 2) \quad \text{[Equation 11]}$$

Alternatively, variable shift may be derived in consideration of an intra-direction parameter of the current block.

The number or types of parameters used to derive variable shift may be determined differently depending on the intra-prediction mode of the current block. As an example, when the intra-prediction mode of the current block is Planar, DC, Vertical, or Horizontal, variable shift may be derived using the width and height of the current block as in the example shown in Equation 10 or Equation 11. When the intra-prediction mode of the current block is an intra-prediction mode having a greater index than the vertical intra-prediction mode, variable shift may be derived using the intra-direction parameter and the height of the current block. When the intra-prediction mode of the current block is an intra-prediction mode having a smaller index than the horizontal intra-prediction mode, variable shift may be derived using the intra-direction parameter and the width of the current block.

When the intra-prediction mode of the current block is Planar, the value of wTL may be set to 0. wL and wT may be derived on the basis of Equation 12 below.

$$wT[y] = 32 >> ((y<<1)>>n\text{Scale})$$

$$wL[x] = 32 >> ((x<<1)>>n\text{Scale}) \quad \text{[Equation 12]}$$

When the intra-prediction mode of the current block is a horizontal intra-prediction mode, wT may be set to 0, and wTL and wL may be set identically. On the other hand, when the intra-prediction mode of the current block is a vertical intra-prediction mode, wL may be set to 0, and wTL and wL may be set identically.

When the intra-prediction mode of the current block is an upward and rightward intra-prediction mode having a greater index value than the vertical intra-prediction mode, PDPC weights may be derived using Equation 13 below.

$$wT = 16 >> ((y<<1)>>\text{shift})$$

$$wL = 16 >> ((x<<1)>>\text{shift})$$

$$wTL = 0 \qquad \text{[Equation 13]}$$

On the other hand, when the intra-prediction mode of the current block is a downward and leftward intra-prediction mode having a smaller index value than the horizontal intra-prediction mode, PDPC weights may be derived using Equation 14 below.

$$wT16 >> ((y<<1)>>\text{shift})$$

$$wL = 16 >> ((x<<1)>>\text{shift})$$

$$wTL = 0 \qquad \text{[Equation 14]}$$

As in the above-described embodiments, PDPC weights may be determined on the basis of the positions x and y of the prediction sample.

As another example, a weight assigned to each PDPC reference sample may be determined in units of sub-blocks. Prediction samples included in a sub-block may share the same PDPC weights.

The size of the sub-block, which is a basic unit for determining weights, may be predefined in an encoder and a decoder. As an example, weights may be determined for 2×2 or 4×4 sub-blocks.

Alternatively, the size, shape, or number of sub-blocks may be determined depending on the size or shape of the current block. As an example, the coding block may be split into four sub-blocks regardless of the size of the coding block. Alternatively, the coding block may be split into four or sixteen sub-blocks depending on the size of the coding block.

Alternatively, the size, shape, or number of sub-blocks may be determined depending on the intra-prediction mode of the current block. As an example, N columns (or N rows) may be set as one sub-block when the intra-prediction mode of the current block is horizontal, and N rows (or N columns) may be set as one sub-block when the intra-prediction mode of the current block is vertical.

Equations 15 to 17 represent an example of determining PDPC weights for a 2×2 sub-block. Equation 15 illustrates that the intra-prediction mode of the current block is DC mode.

$$wT = 32 >> (((y<<\log_2 K)>>\log_2 K)<<1)>>\text{shift})$$

$$wL = 32 >> (((x<<\log_2 K))>>\log_2 K)<<1)>>\text{shift})$$

$$wTL = (wL>>4) + (wT>>4) \qquad \text{[Equation 15]}$$

In Equation 15, K may be a value determined on the basis of the intra-prediction mode or the size of the sub-block.

Equation 16 illustrates that the intra-prediction mode of the current block is an upward and rightward intra-prediction mode having a greater index value than the vertical intra-prediction mode.

$$wT = 16 >> (((y<<\log_2 K))>>\log_2 K)<<1)>>\text{shift})$$

$$wL = 16 >> (((x<<\log_2 K))>>\log_2 K)<<1)>>\text{shift}) \qquad \text{[Equation 16]}$$

$$wTL = 0$$

Equation 17 illustrates that the intra-prediction mode of the current block is a downward and leftward intra-prediction mode having a smaller index value than the horizontal intra-prediction mode.

$$wT = 16 >> (((y<<\log_2 K))>>\log_2 K)<<1)>>\text{shift})$$

$$wL = 16 >> (((x<<\log_2 K))>>\log_2 K)<<1)>>\text{shift})$$

$$wTL = 0 \qquad \text{[Equation 17]}$$

In Equations 15 to 17, x and y represent the location of a reference sample in the sub-block. The reference sample may be one of a sample located on an upper-left corner of the sub-block, a sample located at the center of the sub-block, or a sample located on a lower-right corner of the sub-block.

Equations 18 to 20 represent an example of determining PDPC weights for a 4×4 sub-block. Equation 18 illustrates that the intra-prediction mode of the current block is DC mode.

$$wT = 32 >> (((y<<2)>>2)<<1)>>\text{shift})$$

$$wL = 32 >> (((x<<2)>>2)<<1)>>\text{shift})$$

$$wTL = (wL>>4) + (wT>>4) \qquad \text{[Equation 18]}$$

Equation 19 illustrates that the intra-prediction mode of the current block is an upward and rightward intra-prediction mode having a greater index value than the vertical intra-prediction mode.

$$wT = 16 >> (((y<<2)>>2)<<1)>>\text{shift})$$

$$wL = 16 >> (((x<<2)>>2)<<1)>>\text{shift})$$

$$wTL = 0 \qquad \text{[Equation 19]}$$

Equation 20 illustrates that the intra-prediction mode of the current block is a downward and leftward intra-prediction mode having a smaller index value than the horizontal intra-prediction mode.

$$wT = 16 >> (((y<<2)>>2)<<1)>>\text{shift})$$

$$wL = 16 >> (((x<<2)>>2)<<1)>>\text{shift})$$

$$wTL = 0 \qquad \text{[Equation 20]}$$

In the above embodiments, the PDPC weights are described as being determined in consideration of the locations of prediction samples included the sub-block or the first prediction sample. The PDPC weights may be determined in further consideration of the current block.

As an example, in the case of DC mode, a method of deriving the PDPC weights may vary depending on whether the current block has a non-square shape in which a width is greater than a height or a non-square shape in which a height is greater than a width.

Equation 21 shows an example of deriving the PDPC weights when the current block has a non-square shape in which a width is greater than a height, and Equation 22 shows an example of deriving the PDPC weights when the current block has a non-square shape in which a height is greater than a width.

$wT=32>>((y<<1)>>\text{shift})$ $wL=32>>(x>>\text{shift})$ $wTL=(wL>>4)+(wT>>4)$ [Equation 21]

$wT>>(y>>\text{shift})$ $wL=32>>((x<<1)>>\text{shift})$ $wTL=(xL>>4)+(wT>>4)$ [Equation 22]

When the current block is non-square, the current block may be predicted using a wide-angle intra-prediction mode. Even when the wide-angle intra-prediction is applied, the first prediction sample may be updated by applying PDPC.

When the wide-angle intra-prediction is applied to the current block, the PDPC weights may be determined in consideration of the shape of the coding block.

As an example, when the current block has a non-square shape in which a width is greater than a height, an upper reference sample located to the right of and above the first prediction sample may be closer to the first prediction sample than a left reference sample located to the left of and below the first prediction sample depending on the location of the first prediction sample. Accordingly, when the first prediction sample is corrected, a weight applied to the upper reference sample may be set to have a greater value than a weight applied to the left reference sample.

On the other hand, when the current block has a non-square shape in which a height is greater than a width, a left reference sample located to the left of and below the first prediction sample may be closer to the first prediction sample than an upper reference sample located to the right of and above the first prediction sample depending on the location of the first prediction sample. Accordingly, when the first prediction sample is corrected, a weight applied to the left reference sample may be set to have a greater value than a weight applied to the upper reference sample.

Equation 23 represents an example of deriving the PDPC weights when the intra-prediction mode of the current block is a wide-angle intra-prediction mode with an index greater than 66.

$wT=16>>(y>>\text{shift})$ $wL=16>>((x<<1)>>\text{shift})$ $wTL=0$ [Equation 23]

Equation 24 represents an example of deriving the PDPC weights when the intra-prediction mode of the current block is a wide-angle intra-prediction mode with an index smaller than 0.

$wT=16>>((y<<1)>>\text{shift})$ $wL=16>>(x>>\text{shift})$ $wTL=0$ [Equation 24]

The PDPC weights may be determined on the basis of the ratio of the current block. The ratio of the current block indicates a width-and-height ratio of the current block and may be defined using Equation 25 below.

$wh\text{Ratio}=CU\text{width}/CU\text{height}$ [Equation 25]

The method of deriving the PDPC weights may be variably determined depending on the intra-prediction mode of the current block.

As an example, Equation 26 and Equation 27 represent an example of deriving the PDPC weights when the intra-prediction mode of the current block is DC. In detail, Equation 26 is an example in which the current block has a non-square shape in which a width is greater than a height, and Equation 27 is an example in which the current block has a non-square shape in which a height is greater than a width.

$wT=32>>((y<<1)>>\text{shift})$ $wL=32>>(((x<<1)>>wh\text{Ratio})>>\text{shift})$ $wTL=(wL>>4)+(wT>>4)$ [Equation 26]

$wT=32>>(((y<<1)>>1/wh\text{Ratio})>>\text{shift})$ $wL=32>>((x<<1)>>\text{shift})$ $wTL=(wL>>4)+(wT>>4)$ [Equation 27]

Equation 28 represents an example of deriving the PDPC weights when the intra-prediction mode of the current block is a wide-angle intra-prediction mode with an index greater than 66.

$wT=16>>(((y<<1)>>1/wh\text{Ratio})>>\text{shift})$ $wL=16>>((x<<1)>>\text{shift})$ $wTL=0$ [Equation 28]

Equation 29 represents an example of deriving the PDPC weights when the intra-prediction mode of the current block is a wide-angle intra-prediction mode with an index smaller than 0.

$wT=16>>((y<<1)>>\text{shift})$ $wL=16>>(((x<<1)>>wh\text{Ratio})>>\text{shift}$ $wTL=0$ [Equation 29]

A residual block may be derived by subtracting a prediction from an original block. In this case, when the residual block is changed to the frequency domain, the subjective quality of the video does not significantly decrease even if high-frequency components are removed from frequency components. Accordingly, when the values of the high-frequency components are changed to small values or when the values of the high-frequency components are set to 0, it is possible to increase compression efficiency without causing significant visual distortion. Considering the above characteristics, the current block may be transformed in order to decompose the residual block into two-dimensional frequency components. The transform may be performed using a transform technique such as Discrete Cosine Transform (DCT) or Discrete Sine Transform (DST).

DCT is using cosine transform to decompose (or transform) the residual block into two-dimensional frequency components, and DST is using sine transform to decompose (or transform) the residual block into two-dimensional frequency components. As a result of the transform of the residual block, the frequency components may be expressed with a basic pattern. As an example, when DCT is performed on an N×N block, $N^2$ basic pattern components may be acquired. The size of each of the basic pattern components included in the N×N block may be acquired through the transform. According to the transform technique used, the size of the basic pattern component may be referred to as a DCT coefficient or a DST coefficient.

The transform technique DCT is mainly used to transform a block in which many non-zero low-frequency components are distributed. The transform technique DST is mainly used for an block in which many high-frequency components are distributed.

The residual block may be transformed using a transform technique other than DCT or DST.

Transforming the residual block into two-dimensional frequency components will be referred to as a two-dimensional transform. In addition, the size of the basic pattern components acquired through the transform result will be referred to as a transform coefficient. As an example, the transform coefficient may refer to a DCT coefficient or a DST coefficient. When both of first transform and second transform to be described below are applied, the transform coefficient may refer to the size of a basic pattern component generated as a result of the second transform.

The transform technique may be determined in units of blocks. The transform technique may be determined on the basis of at least one of the prediction mode of the current block or the size of the current block. As an example, when the current block is coded in the intra-prediction mode and the size of the current block is smaller than N×N, the transform may be performed using the transform technique DST. On the other hand, when the above condition is not satisfied, the transform may be performed using the transform technique DCT.

The two-dimensional transform may not be performed on some of the residual blocks. Not performing the two-dimensional transform may be referred to as transform skip. When the transform skip is applied, quantization may be applied to residual values on which transform is not performed.

After the current block is transformed using DCT or DST, the transformed current block may be re-transformed. In this case, the transform based on DCT or DST may be defined as the first transform, and the re-transform of a block subjected to the first transform may be defined as the second transform.

The first transform may be performed using one of a plurality of transform core candidates. As an example, the first transform may be performed using one of DCT2, DCT8, or DCT7.

Different transform cores may be used in the horizontal direction and the vertical direction. Information indicating a combination of the vertical transform core and the horizontal transform core may be signaled in a bitstream.

The first transform and the second transform may be performed in different units. As an example, the first transform may be performed on an 8×8 block, and the second transform may be performed on a 4×4 sub-block of the transformed 8×8 block. In this case, the transform coefficient of residual areas where the second transform is not performed may be set to 0.

Alternatively, the first transform may be performed on a 4×4 block, and the second transform may be performed on the area of an 8×8 block including the transformed 4×4 block.

Information indicating whether to perform the second transform may be signaled in a bitstream.

Alternatively, whether to perform the second transform may be determined on the basis of whether a horizontal transform core and a vertical transform core are identical. As an example, the second transform may be performed only when the horizontal transform core and the vertical transform core are identical. Alternatively, the second transform may be performed only when the horizontal transform core and the vertical transform core are different.

Alternatively, the second transform may be allowed only when the horizontal transform and the vertical transform use a predefined transform core. As an example, when a DCT2 transform core is used for the horizontal transform and the vertical transform, the second transform may be allowed.

Alternatively, whether to perform the second transform may be determined on the basis of the number of non-zero transform coefficients of the current block. As an example, it may be set not to use the second transform when a non-zero transform coefficient of the current block is smaller than or equal to a threshold value, and it may be set to use the second transform when the non-zero transform coefficient of the current block is greater than the threshold value. It may be set to use the second transform only when the current block is coded through intra-prediction.

The size or shape of a sub-block to be subjected to the second transform may be determined on the basis of the shape of the current block.

Figure 38:
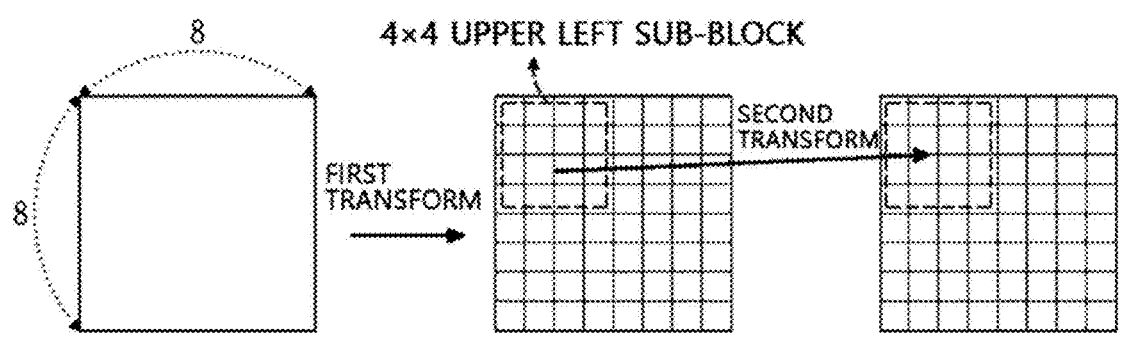
FIGS. 38 and 39 are diagrams showing a sub-block to be subjected to a second transform.
Figure 39:
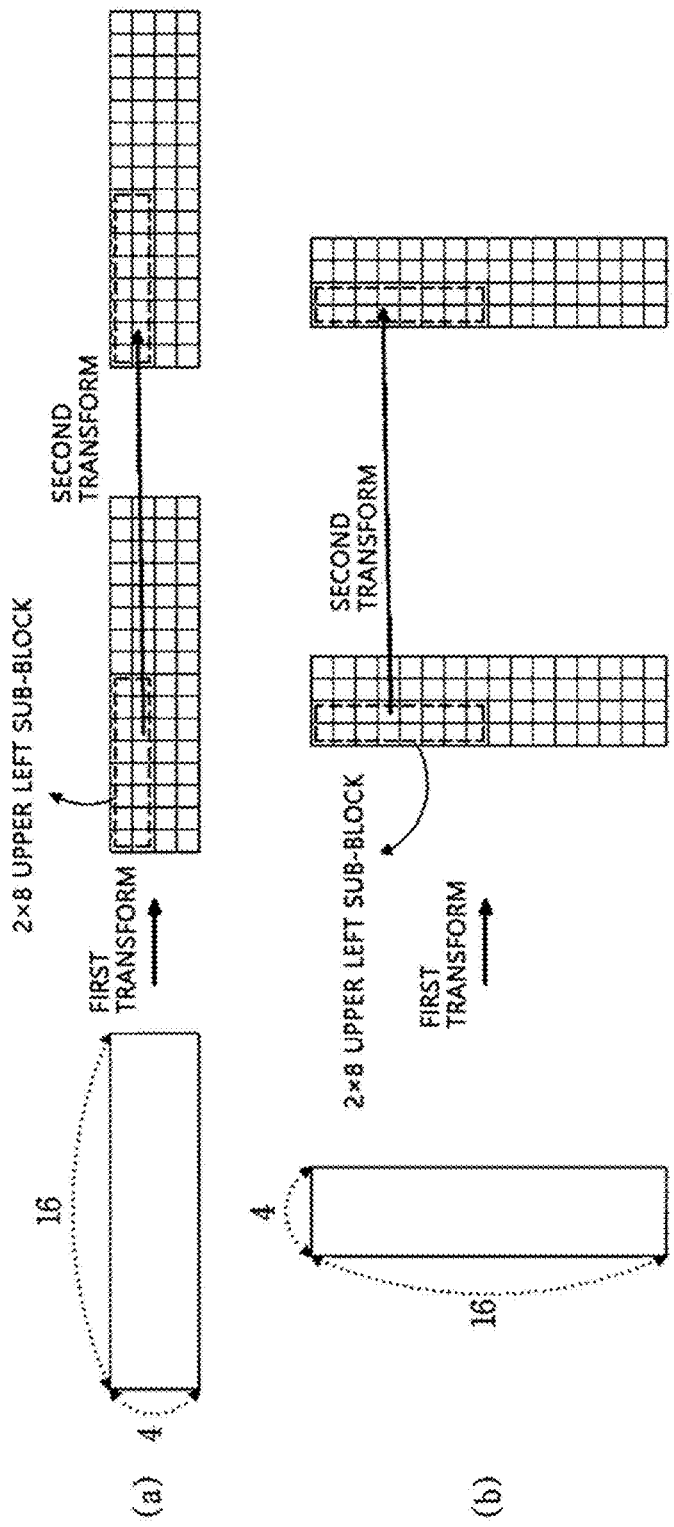

FIGS. 38 and 39 are diagrams showing a sub-block to be subjected to a second transform.

When the current block is square, the second transform may be performed on an N×N sub-block located at the upper-left corner of the current block after the first transform is performed. As an example, when the current block is an 8×8 coding block, the second transform may be performed on a 4×4 sub-block located at the upper-left corner of the current block after the first transform is performed on the current block (See FIG. 38).

When the current block has a non-square shape in which a width is four or more times a height, the second transform may be performed on a kN×4 kN sub-block located at the upper-left corner of the current block after the first transform is performed. As an example, when the current block has a non-square shape with a size of 16×4, the first transform may be performed on the current block, and then the second transform may be performed on a 2×8 sub-block located at the upper-left corner of the current block (See FIG. 39A).

When the current block has a non-square shape in which a height is four or more times a width, the second transform may be performed on a 4 kN×kN sub-block located at the upper-left corner of the current block after the first transform is performed. As an example, when the current block has a non-square shape with a size of 16×4, the first transform may be performed on the current block, and then the second transform may be performed on a 2×8 sub-block located at the upper-left corner of the current block (See FIG. 39B).

The decoder may perform an inverse transform of the second transform (a second inverse transform) and may perform an inverse transform of the first transform (a first inverse transform) on a result of the second inverse transform. As a result of performing the second inverse transform and the first inverse transform, residual signals for the current block may be acquired.

The quantization is to reduce the energy of a block, and the quantization process includes dividing a transform coefficient by a specific constant value. The constant value may be derived by a quantization parameter, and the quantization parameter may be defined as a value between 1 and 63.

When a transform and quantization is performed by the encoder, the decoder may acquire a residual block through an inverse quantization and an inverse transform. The decoder may acquire a reconstructed block for the current block by adding the prediction block and the residual block.

Information indicating the transform type of the current block may be signaled in a bitstream. The information may be index information tu_mts_idx, which indicates one of a plurality of combinations of a horizontal transform type and a vertical transform type.

A vertical transform core and a horizontal transform core may be determined on the basis of transform type candidates specified by index information tu_mts_idx. Table 9 and Table 10 represent transform type combinations corresponding to tu_mts_idx.

TABLE 9

| tu_mts_idx | Transform Type | |
| --- | --- | --- |
| | Horizontal | Vertical |
| 0 | SKIP | SKIP |
| 1 | DCT-II | DCT-II |
| 2 | DST-VII | DST-VII |
| 3 | DCT-VIII | DST-VII |
| 4 | DST-VII | DCT-VIII |
| 5 | DCT-VIII | DCT-VIII |

TABLE 10

| tu_mts_idx | Transform Type | |
| --- | --- | --- |
| | Horizontal | Vertical |
| 0 | DCT-II | DCT-II |
| 1 | SKIP | SKIP |
| 2 | DST-VII | DST-VII |
| 3 | DCT-VIII | DST-VII |
| 4 | DST-VII | DCT-VIII |
| 5 | DCT-VIII | DCT-VIII |

It may be determined that the transform type is one of DCT2, DST7, DCT8, or transform skip. Alternatively, the transform type combination candidates may be constructed using only the transform cores excluding transform skip.

When Table 9 is used and tu_mts_idx is 0, transform skip may be applied in the horizontal direction and the vertical direction. When tu_mts_idx is 1, DCT2 may be applied in the horizontal direction and the vertical direction. When tu_mts_idx is 3, DCT8 may be applied in the horizontal direction, and DCT7 may be applied in the vertical direction.

When Table 10 is used and tu_mts_idx is 0, DCT2 may be applied in the horizontal direction and the vertical direction. When tu_mts_idx is 1, transform skip may be applied in the horizontal direction and the vertical direction. When tu_mts_idx is 3, DCT8 may be applied in the horizontal direction, and DCT7 may be applied in the vertical direction.

Whether to code the index information may be determined on the basis of at least one of the size or shape of the current block or the number of non-zero coefficients. As an example, when the number of non-zero coefficients is smaller than or equal to a threshold value, the index information may not be signaled, and a default transform type may be applied to the current block. Here, the default transform type may be DST7. Alternatively, a default mode may vary depending on the size, shape, or intra-prediction mode of the current block.

The threshold value may be determined on the basis of the size or shape of the current block. As an example, the threshold value may be set to 2 when the size of the current block is smaller than or equal to 32×32, and the threshold value may be set to 4 when the current block is greater than 32×32 (e.g., when the current block is a 32×64 or 64×32 coding block).

A plurality of lookup tables may be prestored in an encoder or decoder. At least one of index values assigned to the transform type combination candidates, the types of transform type combination candidates, or the number of transform type combination candidates may differ for each of the plurality of lookup tables.

A lookup table for the current block may be selected on the basis of at least one of the size, shape, prediction mode, or intra-prediction mode of the current block, whether to apply secondary transform, or whether to apply transform skip to a neighboring block.

As an example, the lookup table of Table 9 may be used when the size of the current block is smaller than or equal to 4×4 or when the current block is coded through inter-prediction, and the lookup table of Table 10 may be used when the size of the current block is greater than 4×4 or when the current block is coded through intra-prediction.

Alternatively, information indicating one of the plurality of lookup tables may be signaled in a bitstream. The decoder may select a lookup table for the current block on the basis of the information.

As another example, an index assigned to a transform type combination candidate may be adaptively determined on the basis of at least one of the size, shape, prediction mode, or intra-prediction mode of the current block, whether to apply secondary transform, or whether to apply transform skip to a neighboring block. As an example, an index assigned to the transform skip when the size of the current block is 4×4 may have a smaller value than an index assigned to the transform skip when the size of the current block is greater than 4×4. In detail, index 0 may be assigned to the transform skip when the size of the current block is 4×4, and an index greater than 0 (e.g., index 1) may be assigned to the transform skip when the current block is greater than 4×4 and is less than or equal to 16×16. When the current block is greater than 16×16, the maximum value (e.g., 5) may be assigned to the index of the transform skip.

Alternatively, when the current block is coded through inter-prediction, index 0 may be applied to the transform skip. When the current block is coded through intra-prediction, an index greater than 0 (e.g., index 1) may be assigned to the transform skip.

Alternatively, when the current block is a 4×4 block that is coded through inter-prediction, index 0 may be assigned to the transform skip. On the other hand, when the current block is not coded through inter-prediction or when the current block is greater than 4×4, an index greater than 0 (e.g., index 1) may be assigned to the transform skip.

Transform type combination candidates that are different from the transform type combination candidates listed in Table 9 and Table 10 may be defined and used. As an example, the transform skip may be applied to one of the horizontal transform or the vertical transform, and a transform type combination candidate to which a transform core such as DCT7, DCT8, or DST2 is applied may be used for the other one. In this case, whether to use the transform skip for a horizontal transform type candidate or a vertical transform type candidate may be determined on the basis of at least one of the size (e.g., width and/or height), shape, prediction mode, or intra-prediction mode of the current block.

Alternatively, information indicating whether a specific transform type candidate is available may be signaled in a bitstream. As an example, a flag indicating whether to use the transform skip for the horizontal direction and the vertical direction as a transform type candidate may be signaled. Whether a specific transform type combination candidate among a plurality of transform type combination candidates is included may be determined according to the flag.

Alternatively, whether the specific transform type candidate is applied to the current block may be signaled in a bitstream. As an example, a flag cu_mts_flag, which indicates whether to apply DCT2 in the horizontal direction and the vertical direction, may be signaled. When the value of cu_mts_flag is 1, DCT2 may be set as the transform core for the vertical direction and the horizontal direction. When the value of cu_mts_flag is 0, DCT8 or DST7 may be set as the transform core for the vertical direction and the horizontal direction. Alternatively, when the value of cu_mts_flag is 0, information tu_mts_idx, which specifies one of the plurality of transform type combination candidates, may be signaled.

When the current block has a non-square shape in which a width is greater than a height or a non-square shape in which a height is greater than a width, the coding of cu_mts_flag may be omitted, and the value of cu_mts_flag may be considered to be zero.

The number of available transform type combination candidates may be set differently depending on the size, shape, or intra-prediction mode of the current block. As an example, three or more transform type combination candidates may be used when the current block is square, and two transform type combination candidates may be used when the current block is non-square. Alternatively, when the current block is square, only transform type combination candidates having a horizontal transform type and a vertical transform type different from each other among the transform type combination candidates may be used.

When the current block can use three or more transform type combination candidates, index information tu_mts_idx, which indicates one of the transform type combination candidates, may be signaled. On the other hand, when the current block can use two transform type combination candidates, a flag mts_flag, which indicates one of the transform type combination candidates, may be signaled. Table 11 below represents a coding aspect of information for specifying transform type combination candidates according to the shape of the current block.

TABLE 11

| residual_coding( x0, y0, log2TbWidth, log2TbHeight, cIdx ) { | Descriptor |
|---|---|
| ... | |
| if( cu_mts_flag[ x0 ][ y0 ] && ( cIdx = = 0 ) && | |
| !transform_skip_flag[ x0 ][ y0 ] cIdx && | |
| ( ( CuPredMod[ x0 ][ y0 ] = = MODE_INTRA && | |
| numSigCoeff > 2) \|\| | |
| ( CuPredMode[ x0 ][ y0 ] = = MODE_INTER ) ) ) { | |
| if (cbHeight == cbWidth) { | |
| mts_idx[ x0 ][ y0 ] | ae(v) |
| } else { | |
| mts_flag[ x0 ][ y0 ] | u(1) |
| } | |
| } | |
| } | |

Indices of the transform type combination candidates may be rearranged (or reordered) according to the shape of the current block. As an example, indices assigned to transform type combination candidates when the current block is square may be different from indices assigned to transform type combination candidates when the current block is non-square. As an example, a transform type combination may be selected on the basis of Table 12 when the current block is square, and a transform type combination may be selected on the basis of Table 13 when the current block is non-square.

TABLE 12

| | INTRA | | INTER | |
|---|---|---|---|---|
| mts_idx | Horizontal Transform Core | Vertical Transform Core | Horizontal Transform Core | Vertical Transform Core |
| 0 | DST7 | DST7 | DCT8 | DCT8 |
| 1 | DCT8 | DST7 | DST7 | DCT8 |
| 2 | DST7 | DCT8 | DCT8 | DST7 |
| 3 | DCT8 | DCT8 | DST7 | DST7 |

TABLE 13

| | INTRA | | INTER | |
|---|---|---|---|---|
| mts_idx | Horizontal Transform Core | Vertical Transform Core | Horizontal Transform Core | Vertical Transform Core |
| 0 | DST8 | DST7 | DCT7 | DCT8 |
| 1 | DCT7 | DST8 | DST8 | DCT7 |
| 2 | DST7 | DCT7 | DCT7 | DST7 |
| 3 | DCT8 | DCT8 | DST7 | DST7 |

A transform type may be determined on the basis of the number of horizontal non-zero coefficients of the current block or the number of vertical non-zero coefficients of the current block. Here, the number of horizontal non-zero coefficients indicates the number of non-zero coefficients included in 1×N (here, N is the width of the current block), and the number of vertical non-zero coefficients indicates the number of non-zero coefficients included in N×1 (here, N is the height of the current block). A first transform type may be applied in the horizontal direction when the maximum value of the horizontal non-zero coefficients is smaller than or equal to a threshold value, and a second transform type may be applied in the horizontal direction when the maximum value of the horizontal non-zero coefficients is greater than the threshold value. The first transform type may be applied in the vertical direction when the maximum value of the vertical non-zero coefficients is smaller than or equal to a threshold value, and a second transform type may be applied in the vertical direction when the maximum value of the vertical non-zero coefficients is greater than the threshold value.

FIG. 40 is a diagram for describing an example in which the transform type of the current block is determined.

As an example, when the current block is coded through intra-prediction and the maximum value of the horizontal non-zero coefficients of the current block is less than or equal to 2 (see FIG. 40A), DST7 may be determined as the horizontal transform type.

When the current block is coded through intra-prediction and the maximum value of the vertical non-zero coefficients of the current block is greater than 2 (see FIG. 40B), DCT2 or DCT8 may be determined as the vertical transform type.

A residual coefficient may be coded in transform units or in sub-transform units. Here, the residual coefficient refers to a transform coefficient generated through transform, a transform skip coefficient generated through transform skip, or a quantized coefficient generated by quantizing a coefficient or the transform coefficient.

The transform unit may refer to a block subjected to the first transform or the second transform. The sub-transform unit refers to a block smaller than the transform unit. As an example, the sub-transform unit may be a 4×4, 2×8, or 8×2 block.

At least one of the size or shape of the sub-transform unit may be determined on the basis of the size or shape of the current block. As an example, the sub-transform unit is also set to have a non-square shape in which a width is greater than a height (e.g., 8×2) when the current block has a non-square shape in which a width is greater than a height, and the sub-transform unit may also be set to have a non-square shape in which a height is greater than a width (e.g., 2×8) when the current block has a non-square shape in which a height is greater than a width. When the current block is square, the sub-transform unit may also be set to have a square shape (e.g., 4×4).

When a plurality of sub-transform units are included in the current block, the sub-transform units may be sequentially encoded or decoded. A residual coefficient may be coded using entropy coding such as arithmetic coding. A method of encoding or decoding a residual coefficient will be described in detail below with reference to the drawing.

Figure 41:
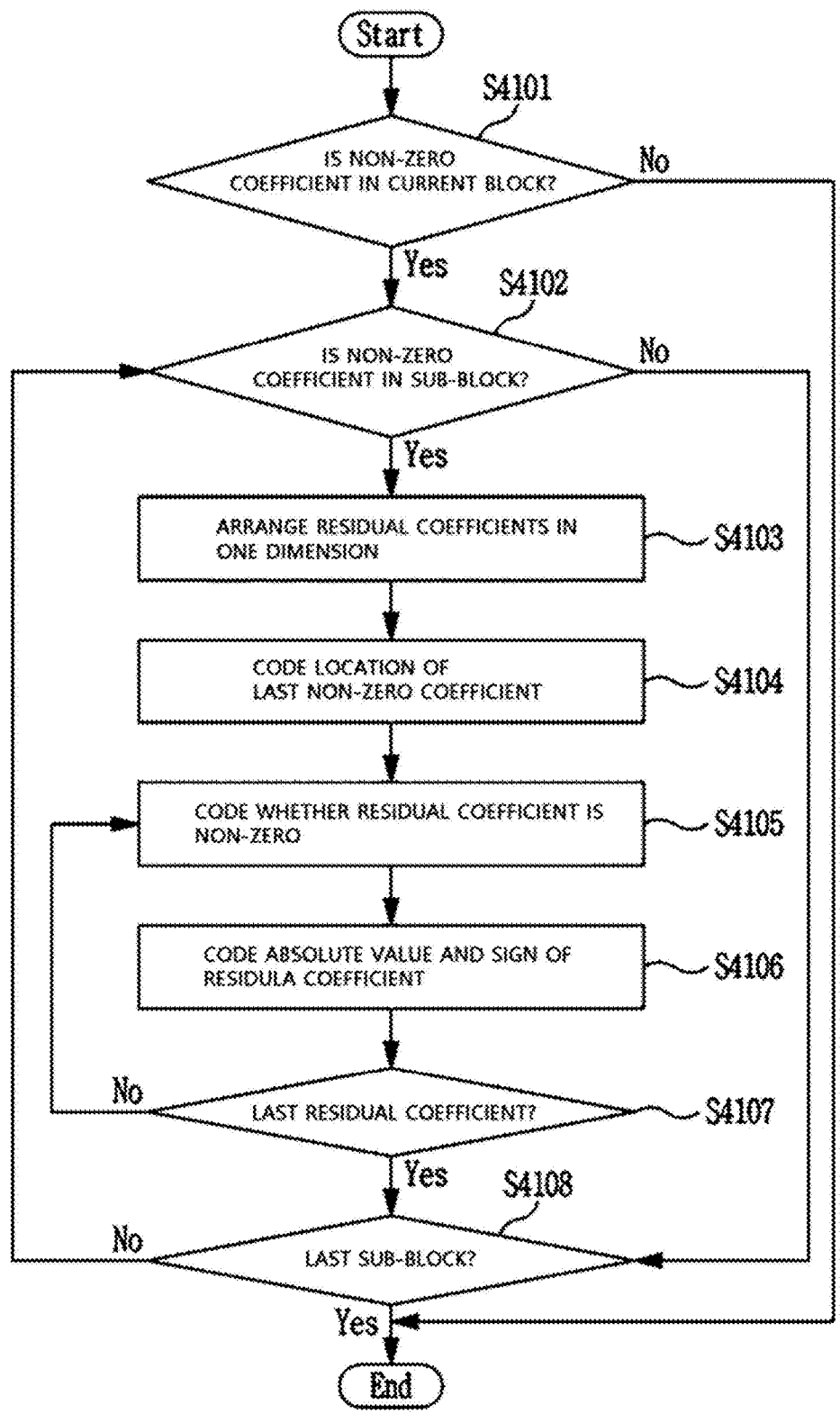
FIG. 41 is a flowchart showing a method of coding a residual coefficient.

FIG. 41 is a flowchart showing a method of coding a residual coefficient.

In this embodiment, it is assumed that the current block includes one or more sub-transform units. In addition, it is assumed that a sub-transform unit has a size of 4×4. However, this embodiment may be applied as it is even when the size of the sub-transform unit or the shape of the sub-transform unit is different from that described above.

Whether a non-zero coefficient is present in the current block may be determined (S4101). The non-zero coefficient indicates a residual coefficient of which the absolute value is greater than 0. Information indicating whether a non-zero coefficient is present in the current block may be coded and signaled. As an example, the information may be a 1-bit flag and may be a coded block flag (CBF).

When a non-zero coefficient is present in the current block, whether a non-zero coefficient is present for each sub-transform unit may be determined (S4102). Information indicating whether a non-zero coefficient is present for each sub-transform unit may be coded and signaled. As an example, the information may be a 1-bit flag and may be a coded sub-block flag (CSBF). The sub-transform units may be coded in a preselected scanning order.

When a non-zero coefficient is present in a sub-transform unit, residual coefficients in the sub-transform unit may be arranged in one dimension in order to code the residual coefficients of the sub-transform unit (S4103). The residual coefficients may be arranged in one dimension in a preselected scanning order.

The scanning order may include at least one of diagonal scan, horizontal scan, vertical scan or inverse scans thereof.

Figure 42:
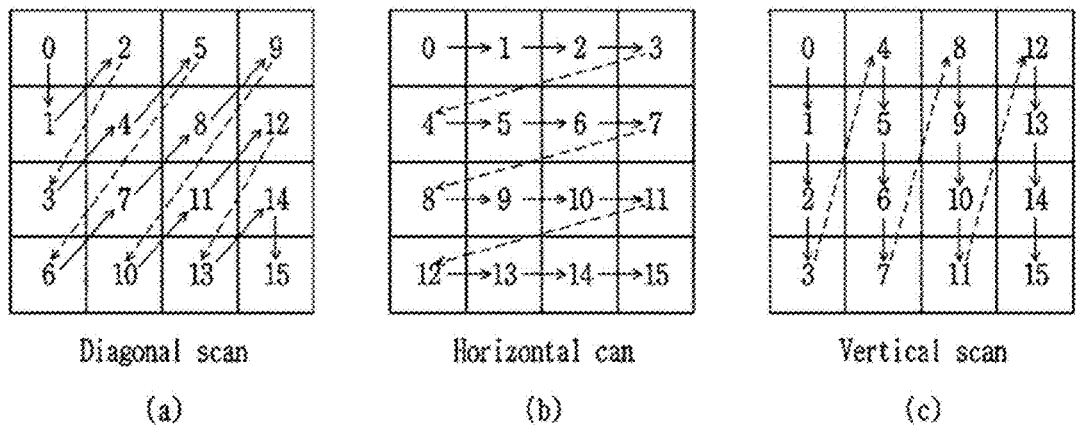
FIGS. 42 and 43 are diagrams showing an arrangement order of residual coefficients for each scanning order.
Figure 43:
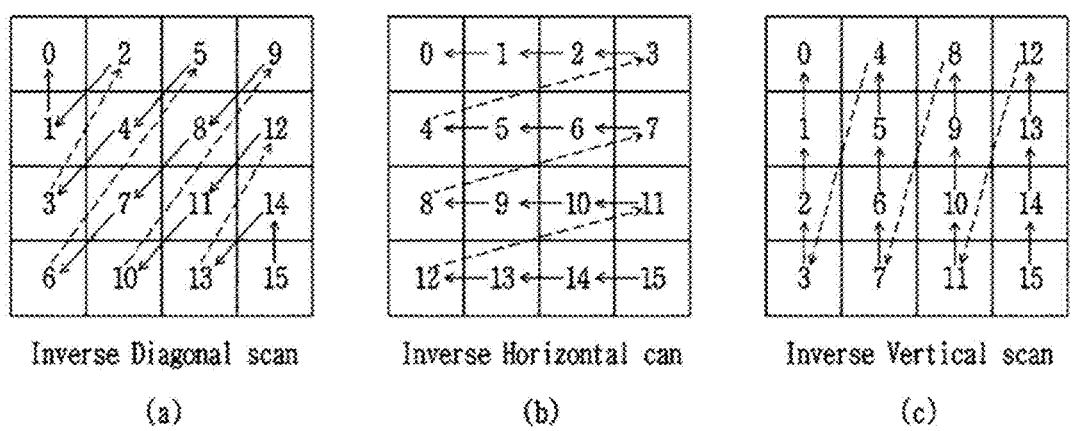

FIGS. 42 and 43 are diagrams showing an arrangement order of residual coefficients for each scanning order.

FIGS. 42A to 42C represent diagonal scan, horizontal scan, and vertical scan, and FIGS. 43A to 43C represent inverse scans thereof.

The residual coefficients may be arranged in one dimension in a selected scanning order.

The scanning order may be determined in consideration of at least one of the size, shape, or intra-prediction mode of the current block, a transform core used for primary transform, or whether to apply secondary transform. As an example, when the current block has a non-square shape in which a width is greater than a height, the residual coefficient may be coded using the inverse horizontal scan. On the other hand, when the current block has a non-square shape in which a height is greater than a width, the residual coefficient may be coded using the inverse vertical scan.

Alternatively, rate distortion optimization (RDO) may be calculated for each of a plurality of scanning orders, and a scanning order having the lowest RDO may be determined as the scanning order of the current block. In this case, information indicating the scanning order of the current block may be coded and signaled.

A scanning order candidate that can be used when a transform skip coefficient is coded may be different from a scanning order candidate that can be used when a transform coefficient is coded. As an example, the reverse of the scanning order candidate that can be used when the transform coefficient is coded may be set as the scanning order candidate that can be used to code the transform skip coefficient.

As an example, when the transform coefficient is coded using one of inverse diagonal scan, inverse horizontal scan, or inverse vertical scan, the transform skip coefficient may be coded using one of diagonal scan, horizontal scan, or vertical scan.

Next, the location of the last scanned non-zero coefficient in the transform block may be coded (S4103). The x-axis location and y-axis location of the last non-zero coefficient may be coded.

Figure 44:
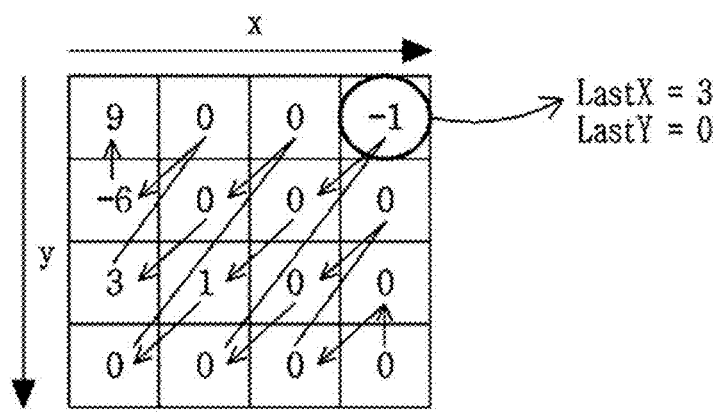
FIG. 44 shows an example in which the location of the last non-zero coefficient is coded.

FIG. 44 shows an example in which the location of the last non-zero coefficient is coded.

In the example shown in FIG. 44, when diagonal scanning is applied, a residual coefficient located in the upper-right corner of the transform block may be set as the last non-zero coefficient. The x-coordinate LastX of the residual coefficient is 3, and the y-coordinate LastY of the residual coefficient is 0. LastX may be coded while separated into last_sig_coeff_x_prefix, which is a prefix part, and last_sig_coeff_x_suffix, which is a suffix part. LastY may also be coded while separated into last_sig_coeff_y_prefix, which is a prefix part, and last_sig_coeff_y suffix, which is a suffix part.

When the location of the last non-zero coefficient is determined, information indicating whether residual coefficients earlier than the last non-zero coefficient in the scanning order are non-zero coefficients may be coded (S4104). The information may be a 1-bit flag sig_coeff_flag. The value of non-zero coefficient flag sig_coeff_flag may be set to 0 when the residual coefficient is 0, and the value of non-zero coefficient flag sig_coeff_flag may be set to 1 when the residual coefficient is 1. The coding of non-zero coefficient flag sig_coeff_flag for the last non-zero coefficient may be omitted. When the coding of the non-zero coefficient flag sig_coeff_flag is omitted, the corresponding residual coefficient is considered to be non-zero.

Information regarding the location of the last non-zero coefficient for the transform skip coefficient may not be coded. In this case, non-zero coefficient flag sig_coeff_flag for all transform skip coefficients in a block may be coded.

Alternatively, information indicating whether information regarding the location of the last non-zero coefficient is coded may be coded and signaled. The information may be a 1-bit flag. The decoder may determine whether to decode the information regarding the location of the last non-zero coefficient according to the value of the flag. When the location of the last non-zero coefficient is not decoded, a non-zero coefficient flag may be decoded for all the transform skip coefficients. On the other hand, when the location of the last non-zero coefficient is decoded, information indicating whether transform skip coefficients which are scanned earlier than the last non-zero coefficient are non-zero coefficients may be encoded.

The DC component of a transform coefficient or a transform skip coefficient may not be set to zero. Here, the DC component may indicate a last scanned sample or a sample located on an upper left corner of the block. For the DC component, the coding of non-zero coefficient flag sig_coeff_flag may be omitted. When the coding of the non-zero coefficient flag sig_coeff_flag is omitted, the corresponding residual coefficient is considered to be non-zero.

When the residual coefficient is non-zero, information indicating the absolute value of the residual coefficient and information indicating the sign of the residual coefficient may be coded (S4105). A process of coding the information indicating the absolute value of the residual coefficient will be described in detail with reference to FIG. 45.

The residual coefficient coding may be sequentially performed on the sub-transform units included in the current block and all residual coefficients after the last non-zero coefficient (S4106 and S4107).

Figure 45:
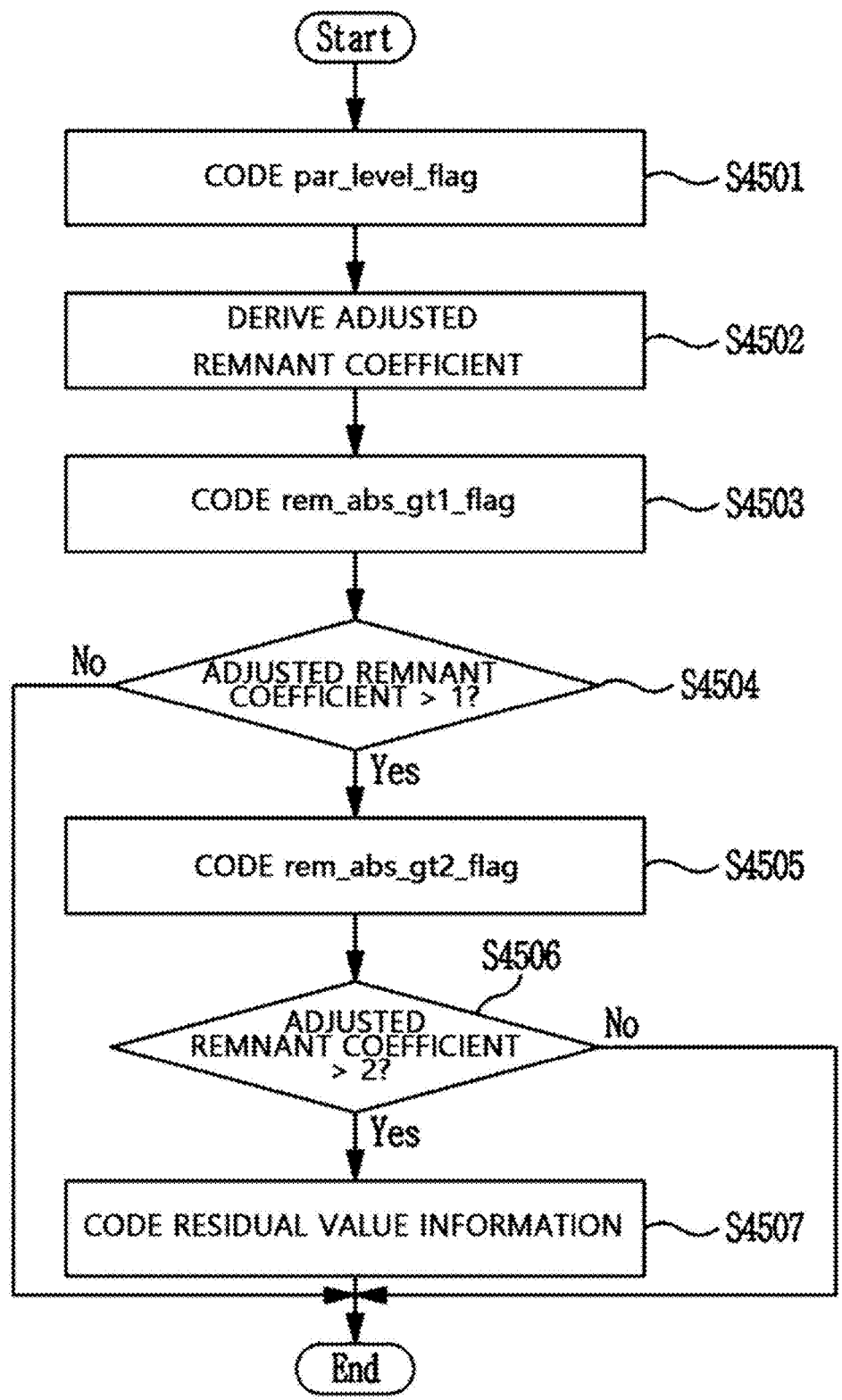
FIG. 45 is a flowchart of a process of coding the absolute value of a residual coefficient.

FIG. 45 is a flowchart of a process of coding the absolute value of a residual coefficient.

When the absolute value of a residual coefficient is greater than 0, information indicating whether the residual coefficient or a remnant coefficient is an even number or an odd number may be coded (S4501). Here, the remnant coefficient may be defined as the absolute value of the residual coefficient minus 1. The information may be a 1-bit parity flag. As an example, the value of syntax element par_level_flag being 0 means that the residual coefficient or the remnant coefficient is an even number, and the value of syntax element par_level_flag being 1 means that the residual coefficient or the remnant coefficient is an odd number. The value of syntax element par_level_flag may be determined using Equation 30 below.

$$\text{par\_level\_flag} = (\text{abs}(T\text{coeff}) - 1)\ \%\ 2 \quad \text{[Equation 30]}$$

In Equation 30, Tcoeff represents a residual coefficient, and abs( ) represents an absolute value function.

An adjusted remnant coefficient may be derived by dividing the residual coefficient or the remnant coefficient by 2 or by applying a bit-shift operation to the residual coefficient or the remnant coefficient (S4502). In detail, a quotient obtained by dividing the residual coefficient by 2 may be set as the adjusted remnant coefficient, or a value obtained by shifting the residual coefficient to the right by 1 may be set as the adjusted remnant coefficient.

As an example, the adjusted remnant coefficient may be derived using Equation 31 below.

$$\text{ReRemLevel} = \text{RemLevel} >> 1 \quad \text{[Equation 31]}$$

In Equation 31, ReRemLevel represents an adjusted remnant coefficient, and RemLevel represents a remnant coefficient.

Next, information indicating the size of the adjusted remnant coefficient may be coded. The information indicating the size of the adjusted remnant coefficient may include information indicating whether the adjusted remnant coefficient is greater than N. Here, N is a natural number such as 1, 2, 3, and 4.

As an example, information indicating whether the value of the adjusted remnant coefficient is greater than 1 may be coded. The information may be a 1-bit flag rem_abs_gt1_flag.

When the remnant coefficient is 0 or 1, the value of rem_abs_gt1_flag may be set to 0. That is, when the residual coefficient is 1 or 2, the value of rem_abs_gt1_flag may be set to 0.

In this case, par_level_flag may be set to 0 when the remnant coefficient is 0, and par_level_flag may be set to 1 when the remnant coefficient is 1.

When the adjusted remnant coefficient is 2 or more (S4504), the value of rem_abs_gt1_flag may be set to 1, and information indicating whether the value of the adjusted remnant coefficient is greater than 2 may be coded (S4505). The information may be a 1-bit flag rem_abs_gt2_flag.

When the remnant coefficient is 1 or 2, the value of rem_abs_gt2_flag may be set to 0. That is, when the residual coefficient is 3 or 4, the value of rem_abs_gt2_flag may be set to 0. In this case, par_level_flag may be set to 2 when the remnant coefficient is 0, and par_level_flag may be set to 1 when the remnant coefficient is 3.

When the adjusted remnant coefficient is greater than 2, residual value information indicating the adjusted remnant coefficient minus 2 may be coded (S4506). That is, a value obtained by subtracting 5 from the absolute value of the residual coefficient and then dividing the result of the subtraction by 2 may be coded as the residual value information.

Although not shown, the residual coefficient may be coded further using a flag indicating whether the adjusted remnant coefficient is greater than 3 (e.g., rem_abs_gt3_flag) or a flag indicating whether the adjusted remnant coefficient is greater than 4 (e.g., rem_abs_gt4 flag). In this case, the adjusted remnant coefficient minus the maximum value may be set as the residual value. The maximum value represents the maximum N applied to rem_abs_gtN_flag.

Instead of the flags for comparing the value of the adjusted remnant coefficient to a specific value, flags for comparing the absolute value of the adjusted coefficient or the residual coefficient to a specific value may be used. As an example, gr2_flag, which indicates whether the absolute value of the residual coefficient is greater than 2, may be used instead of rem_abs_gt1_flag, and gr4_flag, which indicates whether the absolute value of the residual coefficient is greater than 4, may be used instead of rem_abs_gt2_flag.

Table 14 simply represents a process of coding residual coefficients using syntax elements.

TABLE 14

```
Sig_coeff_flag = (abs(TCoeff) != 0) ? 1 : 0
Encode Sig_coeff_flag
if (Sig_coeff_flag) {
   RemLevel = abs(Tcoeff) - 1
   Parity_level_flag = RemLevel %2
   Encode parity_level_flag
   ReRemLevel = RemLevel >> 1
   Rem_abs_gt1_flag = (ReRemLevel > 1) ? 1 : 0
   Encode rem_abs_gt1_flag
   if (Rem_abs_gt1_flag == 1) {
      Rem_abs_gt2_flag = absLevel > 4 ? 1 : 0
      if (Rem_abs_gt1_flag == 1) {
      Encode rem_abs_gt2_flag
      Rem = (absLevel - 5) >> 1
      Encode Rem
      }
   }
Sign_Coeff = TCoeff > 0 ? 0 : 1
Encode Sign_Coeff
}
```

In the above example, the residual coefficient may be coded using par_level_flag and at least one flag rem_abs_gtN_flag (here, N is a natural number such as 1, 2, 3, and 4).

rem_abs_gtN_flag represents whether the residual coefficient is greater than 2N. For a residual coefficient 2N−1 or 2N, rem_abs_gt(N−1) flag is set to be true, and rem_abs_gtN_flag is set to be false. In addition, the value of par_level_flag may be set to 0 for the residual coefficient 2N−1, and the value of par_level_flag may be set to 1 for the residual coefficient 2N. That is, residual coefficients less than or equal to 2N may be coded using rem_abs_gtN_flag and par_level_flag.

For residual coefficients greater than or equal to 2MAX+1, residual value information indicating a value obtained by dividing a difference with 2MAX by 2 may be coded. Here, MAX represents the maximum value of N. As an example, when rem_abs_gt1_flag and rem_abs_gt2_flag are used, MAX may be 2.

A decoder may also decode residual coefficients in the order shown in FIG. 45. In detail, the decoder may determine the location of the last non-zero coefficient and may decode sig_coeff_flag for each residual coefficient that is scanned before the last non-zero coefficient.

When sig_coeff_flag is true, the decoder may decode par_level_flag of the corresponding residual coefficient. Also, the decoder may decode rem_abs_gt1_flag of the corresponding residual coefficient. In this case, rem_abs_gtN_flag may be additionally decoded depending on the value of rem_abs_gt(N−1) flag. As an example, when the value of rem_abs_gt(N−1) flag is 1, the decoder may decode rem_abs_gtN_flag. For example, when the value of rem_abs_gt1_flag for the residual coefficient is 1, the decoder may further parse rem_abs_gt2_flag for the residual coefficient. When the value of rem_abs_gt(MAX) flag is 1, the decoder may decode the residual value information.

When the value of rem_abs_gtN_flag of the residual coefficient is 0, the value of the residual coefficient may be determined to be 2N−1 or 2N depending on the value of par_level_flag. In detail, the residual coefficient may be set to 2N−1 when par_level_flag is 0, and the residual coefficient may be set to 2N when par_level_flag is 1.

For example, when rem_abs_gt1_flag is 0, the absolute value of the residual coefficient may be set to 1 or 2 depending on the value of par_level_flag. In detail, the absolute value of the residual coefficient is 1 when the value of par_level_flag is 0, and the absolute value of the residual coefficient is 2 when the value of par_level_flag is 1.

For example, when rem_abs_gt2_flag is 0, the absolute value of the residual coefficient may be set to 3 or 4 depending on the value of par_level_flag. In detail, the absolute value of the residual coefficient is 3 when the value of par_level_flag is 0, and the absolute value of the residual coefficient is 4 when the value of par_level_flag is 1.

When the residual value information is decoded, the residual coefficient may be set to 2(MAX+R)−1 or 2(MAX+R) depending on the value of par_level_flag. Here, R represents a value indicated by the residual value information. As an example, the residual coefficient may be set to 2(MAX+R)−1 when par_level_flag is 0, and the residual coefficient may be set to 2(MAX+R) when par_level_flag is 1. As an example, when MAX is 2, the residual coefficient may be derived using Equation 32 below.

$$\text{parity\_level\_flag} + \text{Rem} \ll 1 + 5 \qquad \text{[Equation 32]}$$

When the residual coefficient is coded in the example shown in FIG. 45, a parity flag may be coded for each non-zero coefficient. As an example, even when the residual coefficient is 1, par_level_flag and rem_abs_gt1_flag should be coded. The above coding method may cause the number of bits needed to code residual coefficients having an absolute value of 1 to be increased. In order to solve the problem, information indicating whether the residual coefficient is greater than 1 may be coded first, and a parity flag may be coded when the residual coefficient is 1.

Figure 46:
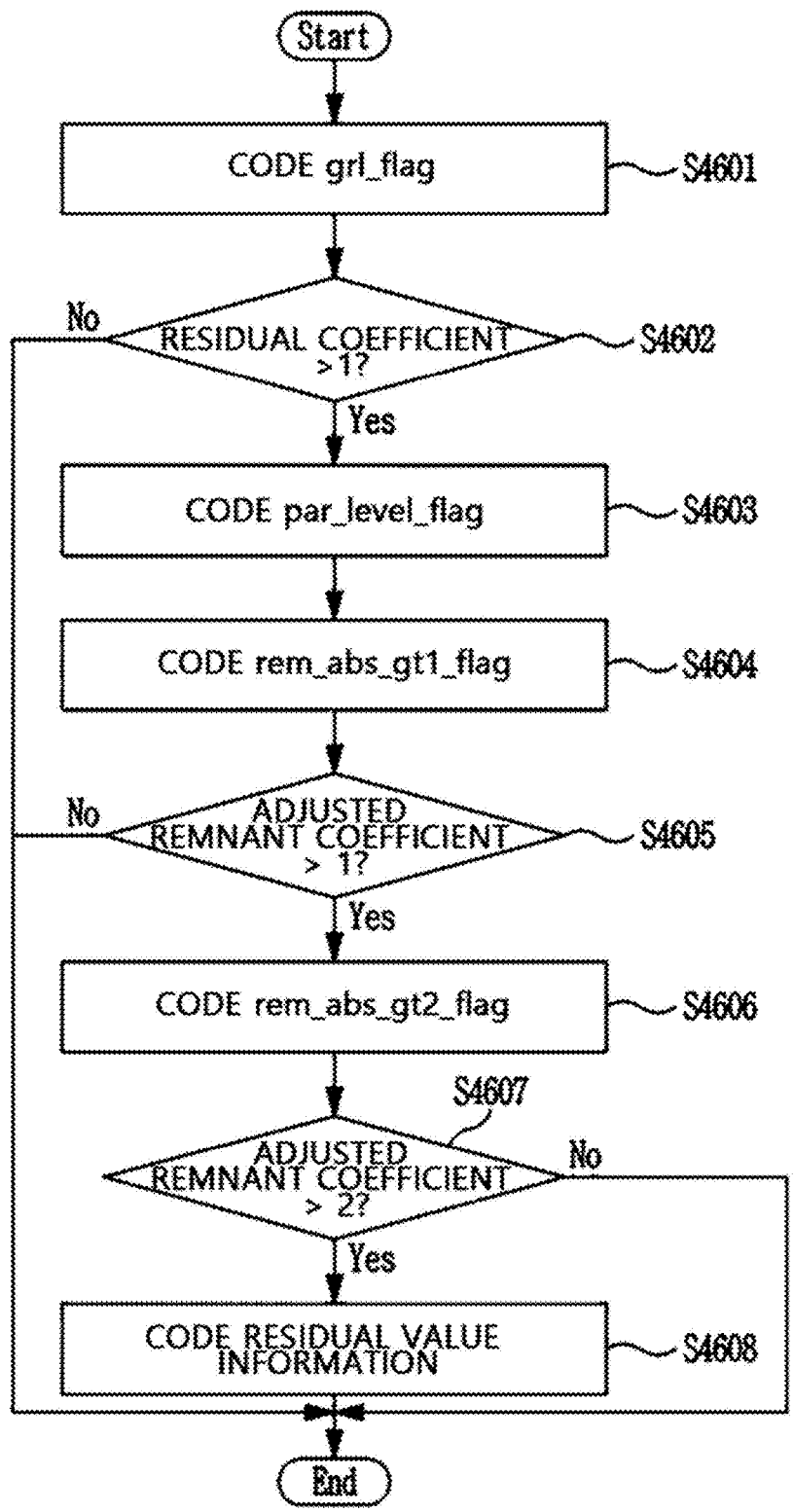
FIG. 46 is a flowchart of a process of coding the absolute value of a residual coefficient.

FIG. 46 is a flowchart of a process of coding the absolute value of a residual coefficient.

For a non-zero residual coefficient, information gr1_flag, which indicates whether the absolute value of the residual coefficient is greater than 1, may be coded (S4601). gr1_flag may be set to 0 when the residual coefficient is 1, and gr1_flag may be set to 1 when the residual coefficient is greater than 1.

When the absolute value of the residual coefficient is greater than 1, a parity flag indicating whether the residual coefficient or the remnant coefficient is an even number or an odd number may be coded (S4602 and S4603). Here, the remnant coefficient may be set to the residual coefficient minus 2. As an example, par_level_flag may be derived using Equation 33 below.

$$\text{par\_level\_flag} = (\text{abs}(\text{Tcoeff}) - 2)\%2 \qquad \text{[Equation 33]}$$

An adjusted remnant coefficient may be derived by dividing the residual coefficient or the remnant coefficient by 2 or by bit-shifting the residual coefficient or the remnant coefficient to the right by 1, and then information indicating whether the adjusted remnant coefficient is greater than 1 may be coded (S4604). As an example, for a residual coefficient of which gr1_flag is 1, rem_abs_gt1_flag, which indicates whether the adjusted remnant coefficient is greater than 1, may be coded.

When the remnant coefficient is 0 or 1, the value of rem_abs_gt1_flag may be set to 0. That is, when the residual coefficient is 2 or 3, the value of rem_abs_gt1_flag may be set to 0. In this case, par_level_flag may be set to 0 when the adjusted remnant coefficient is 0, and par_level_flag may be set to 1 when the remnant coefficient is 1.

When the adjusted remnant coefficient is 2 or more (S4605), the value of rem_abs_gt1_flag may be set to 1, and information indicating whether the value of the adjusted remnant coefficient is greater than 2 may be coded (S4606). As an example, for a residual coefficient of which rem_abs_gt1_flag is 1, rem_abs_gt2_flag, which indicates whether the adjusted remnant coefficient is greater than 2, may be coded.

When the remnant coefficient is 2 or 3, the value of rem_abs_gt2_flag may be set to 1. That is, when the residual coefficient is 4 or 5, the value of rem_abs_gt2_flag may be set to 0. In this case, par_level_flag may be set to 0 when the remnant coefficient is 2, and par_level_flag may be set to 1 when the remnant coefficient is 3.

When the adjusted remnant coefficient is greater than 2 (S4607), residual value information indicating the adjusted remnant coefficient minus 2 may be coded (S4608). That is, a value obtained by subtracting 6 from the absolute value of the residual coefficient and then dividing the result of the subtraction by 2 may be coded as the residual value information.

The residual coefficient may be coded further using a flag indicating whether the adjusted remnant coefficient is greater than 3 (e.g., rem_abs_gt3_flag) or a flag indicating whether the adjusted remnant coefficient is greater than 4 (e.g., rem_abs_gt4 flag). In this case, the adjusted remnant coefficient minus the maximum value may be set as the residual value. The maximum value represents the maximum N applied to rem_abs_gtN_flag.

Instead of the flags for comparing the value of the adjusted remnant coefficient to a specific value, flags for comparing the absolute value of the adjusted coefficient or the residual coefficient to a specific value may be used. As an example, gr3_flag, which indicates whether the absolute value of the residual coefficient is greater than 3, may be used instead of rem_abs_gt1_flag, and gr5 flag, which indicates whether the absolute value of the residual coefficient is greater than 5, may be used instead of rem_abs_gt2_flag.

Table 15 simply represents a process of coding residual coefficients using syntax elements.

TABLE 5

```
Sig_coeff_flag = (abs(TCoeff) != 0) ? 1 : 0
Encode Sig_coeff_flag
if (Sig_coeff_flag) {
    Gr1_flag = abs(TCoeff) > 1 ? 1 : 0
    Encode Gr1_flag
    if (Gr1_flag) {
        RemLevel = abs(Tcoeff) − 2
        Parity_level_flag = RemLevel %2
        Encode Parity_level_flag
        ReRemLevel = RemLevel >> 1
        Rem_abs_gt1_flag = (ReRemLevel > 1) ? 1 : 0
        Encode Rem_abs_gt1_flag
        if (Rem_abs_gt1_flag == 1) {
            Rem_abs_gt2_flag = absLevel > 5 ? 1 : 0
            if (Rem_abs_gt1_flag == 1) {
                Encode Rem_abs_gt2_flag
                Rem = ( absLevel − 6 ) >> 1
                Encode Rem
            }
        }
    }
    Sign_Coeff = TCoeff > 0 ? 0 : 1
    Encode Sign_Coeff
}
```

A decoder may also decode residual coefficients in the order shown in FIG. 46. In detail, the decoder may determine the location of the last non-zero coefficient and may decode sig_coeff_flag for each residual coefficient that is scanned before the last non-zero coefficient.

When sig_coeff_flag is true, the decoder may decode gr1_flag of the corresponding residual coefficient. The decoder may determine that the absolute value of the corresponding residual coefficient is 1 when gr1_flag is 0 and may decode par_level_flag of the corresponding residual coefficient when gr1_flag is 1. Subsequently, the decoder may decode rem_abs_gt1_flag of the corresponding residual coefficient. In this case, rem_abs_gtN_flag may be additionally decoded depending on the value of rem_abs_gt(N−1) flag. As an example, when the value of rem_abs_gt(N−1) flag is 1, the decoder may decode rem_abs_gtN_flag. For example, when the value of rem_abs_gt1_flag for the residual coefficient is 1, the decoder may further parse rem_abs_gt2_flag for the residual coefficient. When the value of rem_abs_gt(MAX) flag is 1, the decoder may decode the residual value information.

When the value of rem_abs_gtN_flag of the residual coefficient is 0, the value of the residual coefficient may be determined to be 2N or 2N+1 depending on the value of par_level_flag. In detail, the residual coefficient may be set to 2N when par_level_flag is 0, and the residual coefficient may be set to 2N+1 when par_level_flag is 1.

For example, when rem_abs_gt1_flag is 0, the absolute value of the residual coefficient may be set to 2 or 3 depending on the value of par_level_flag. In detail, the absolute value of the residual coefficient is 2 when the value of par_level_flag is 0, and the absolute value of the residual coefficient is 3 when the value of par_level_flag is 1.

For example, when rem_abs_gt2_flag is 0, the absolute value of the residual coefficient may be set to 4 or 5 depending on the value of par_level_flag. In detail, the absolute value of the residual coefficient is 4 when the value of par_level_flag is 0, and the absolute value of the residual coefficient is 5 when the value of par_level_flag is 1.

When the residual value information is decoded, the residual coefficient may be set to 2(MAX+R) or 2(MAX+R)+1 depending on the value of par_level_flag. Here, R represents a value of the residual value information. As an example, the residual coefficient may be set to 2(MAX+R) when par_level_flag is 0, and the residual coefficient may be set to 2(MAX+R)+1 when par_level_flag is 1.

As another example, a parity flag may be coded only when the value of the residual coefficient is greater than 2. As an example, after information indicating whether the value of the residual coefficient is greater than 1 and information indicating whether the value of the residual coefficient is greater than 2 are coded, a parity flag for the corresponding residual coefficient may be coded when it is determined that the value of the residual coefficient is greater than 2.

Figure 47:
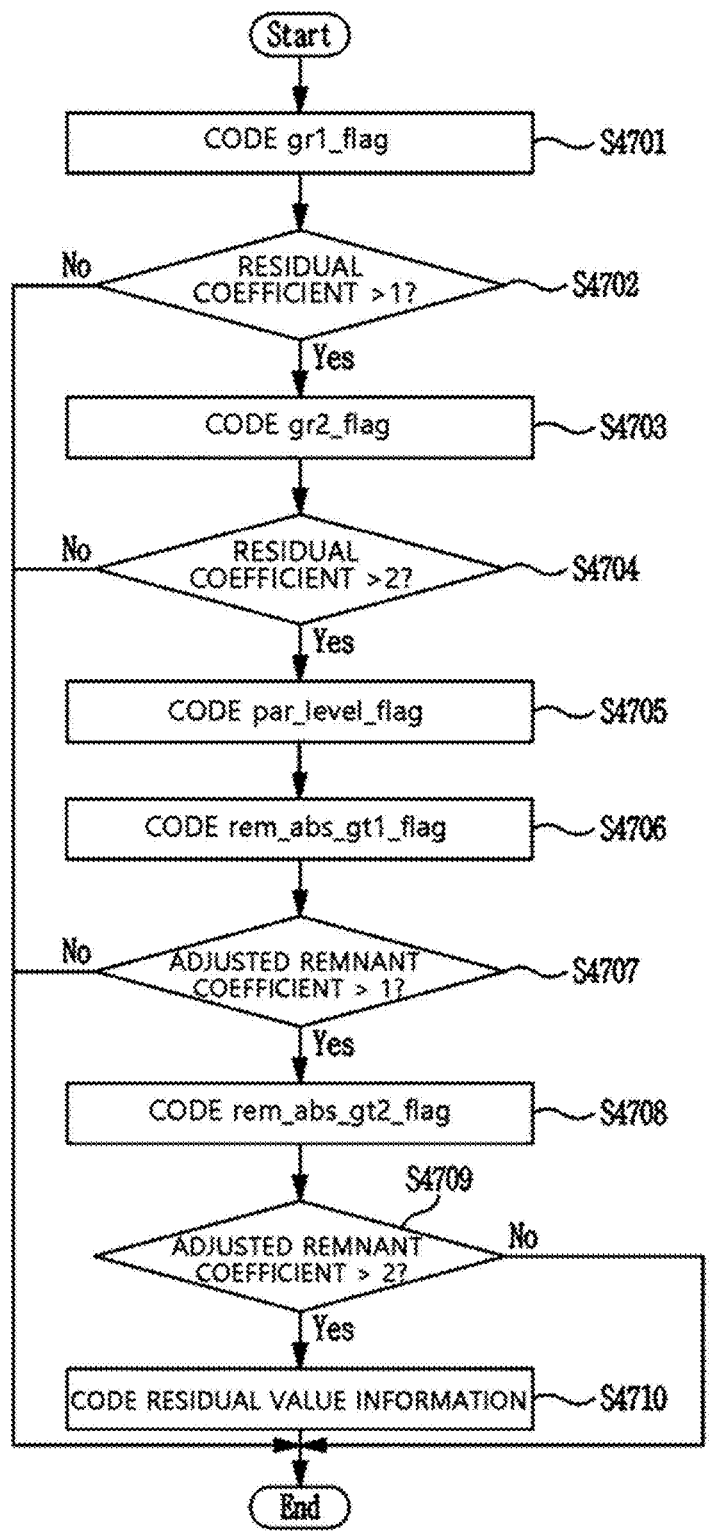
FIG. 47 is a flowchart of a process of coding the absolute value of a residual coefficient.

FIG. 47 is a flowchart of a process of coding the absolute value of a residual coefficient.

For a non-zero residual coefficient, information gr1_flag, which indicates whether the absolute value of the residual coefficient is greater than 1, may be coded (S4701). gr1_flag may be set to 0 when the residual coefficient is 1, and gr1_flag may be set to 1 when the residual coefficient is greater than 1.

For a residual coefficient of which the absolute value is greater than 1, information gr2 flag, which indicates whether the absolute value of the residual coefficient is greater than 2, may be coded (S4702 and S4703). gr2 flag may be set to 0 when the residual coefficient is 2, and gr2 flag may be set to 1 when the residual coefficient is greater than 2.

When the absolute value is greater than 2, a parity flag indicating whether the residual coefficient or the remnant coefficient is an even number or an odd number may be coded (S4704 and S4705). Here, the remnant coefficient may be set to the residual coefficient minus 3. As an example, par_level_flag may be derived using Equation 34 below.

$$\text{par\_level\_flag} = (\text{abs}(\text{Tcoeff}) - 3) \% \ 2 \qquad \text{[Equation 34]}$$

An adjusted remnant coefficient may be derived by dividing the residual coefficient or the remnant coefficient by 2 or by bit-shifting the residual coefficient or the remnant coefficient to the right by 1, and then information indicating whether the adjusted remnant coefficient is greater than 1 may be coded. As an example, for a residual coefficient of which gr1_flag is 1, rem_abs_gt1_flag, which indicates whether the adjusted remnant coefficient is greater than 1, may be coded (S4706).

When the remnant coefficient is 0 or 1, the value of rem_abs_gt1_flag may be set to 0. That is, when the residual coefficient is 3 or 4, the value of rem_abs_gt1_flag may be set to 0. In this case, par_level_flag may be set to 0 when the adjusted remnant coefficient is 0, and par_level_flag may be set to 1 when the remnant coefficient is 1.

When the adjusted remnant coefficient is 2 or more (S4707), the value of rem_abs_gt1_flag may be set to 1, and information indicating whether the value of the adjusted remnant coefficient is greater than 2 may be coded (S4708). As an example, for a residual coefficient of which rem_abs_gt1_flag is 1, rem_abs_gt2_flag, which indicates whether the adjusted remnant coefficient is greater than 2, may be coded.

When the remnant coefficient is 2 or 3, the value of rem_abs_gt2_flag may be set to 1. That is, when the residual coefficient is 5 or 6, the value of rem_abs_gt2_flag may be set to 0. In this case, par_level_flag may be set to 0 when the remnant coefficient is 2, and par_level_flag may be set to 1 when the remnant coefficient is 3.

When the adjusted remnant coefficient is greater than 2, a residual value equal to the adjusted remnant coefficient minus 2 may be coded (S4709 and S4710). That is, a value obtained by subtracting 7 from the absolute value of the residual coefficient and then dividing the result of the subtraction by 2 may be coded as the residual value.

The residual coefficient may be coded further using a flag indicating whether the adjusted remnant coefficient is greater than 3 (e.g., rem_abs_gt3_flag) or a flag indicating whether the adjusted remnant coefficient is greater than 4 (e.g., rem_abs_gt4 flag). In this case, the adjusted remnant coefficient minus the maximum value may be set as the residual value. The maximum value represents the maximum N applied to rem_abs_gtN_flag.

Instead of the flags for comparing the value of the adjusted remnant coefficient to a specific value, flags for comparing the absolute value of the adjusted coefficient or the residual coefficient to a specific value may be used. As an example, gr4 flag, which indicates whether the absolute value of the residual coefficient is greater than 4, may be used instead of rem_abs_gt1_flag, and gr6 flag, which indicates whether the absolute value of the residual coefficient is greater than 6, may be used instead of rem_abs_gt2_flag.

A decoder may also decode residual coefficients in the same order as shown in FIG. 47. In detail, the decoder may determine the location of the last non-zero coefficient and may decode sig_coeff_flag for each residual coefficient that is scanned before the last non-zero coefficient.

When sig_coeff_flag is true, the decoder may decode gr1_flag of the corresponding residual coefficient. The decoder may determine that the absolute value of the corresponding residual coefficient is 1 when gr1_flag is 0 and may decode gr2 flag when gr1_flag is 1. The decoder may determine that the absolute value of the corresponding residual coefficient is 2 when gr2 flag is 0 and may decode par_level_flag of the corresponding residual coefficient when gr2 flag is 1. Subsequently, the decoder may decode rem_abs_gt1_flag of the corresponding residual coefficient. In this case, rem_abs_gtN_flag may be additionally decoded depending on the value of rem_abs_gt(N−1) flag. As an example, when the value of rem_abs_gt(N−1) flag is 1, the decoder may decode rem_abs_gtN_flag. For example, when the value of rem_abs_gt1_flag for the residual coefficient is 1, the decoder may further parse rem_abs_gt2_flag for the residual coefficient. When the value of rem_abs_gt(MAX) flag is 1, the decoder may decode the residual value information.

When the value of rem_abs_gtN_flag of the residual coefficient is 0, the value of the residual coefficient may be determined to be 2N+1 or 2(N+1) depending on the value of par_level_flag. In detail, the residual coefficient may be set to 2N+1 when par_level_flag is 0, and the residual coefficient may be set to 2(N+1) when par_level_flag is 1.

For example, when rem_abs_gt1_flag is 0, the absolute value of the residual coefficient may be set to 3 or 4 depending on the value of par_level_flag. In detail, the absolute value of the residual coefficient is 3 when the value of par_level_flag is 0, and the absolute value of the residual coefficient is 4 when the value of par_level_flag is 1.

For example, when rem_abs_gt2_flag is 0, the absolute value of the residual coefficient may be set to 5 or 6 depending on the value of par_level_flag. In detail, the absolute value of the residual coefficient is 5 when the value of par_level_flag is 0, and the absolute value of the residual coefficient is 6 when the value of par_level_flag is 1.

When the residual value information is decoded, the residual coefficient may be set to 2(MAX+R) or 2(MAX+R)+1 depending on the value of par_level_flag. Here, R represents a value of the residual value information. As an example, the residual coefficient may be set to 2(MAX+R) when par_level_flag is 0, and the residual coefficient may be set to 2(MAX+R)+1 when par_level_flag is 1.

At least one of the number or types of comparison flags for comparing adjusted remnant coefficients to a specific value on the basis of at least one of the size or shape of the current block, the presence of a transform skip, a transform core, the number of non-zero coefficients, or the location of the last non-zero coefficient may be determined. As an example, when a transform coefficient is coded, only rem_abs_gt1_flag may be used. On the other hand, when a transform skip coefficient is coded, rem_abs_gt1_flag and rem_abs_gt2_flag may be used.

Alternatively, in a 4×4 sub-transform unit, the number of flags rem_abs_gt1_fag may be set to up to 8, and the number of flags rem_abs_gt2_flag may be set to up to 1. Alternatively, when the number of non-zero coefficient flags is (16-N), the number of flags rem_abs_gt1_flag may be set to up to 8+(N/2), and the number of flags rem_abs_gt2_flag may be set to up to 1+(N−(N/2)).

When the reconstructed block of the current block is acquired, information loss occurring during quantization and coding may be reduced through in-loop filtering. An in-loop filter may include at least one of a deblocking filter, a sample adaptive offset filter (SAO), or an adaptive loop filter (ALF). A reconstructed block before an in-loop filter is applied will be referred to as a first reconstructed block, and a reconstructed block after an in-loop filter is applied will be referred to as a second reconstructed block.

The second reconstructed block may be acquired by applying at least one of the deblocking filter, SAO, or ALF to the first reconstructed block. In this case, the SAO or ALF may be applied after the deblocking filter is applied.

The deblocking filter is for alleviating video quality deterioration (blocking artifact) which occurs at a block edge when a quantization is performed in units of blocks. In order to apply the deblocking filter, blocking strength (BS) between the first reconstructed block and a neighboring reconstructed block may be determined.

Figure 48:
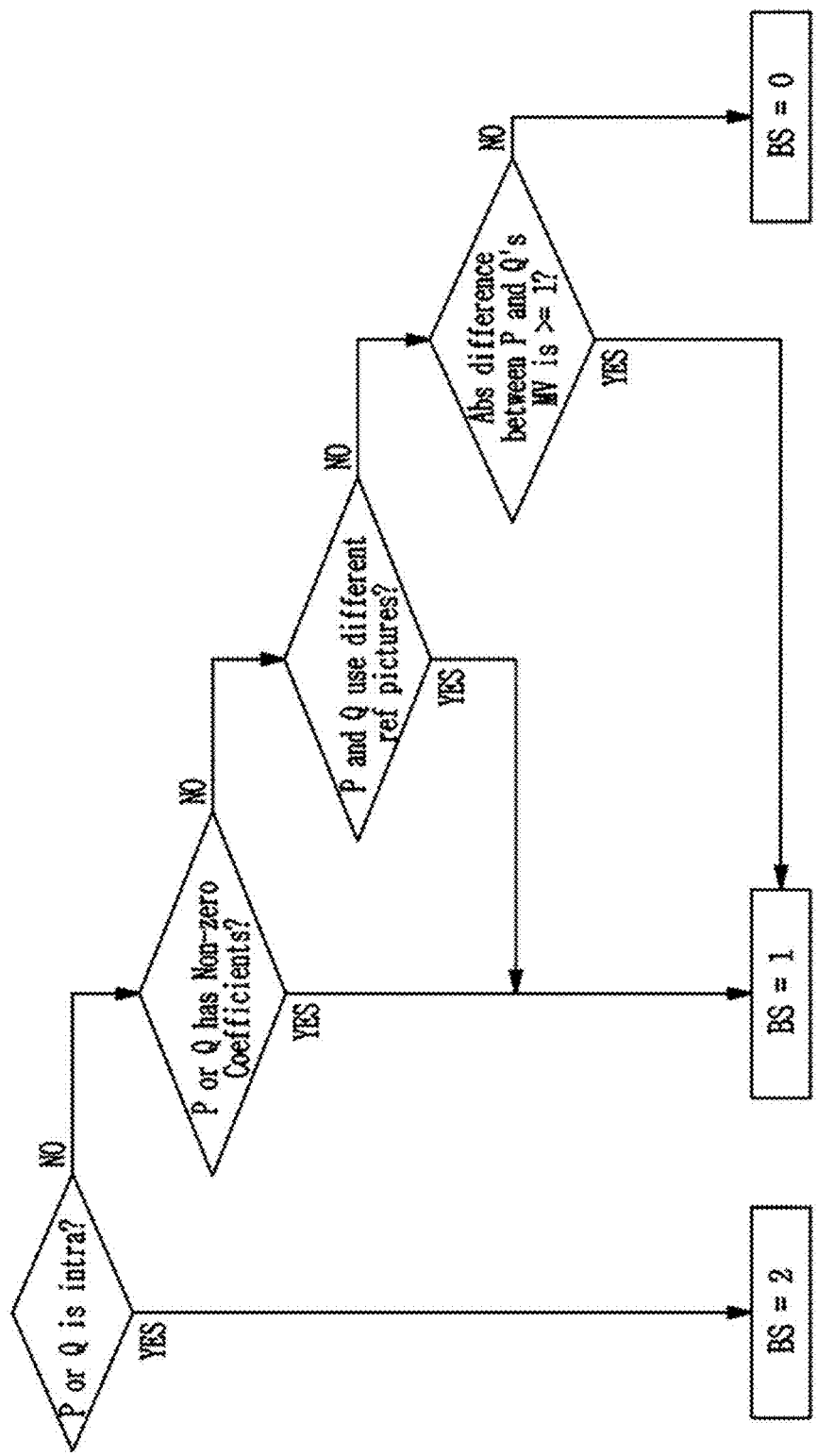
FIG. 48 is a flowchart showing a process of determining blocking strength.

FIG. 48 is a flowchart showing a process of determining blocking strength.

In the example shown in FIG. 48, P represents the first reconstructed block, and Q represents the neighboring reconstructed block. Here, the neighboring reconstructed block may be a block neighboring the left or the top of the current block.

In the example shown in FIG. 48, it is shown that the blocking strength is determined in consideration of the prediction modes of P and Q, whether non-zero transform coefficients are included, whether inter-prediction is performed using the same reference picture, or whether a difference value between movement vectors is greater than or equal to a threshold value.

Whether to apply the deblocking filter may be determined on the basis of the blocking strength. As an example, the filtering may not be performed when the blocking strength is 0.

The SAO is for alleviating a ringing artifact occurring when a quantization is performed in the frequency domain. The SAO may be performed by adding or subtracting an offset determined in consideration of a pattern of the first reconstructed block. A method of determining the offset includes an edge offset (EO) or a band offset (BO). The EO indicates a method of determining an offset of the current sample according to a pattern of nearby pixels. The BO indicates a method of applying a common offset to a set of pixels having similar brightness values in an area. In detail, pixel brightness is divided into 32 equal sections, and pixels with similar brightness values may be set as one set. As an example, four adjacent bands among 32 bands may be set as one group, and the same offset value may be applied to samples belonging to the four bands.

The ALF is a method of generating the second reconstructed block by applying a filter of a predefined size or shape to the first reconstructed block or to a reconstructed block to which the deblocking filter is applied. Equation 35 below represents an application example of the ALF.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$ [Equation 35]

One of the predefined filter candidates may be selected in units of pictures, coding tree units, coding blocks, prediction blocks, or transform blocks. The filter candidates may be different in size or shape.

Figure 49:
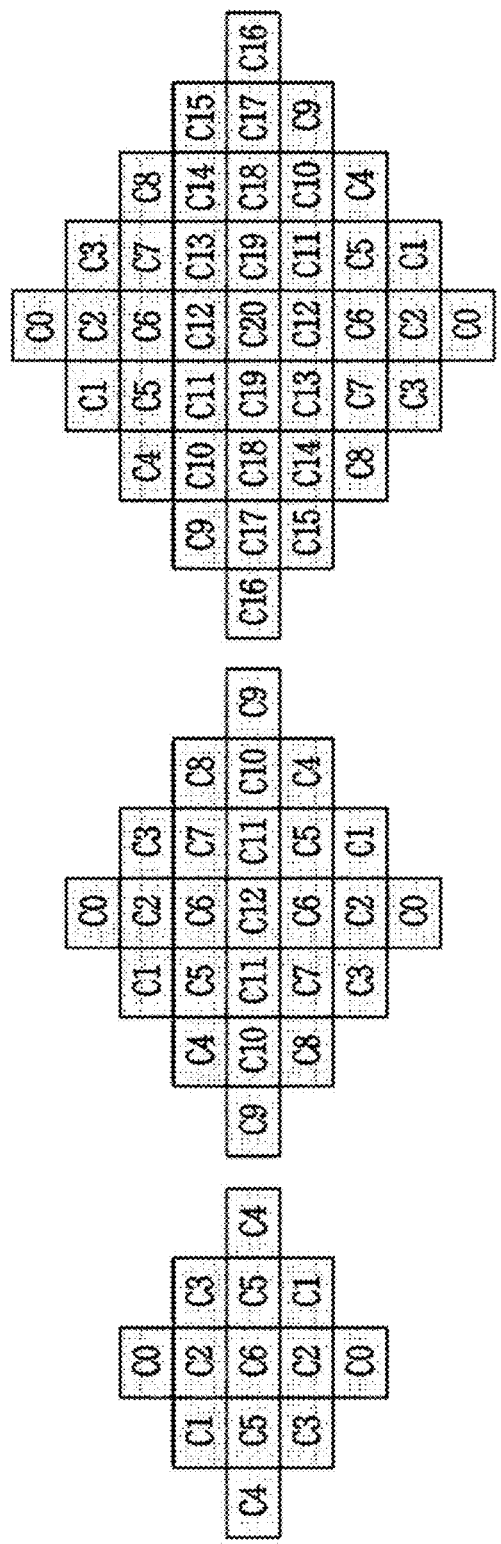
FIG. 49 shows predefined filter candidates.

FIG. 49 shows predefined filter candidates.

In the example shown in FIG. 49, at least one of a 5×5 diamond shape, a 7×7 diamond shape, or a 9×9 diamond shape may be selected.

Only the 5×5 diamond shape may be used for a chroma component.

The application of the embodiments that have been described focusing on a decoding process or an encoding process to the decoding process or the encoding process falls within the scope of the present disclosure. The change of a predetermined order, in which embodiments have been described, to an order different from that described above also falls within the scope of the present disclosure.

Although the above embodiments have been described on the basis of a series of steps or flows, the steps or flows do not limit the time-series order of the disclosure and may be performed simultaneously or in different orders as necessary. Also, each of the components (for example, units, modules, etc.) constituting the block diagram in the above-described embodiments may be implemented by a hardware device or software, and a plurality of components may be combined and implemented by a single hardware device or software. The above embodiments may be implemented in the form of program instructions that may be executed through various computer elements and recorded in a computer-readable recording medium. The computer-readable recording medium may include a program instruction, a data file, a data structure, and the like alone or in combination. Examples of the computer-readable recording medium include magnetic media such as a hard disk, a floppy disk, and a magnetic tape, optical media such as a compact disc-read only memory (CD-ROM) and a digital versatile disc (DVD), magneto-optical media such as a floptical disk, and hardware devices such as a ROM, a random access memory (RAM), and a flash memory, which are specially designed to store and execute program instructions. The hardware device may be configured to operate as one or more software modules in order to perform operations of the present disclosure, and vice versa.

INDUSTRIAL APPLICABILITY

The present disclosure may be applied to an electronic device for encoding or decoding video.

The invention claimed is:

1. A video decoding method comprising the steps of:
parsing a non-zero flag indicating whether a residual coefficient is non-zero from a bitstream;
parsing absolute value information for determining an absolute value of the residual coefficient from the bitstream when the non-zero flag indicates that the residual coefficient is non-zero; and
determining the absolute value of the residual coefficient based on the absolute value information,
wherein
the absolute value information comprises a residual coefficient comparison flag indicating whether the residual coefficient is greater than a first value,
a parity flag is further parsed from the bitstream only when the residual coefficient is greater than the first value; and the parity flag indicates whether the value of the residual coefficient is an even number or an odd number,
a first adjusted remnant coefficient comparison flag indicating whether an adjusted remnant coefficient derived by bit-shifting the residual coefficient to the right by 1 is greater than a second value is further parsed when the residual coefficient is greater than the first value,
a second adjusted remnant coefficient comparison flag indicating whether the adjusted remnant coefficient is greater than a third value is further parsed when the adjusted remnant coefficient is greater than the second value, and
one or more adjusted remnant coefficient comparison flags indicating whether the adjusted remnant coefficient is greater than one or more values are further parsed when the adjusted remnant coefficient is greater than the third value,
wherein N is the second value, and wherein the residual coefficient is determined to be 2N or 2N+1 depending on the parity flag in either the case the adjusted remnant coefficient is less than the second value or equal to the second value.

2. The method of claim 1, wherein
a residual value information is further parsed when the adjusted remnant coefficient is greater than the second value, and
the residual value information includes a value obtained by subtracting the second value from the adjusted remnant coefficient.

3. A video encoding method comprising the steps of:
encoding a non-zero flag indicating whether a residual coefficient is non-zero; and
encoding absolute value information for determining an absolute value of the residual coefficient when the residual coefficient is non-zero, wherein
the absolute value information includes a residual coefficient comparison flag indicating whether the residual coefficient is greater than a first value,
a parity flag for the residual coefficient is further encoded only when the residual coefficient is greater than the first value; and the parity flag indicates whether the value of the residual coefficient is an even number or an odd number,
a first adjusted remnant coefficient comparison flag indicating whether an adjusted remnant coefficient derived by bit-shifting the residual coefficient to the right by 1 is greater than a second value is further encoded when the residual coefficient is greater than the first value,
a second adjusted remnant coefficient comparison flag indicating whether the adjusted remnant coefficient is greater than a third value is further encoded when the adjusted remnant coefficient is greater than the second value, and
one or more adjusted remnant coefficient comparison flags indicating whether the adjusted remnant coefficient is greater than one or more values are further encoded when the adjusted remnant coefficient is greater than the third value,
wherein N is the second value, and wherein the residual coefficient is determined to be 2N or 2N+1 depending on the parity flag in either the case the adjusted remnant coefficient is less than the second value or equal to the second value.

4. The method of claim 3, wherein
residual value information is further encoded when the adjusted remnant coefficient is greater than the second value, and
the residual value information includes a value obtained by subtracting the second value from the adjusted remnant coefficient.

5. A video decoding device, comprising:
a memory having stored instructions;
a processor for executing the instructions to:
parse a non-zero flag indicating whether a residual coefficient is non-zero from a bitstream;
parse absolute value information for determining an absolute value of the residual coefficient from the bitstream when the non-zero flag indicates that the residual coefficient is non-zero; and
determine the absolute value of the residual coefficient based on the absolute value information,
wherein
the absolute value information comprises a residual coefficient comparison flag indicating whether the residual coefficient is greater than a first value,
a parity flag is further parsed from the bitstream only when the residual coefficient is greater than the first value; and the parity flag indicates whether the value of the residual coefficient is an even number or an odd number,
a first adjusted remnant coefficient comparison flag indicating whether an adjusted remnant coefficient derived by bit-shifting the residual coefficient to the right by 1 is greater than a second value is further parsed when the residual coefficient is greater than the first value,
a second adjusted remnant coefficient comparison flag indicating whether the adjusted remnant coefficient is greater than a third value is further parsed when the adjusted remnant coefficient is greater than the second value, and
one or more adjusted remnant coefficient comparison flags indicating whether the adjusted remnant coefficient is greater than one or more values are further parsed when the adjusted remnant coefficient is greater than the third value,
wherein N is the second value, and wherein the residual coefficient is determined to be 2N or 2N+1 depending on the parity flag in either the case the adjusted remnant coefficient is less than the second value or equal to the second value.

6. The device of claim 5, wherein
a residual value information is further parsed when the adjusted remnant coefficient is greater than the second value, and
the residual value information includes a value obtained by subtracting the second value from the adjusted remnant coefficient.

7. A video encoding device, comprising:
a memory having stored instructions;
a processor for executing the instructions to:
encode a non-zero flag indicating whether a residual coefficient is non-zero; and
encode absolute value information for determining an absolute value of the residual coefficient when the residual coefficient is non-zero,
wherein
the absolute value information includes a residual coefficient comparison flag indicating whether the residual coefficient is greater than a first value,
a parity flag for the residual coefficient is further encoded only when the residual coefficient is greater than the first value; and the parity flag indicates whether the value of the residual coefficient is an even number or an odd number,
a first adjusted remnant coefficient comparison flag indicating whether an adjusted remnant coefficient derived by bit-shifting the residual coefficient to the right by 1 is greater than a second value is further encoded when the residual coefficient is greater than the first value,
a second adjusted remnant coefficient comparison flag indicating whether the adjusted remnant coefficient is greater than a third value is further encoded when the adjusted remnant coefficient is greater than the second value, and
one or more adjusted remnant coefficient comparison flags indicating whether the adjusted remnant coefficient is greater than one or more values are further encoded when the adjusted remnant coefficient is greater than the third value,
wherein N is the second value, and wherein the residual coefficient is determined to be 2N or 2N+1 depending on the parity flag in either the case the adjusted remnant coefficient is less than the second value or equal to the second value.

8. The device of claim 7, wherein
residual value information is further encoded when the adjusted remnant coefficient is greater than the second value, and
the residual value information includes a value obtained by subtracting the second value from the adjusted remnant coefficient.

* * * * *